United States Patent [19]

Nakamura

[11] Patent Number: 4,592,639

[45] Date of Patent: Jun. 3, 1986

[54] ELECTRONIC FLASH UNITS

[75] Inventor: Hiroaki Nakamura, Hachioji, Japan

[73] Assignee: Olympus Optical Co., Ltd., Tokyo, Japan

[21] Appl. No.: 694,111

[22] Filed: Jan. 23, 1985

[30] Foreign Application Priority Data

| Apr. 24, 1984 [JP] | Japan | 59-82335 |
| Apr. 24, 1984 [JP] | Japan | 59-82336 |
| Apr. 24, 1984 [JP] | Japan | 59-82337 |
| Jul. 17, 1984 [JP] | Japan | 59-148735 |

[51] Int. Cl.$^4$ .............................................. G03B 9/70
[52] U.S. Cl. ..................... 354/416; 354/132; 354/137; 354/145.1
[58] Field of Search ............... 354/413, 414, 415, 416, 354/417, 418, 126, 127.1, 129, 132, 137, 145.1

[56] References Cited

U.S. PATENT DOCUMENTS

| 3,438,766 | 4/1969 | Biber | 354/415 |
| 4,437,748 | 3/1984 | Kelly | 354/132 |
| 4,444,479 | 4/1984 | Johnson et al. | 354/137 |

FOREIGN PATENT DOCUMENTS 0048421 11/1973 Japan .
0129327 10/1980 Japan .

*Primary Examiner*—Russell E. Adams
*Attorney, Agent, or Firm*—Louis Weinstein

[57] ABSTRACT

An electronic flash unit of the dynamic flat flash type includes a flash control circuit which produces a flash termination signal by detecting the fact that a value associated with pulse flashes reaches a predetermined level and further produces a flash resumption signal within a period of time less than the deionization time of a flash discharge tube after the flash termination signal has been produced. With the flash control circuit, the electronic flash unit permits the discharge tube to repeatedly emit a pulse flash during an exposure operation of a shutter of a camera so that the flash characteristics substantially equivalent to a continuous flash can be obtained.

36 Claims, 56 Drawing Figures

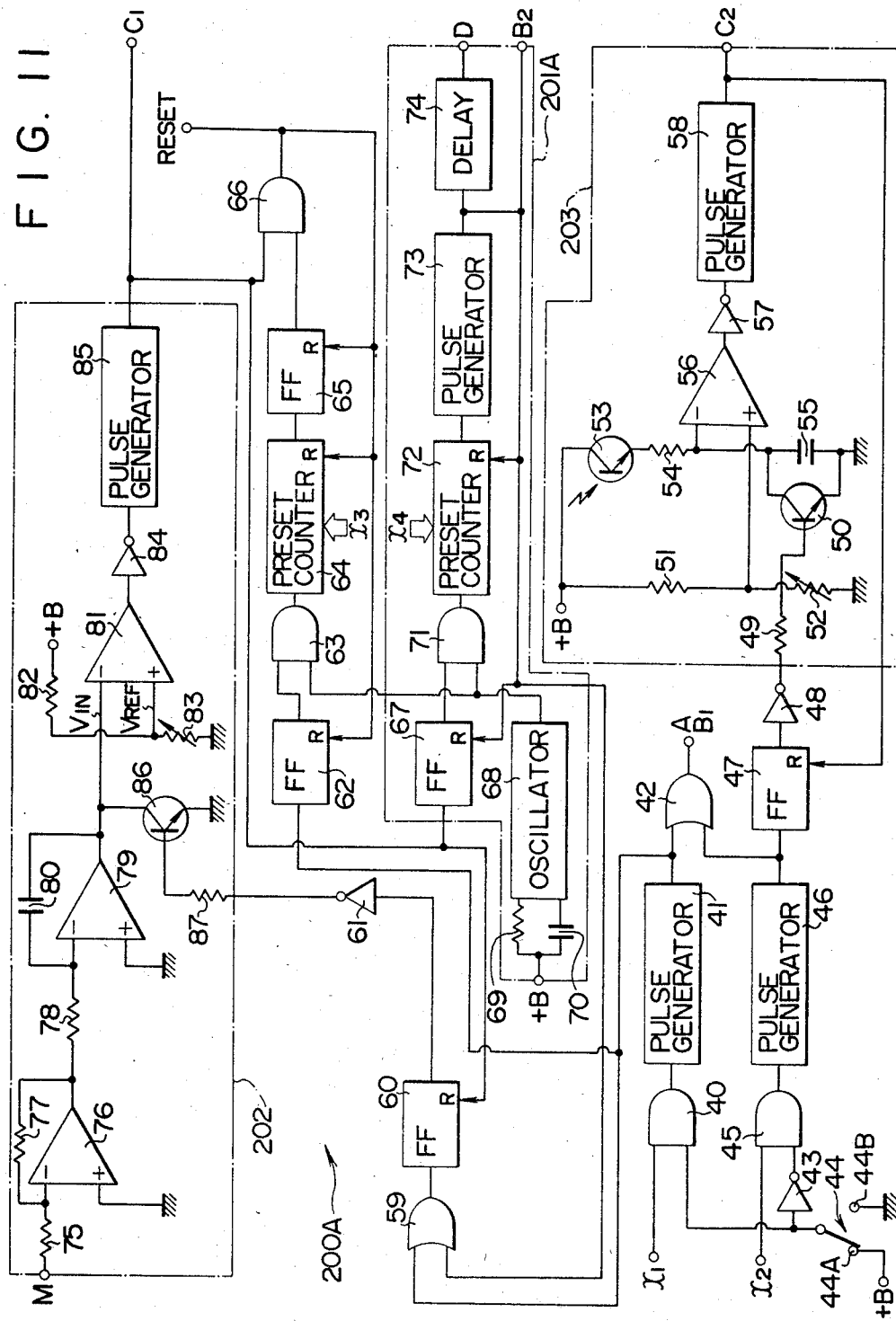

F I G. 16
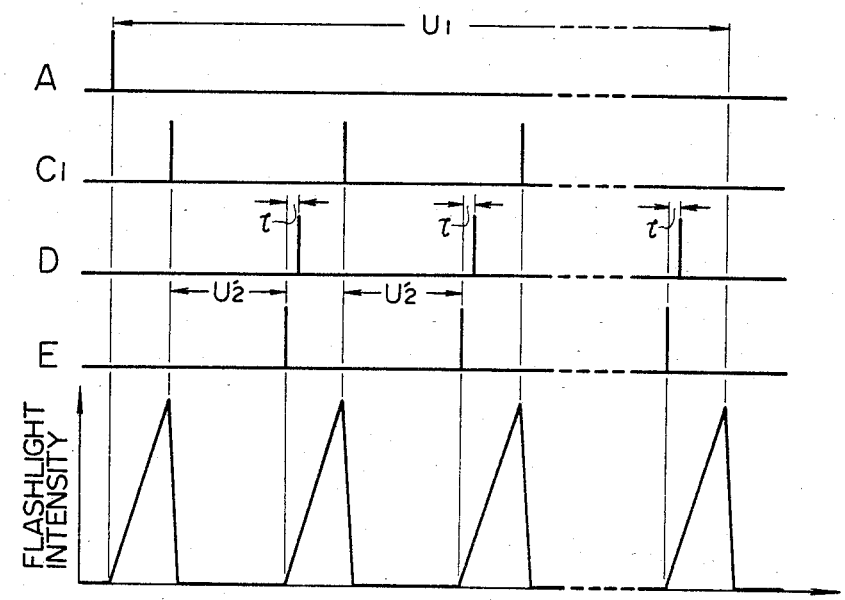
F I G. 17
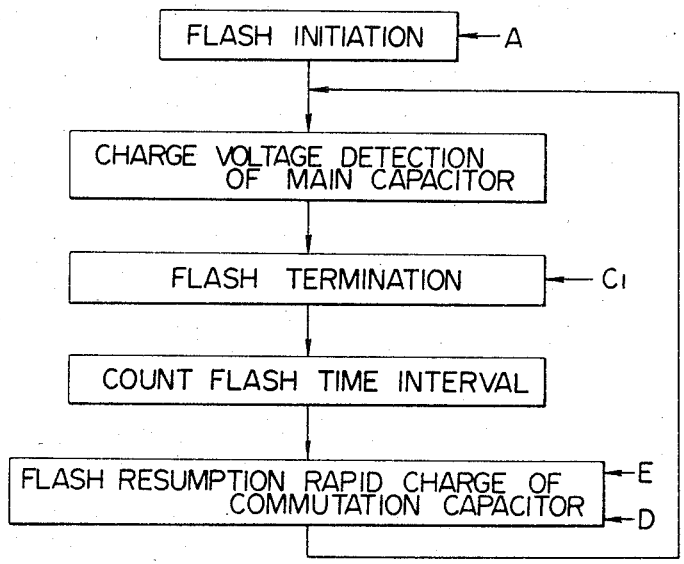

F I G. 23A
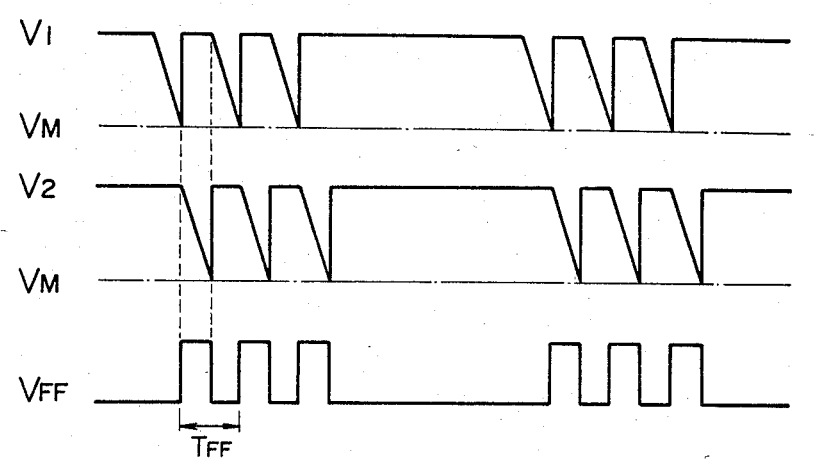
F I G. 23B
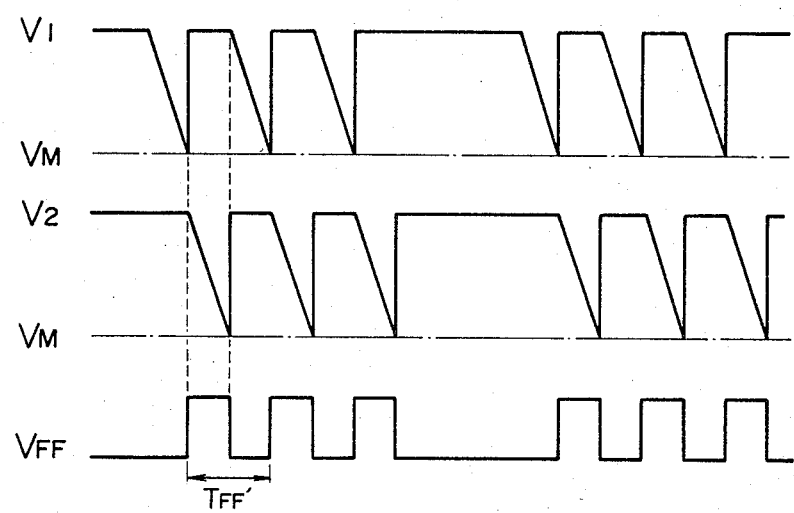

F I G. 47
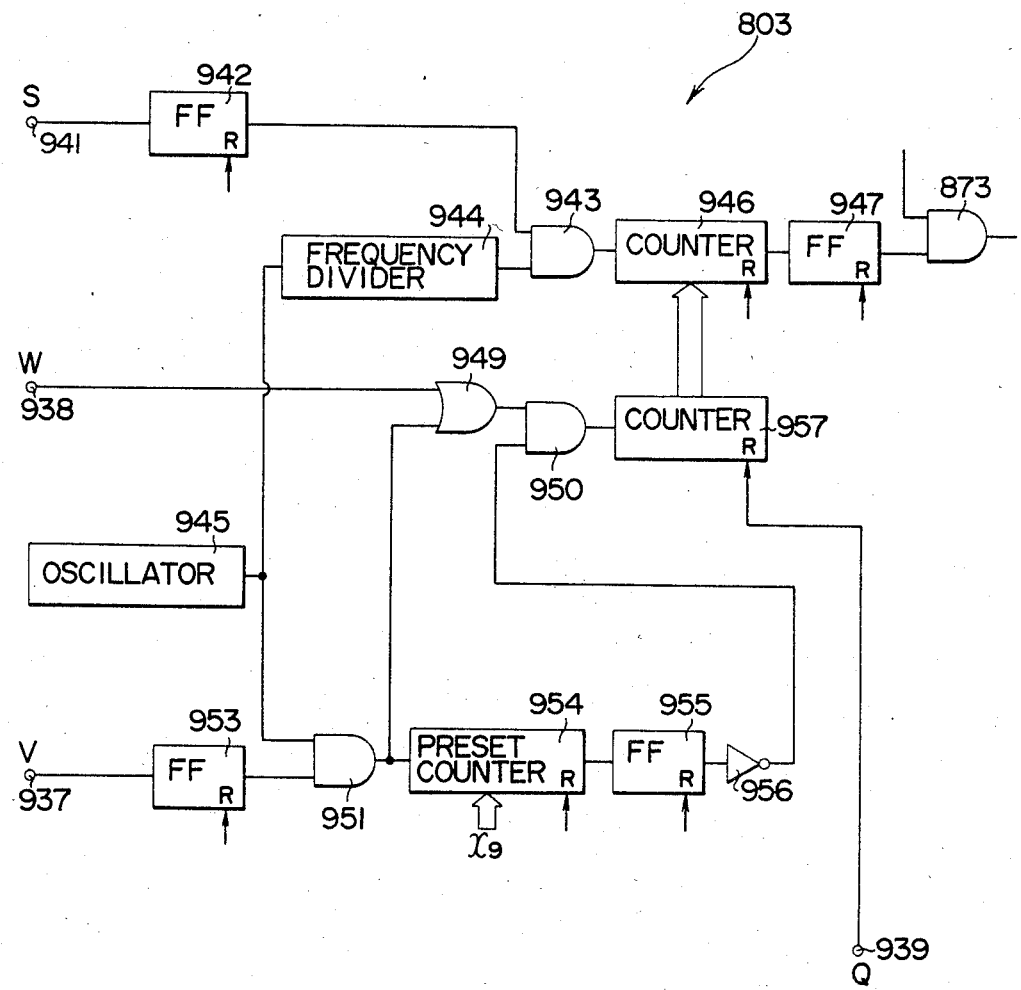

ELECTRONIC FLASH UNITS

BACKGROUND OF THE INVENTION

The present invention relates to electronic flash units, and more particularly, to electronic flash units of the dynamic flat flash type in which a flash discharge tube intermittently emits pulse flashes of an extremely short time duration so as to make them substantially equivalent to a continuous flash of a constant intensity.

As is well known, an intensity of flashlight of a flash discharge tube in an electronic flash unit generally has a peaked configuration which rapidly rises upon its initiation and falls in an extremely short time (see characteristic curve $S_0$ in FIG. 1).

With a camera having a focal plane shutter, it is impossible for an electronic flash unit to emit flashlight at a higher shutter speed than a flash synchronized shutter speed, resulting in a failure of a normal synchro-flash photography. Specifically, when a higher shutter speed than the flash synchronized shutter speed is used a focal plane shutter does not fully open and while a slit formed by first and second shutter blinds is running in front of a film surface only part of the film surface is exposed to flashlight so that a uniform exposure over the entire film surface can not be expected.

To overcome this disadvantage, there has already been provided an electronic flash unit which emits a continuous flash of constant intensity (a characteristic curve $S_1$ in FIG. 1) while the slit is running in front of the film surface (hereinafter referred to as a static flat flash type electronic flash unit).

The static flat flash type electronic flash unit, which, for example, is disclosed in Japanese Laid-Open Patent Application No. 129327/1980, has a basic circuitry in which a serially connected circuit of a flash discharge tube, an inductor and a switching element is connected across a main capacitor in which flash emission energy is stored and a diode is connected in parallel with a series circuit formed by the discharge tube and the inductor. When a flashlight intensity of the discharge tube decreases below a predetermined level by monitoring the flashlight intensity the switching element turns on and when the flashlight intensity exceeds the predetermined level the switching element turns off so that the flash emission can be continued at a substantially constant light intensity. However, the conventional static flat flash type electronic flash unit should be so controlled that flashlight emitted from the discharge tube is maintained at an intermediate intensity between a preset upper limit of flashlight intensity and a lower limit thereof extremely close to the upper limit. Accordingly, an extremely precise comparator is required and the necessary circuitry is complicated. Moreover, there is a possibility of malfunction.

In addition, the on-off control of the switching element is performed, with an impedance element such as a resistor connected in series with the discharge tube, by detecting a discharge current of the discharge tube which also flows through the impedance element and controlling a flashlight intensity based on a current value is thus detected. Accordingly, loss in the discharge current is caused by the impedance element, as well as an accompanying loss in a quantity of the emitted flashlight. This results in that a change in the flashlight intensity does not accord with that in the discharge current so that it is impossible to effect a precise flash control.

In addition, when the flashlight intensity is controlled based on a voltage value at a terminal of the discharge tube which is detected directly, the detected terminal voltage fluctuates as the switching element turns on and off, so that it is difficult to effect a precise flash control. When a coil for preventing an overcurrent is added in series with the discharge tube, an increased oscillating voltage is produced by turning on and off the switching element.

In addition, the conventional static flat flash type electronic flash unit is for an exclusive use in the flat flashlight emission and is not used for a normal electronic flash, especially an automatic flash control type electronic flash unit.

The conventional static flat flash type electronic flash unit has an opening on part of a reflecting shade for illuminating a predetermined portion of an object to be photographed by flashlight, on which opening a photoelectric transducer element such as a photodiode and a phototransistor is arranged so that a flashlight intensity of the discharge tube can be detected based on an output signal of the transducer element. However, since the output signal of the transducer element is of an extremely low level, an electric circuit for dealing with the output signal is susceptible to extraneous noises, resulting in malfunctions by a trigger signal of a high voltage which triggers the discharge tube. The high voltage trigger signal is transmitted through a stray capacity and the like to the transducer element and hence there is a possibility of causing deterioration of the transducer element and malfunctions.

With the conventional static flat flash type electronic flash unit, a quantity of emitted flashlight is made variable, as disclosed in Japanese Patent Publication No. 40421/1973, by changing a voltage across terminals of the discharge tube. However, since variation in flashlight intensity with respect to the voltage across the discharge tube terminals is nonlinear, a complicated adjustment circuit is required.

On the other hand, as for a light quantity of the artificial illumination for photography, a guide number (GN) with a film speed value 100 in ISO is used as the common numerical value. Although there are various theories on a coefficient correction between a guide number and a flashlight quantity L (cd.s), the following relation holds in principle;

$$GN = K\sqrt{L}$$

where K represents a correction coefficient. However, when a slit exposure is effected with a camera employing a focal plane shutter, only part of a flashlight quantity contributes to an actual exposure of a film surface so that a GN value is not properly indicated as the total flashlight quantity.

Accordingly, it is necessary to deal with only part of the flashlight quantity which contributes to actual exposure of the film surface through a slit as an effective guide number GNe with a film speed ISO 100. However, since the effective guide number GNe varies with a slit exposure time or a slit width as a parameter, a photographer should bear this in mind while taking a picture. In addition, when an aperture-priority automatic exposure camera is used, an exposure time automatically varies in accordance with brightness of an object to be photographed and an effective guide number GNe varies accordingly.

SUMMARY OF THE INVENTION

It is an object of the present invention, in view of the above-mentioned circumstances, to provide a flat flash emission type electronic flash unit whose flash characteristics are substantially equivalent to those of a conventional static flash type electronic flash unit by controlling a flash discharge tube so as to repeatedly emit pulse flashes (characteristic curve $S_2$ in FIG. 1) (hereinafter referred to as a dynamic flat flash type electronic flash unit).

It is another object of the present invention to provide a dynamic flat flash type electronic flash unit which has a simple circuit construction and necessitates no high accuracy in the on-off control of a main switching element It is a further object of the present invention to provide a dynamic flat flash type electronic flash unit which permits an actual guide number of flat flashlight to be variable easily and accurately.

It is a still further object of the present invention to provide a dynamic flat flash type electronic flash unit which enables an effective guide number to be constant irrespective of a change in a shutter speed of a camera.

According to the present invention, a quantity of flashlight substantially equivalent to that which is emitted from a conventional static flat flash type electronic flash unit can be obtained by emitting intermittent pulse flashes so that a slit exposure of a focal plane shutter is made possible and a quantity of flashlight can be easily controlled with a comparatively simple circuit construction.

According to the present invention, a change in flashlight intensity of a flash discharge tube is detected in terms of a change in voltage of a main capacitor so that an adverse effect is not caused by a flash trigger signal of a high voltage.

In addition, the on-off control of the discharge tube is not effected within a very reduced range between the upper and lower limits as in a conventional static flat flash type electronic flash unit so that a circuit construction is simplified and there is no necessity for using an expensive voltage comparator of high accuracy.

Since an interval between pulse flashes and intensity of flashlight can be controlled only by switching either resistors or capacitors, it is possible to easily change an effective guide number.

According to the present invention, since a definite quantity of exposed flashlight (effective guide number) can be obtained over a total (slit) exposure time by changing either a quantity of a pulse flash or an interval between pulse flashes or both in accordance with a predetermined shutter speed, there is no necessity for conducting such a troublesome operation such as in a conventional flash unit that determines an effective guide number by calculation using a shutter speed since an effective guide number varies whenever a shutter speed is changed. Also, it is effectively and easily applicable to the aperture-priority automatic exposure camera.

A dynamic flat flash type electronic flash unit of the present invention comprises a flash control circuit which initiates its operation with the flash emission of a discharge tube, produces an output of a flash termination signal by detecting the fact that a value associated with a pulse flash such as a charged voltage on a main capacitor and a quantity of flashlight emitted from the discharge tube reaches a predetermined level and produces a flash resumption signal within a period of time less than the deionization time of the discharge tube after the flash termination signal has been produced, whereby flash characteristics equivalent to a continuous flash can be obtained by repeating a pulse flash emission from the discharge tube over an exposure time of a shutter.

A dynamic flat flash type electronic flash unit of the present invention further includes means for switching a predetermined level such as a charged voltage on a main capacitor and a quantity of flashlight so as to change an actual guide number of flashes easily and accurately.

Further, a dynamic flat flash type electronic flash unit of the present invention permits a quantity of flashlight per pulse and/or an interval between pulse flashes to be changed based on information for a predetermined exposure time (F) so as to maintain an effective guide number constant irrespective of the length of exposure time.

BRIEF DESCRIPTION OF THE DRAWINGS

FIG. 11 is a circuit diagram showing a modification of the control circuit shown in FIG. 5;

FIG. 16 is a diagram showing signal waveforms for explaining an operation of a flat flash mode in the dynamic flat flash type electronic flash unit according to the second embodiment shown in FIGS. 14 and 15;

FIG. 17 is a flow chart showing an operation of the flat flash mode in the dynamic flat flash type electronic flash unit according to the second embodiment;

FIGS. 23A and 23B are diagrams showing signal waveforms for explaining an operation of the time setting circuit shown in FIG. 22;

FIG. 47 is a circuit diagram of a total flash time decision circuit in the control circuit shown in FIG. 42;

DESCRIPTION OF THE PREFERRED EMBODIMENTS

Prior to description of the present invention, how much a flash interval between intermittent pulse flashes according to the present invention can be practically extended in connection with a slit exposure time will be described.

Assuming that a slit exposure time is t and a flash interval is P, the number of flash pulses n for a time t is given as follows:

$$n = t/P \qquad (1)$$

For the purpose of simplifying the theoretical equation, assuming that a flash time duration for each pulse flash is zero, the number of pulse flashes n takes an integer so that the following can be formulated.

When t/P is an integer:

$$n = [t/P] \qquad (2)$$

When t/P is not an integer:

$$n = [t/P] \text{ or } n = [t/P] + 1 \tag{3}$$

where the Gauss' notation [a] indicates the maximum integer not exceeding a real number a.

Figure 1:
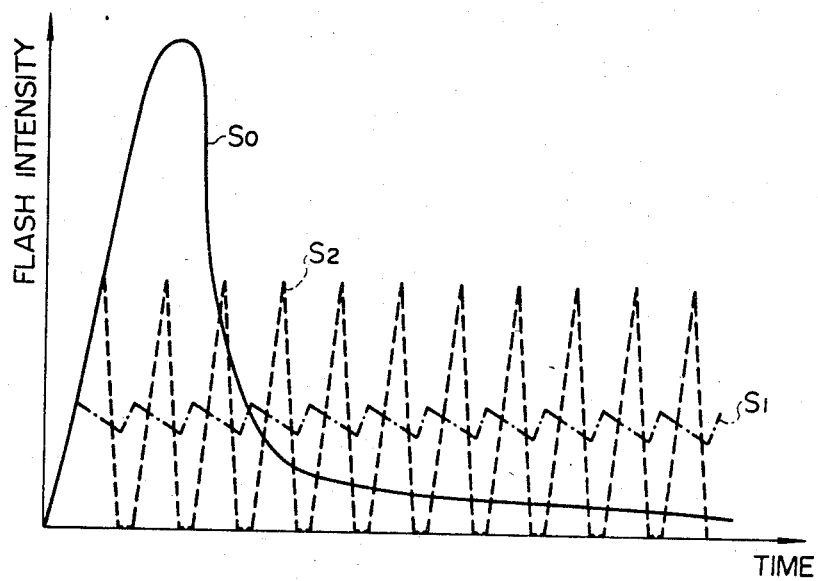
FIG. 1 is a diagram showing the characteristics of flashlight intensity with a conventional electronic flash unit and with a dynamic flat flash type electronic flash unit of the present invention.
Figure 2:
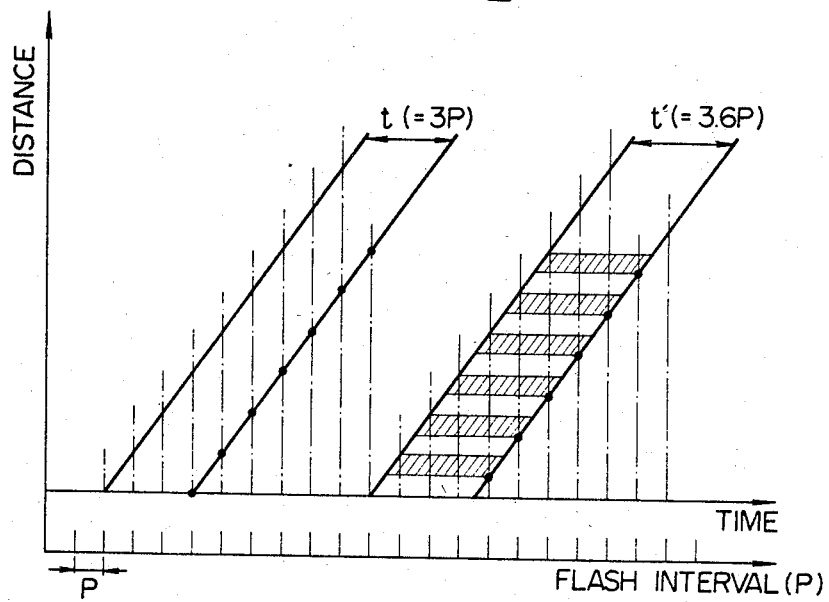
FIG. 2 is a diagram showing the relationship between a flash interval and a slit width of a focal plane shutter in the dynamic flat flash type electronic flash unit of the present invention.

The equations (2) and (3) will be explained according to FIG. 2. It will be noted that a hatched portion of an exposure time in FIG. 2 represents $[t/P]+1$ (=4) and a non-hatched portion is exposed by pulse flashes of $[t/P]$(=3). In addition, since the flash time width is zero as described above, one of the front and rear intersecting points in the hatched exposure portion in FIG. 2 is not considered in counting.

When the number n is an integer such as t/P=3, it is possible to obtain a uniform exposure over the entire picture surface. However, when the number n is not an integer such as t/P=3.6, there may be two cases that, as can be seen from the diagram of t' (=3.6 P) shown in FIG. 2, exposures of n=3 and n=4 are given depending upon a portion of the picture surface.

As is noted from FIG. 2, when an ideal slit exposure which is uniform over the entire picture surface is considered, a uniform illumination effect can be obtained by selecting the flash interval P as a divisor of a slit exposure time t and therefore the maximum value of the flash interval P can be the time t. As is well known, however, in an actual focal plane shutter, the differences between running characteristics of first and second shutter blinds causes variations in an exposure time at each portion of the picture surface. Now, considering a focal plane shutter having a nominal exposure time T which is assured that its unevenness of exposure is ±d step, an actual exposure time with this shutter ranges from $2^{-d} \times T$ (the minimum value) to $2^d \times T$ (the maximum value) at the maximum at any picture portion. Accordingly, when a flash interval is P, it will be understood from the foregoing that the number of pulse flashes emitted within each of the limit time duration is given as follows:

the minimum value ... $\left[\dfrac{2^{-d} \times T}{P}\right]$ or $\left[\dfrac{2^{-d} \times T}{P}\right] + 1$ the maximum value ... $\left[\dfrac{2^d \times T}{P}\right]$ or $\left[\dfrac{2^d \times T}{P}\right] + 1$ When a difference between these values and a reference value [T/P] is considered in the worst condition, it assumes a small value for the minimum value and a large value for the maximum value, resulting in the following equations.

A difference in step between the minimum value and the reference value is $$\Delta S_1 = \log_2 \dfrac{\left[\dfrac{2^{-d} \times T}{P}\right]}{\left[\dfrac{T}{P}\right]} \tag{4}$$

A difference in step between the maximum value and the reference value is $$\Delta S_2 = \log_2 \dfrac{\left[\dfrac{2^d \times T}{P}\right] + 1}{\left[\dfrac{T}{P}\right]} \tag{5}$$

For the purpose of simplifying the equations, when a flash interval P is equal to a divisor of the nominal exposure time T, T/P is always an integer, that is, T/P=n (integer). At this time, the equations (4) and (5) are respectively expressed as follows:

$$\Delta S_1 = \log_2 \dfrac{[2^{-d} \times n]}{n} \tag{4}'$$

$$\Delta S_2 = \log_2 \dfrac{[2^d \times n] + 1}{n} \tag{5}'$$

Further, when these values are subtracted by respective inherent variations in exposure time, that is, ±d step, variations in exposure value $\Delta EV_1(n)$ and $\Delta EV_2(n)$ which are added by flashlight can be calculated as follows.

$$\Delta EV_1(n) = \log_2 \dfrac{[2^{-d} \times n]}{n} - (-d) \tag{6}$$

$$\Delta EV_2(n) = \log_2 \dfrac{[2^d \times n]}{n} - d \tag{7}$$

Figure 3:
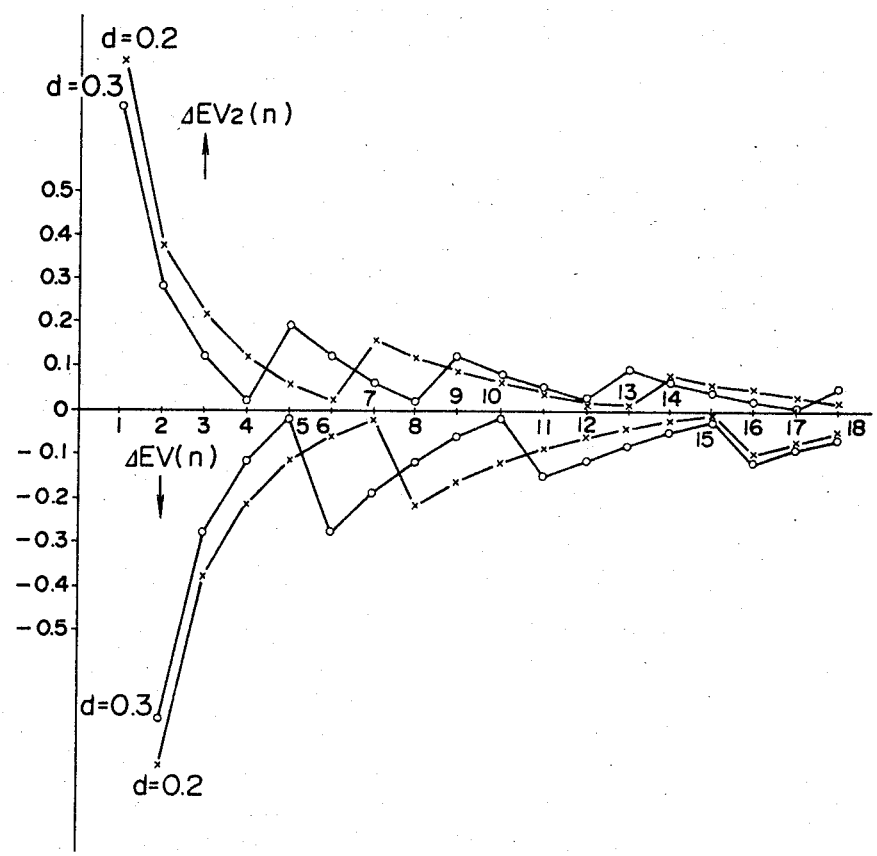
FIG. 3 is a diagram showing unevenness of exposure of a focal plane shutter in the dynamic flat flash type electronic flash unit of the present invention.

When the equations (4)' and (5)' are calculated by substituting 0.1, 0.2 and 0.3 for the inherent value d for each shutter, Tables 1, 2 and 3 will be derived. The characteristics which are represented graphically by calculating the equations (6) and (7) are shown in FIG. 3. In Tables 1, 2 and 3, P=1024, 512, 256, 128, ... are exact values corresponding to the commonly designated shutter speeds 1/1000, 1/500, 1/250, 1/125... As will be noted from Tables 1 to 3 and FIG. 3, when an allowable increment of the variation during flash photography is 0.1, a flash interval P which meets the number of flashes n=T/P=10 may be selected. When the allowable increment is 0.2, a flash interval P which meets T/P=n=4 may be selected. Since the more the number of pulses which are included within an exposure time T, the less the increment, it will be understood that an exposure time T may assume its nominal maximum time.

Specifically, in a camera having a commonly designated maximum shutter speed 1/1000 (the term "shutter speed" is indicated hereinafter by a commonly designated time) which is assured that its unevenness of exposure is within 0.2 EV, when it is desired that the increment be suppressed to 0.1 EV, the allowable maximum flash interval is obtained such that a flash interval P which is set to 1/1000/P=10, namely, P=1/10000.

When the increment is allowable up to 0.2 EV, the allowable flash interval P is up to 1/4000. These values are achievable with sufficient allowance according to techniques of the present invention.

When a flash pulse interval P is selected as described above, this will result in a substantially uniform exposure.

TABLE 1

| P | n | No. of flashes in maximum exposure time | ΔS₁ | No. of flashes in minimum exposure time | ΔS₂ |
|---|---|---|---|---|---|
| 1024 | 1 | 2 | 1 | 0 | — |
| 512 | 2 | 3 | +0.58 | 1 | −1 |
| 341 | 3 | 4 | +0.42 | 2 | −0.58 |
| 256 | 4 | 5 | +0.32 | 3 | −0.42 |
| 204.8 | 5 | 6 | +0.26 | 4 | −0.32 |
| 170.7 | 6 | 7 | +0.22 | 5 | −0.26 |
| 146.3 | 7 | 8 | +0.19 | 6 | −0.22 |
| 128 | 8 | 9 | +0.17 | 7 | −0.19 |
| 113.8 | 9 | 10 | +0.15 | 8 | −0.17 |
| 102.4 | 10 | 11 | +0.14 | 9 | −0.15 |
| 93.1 | 11 | 12 | +0.13 | 10 | −0.14 |
| 85.3 | 12 | 13 | +0.12 | 11 | −0.13 |
| 78.8 | 13 | 14 | +0.11 | 12 | −0.12 |
| 73.1 | 14 | 16 | +0.19 | 13 | −0.11 |
| 68.3 | 15 | 17 | +0.18 | 13 | −0.21 |
| 64 | 16 | 18 | +0.17 | 14 | −0.19 |
| 60.2 | 17 | 19 | +0.16 | 15 | −0.18 |
| 56.9 | 18 | 20 | +0.15 | 16 | −0.17 |
| 53.9 | 19 | 21 | +0.14 | 17 | −0.16 |

TABLE 2

| P | n | No. of flashes in maximum exposure time | ΔS₁ | No. of flashes in minimum exposure time | ΔS₂ |
|---|---|---|---|---|---|
| 1024 | 1 | 2 | 1 | 0 | — |
| 512 | 2 | 3 | +0.58 | 1 | −1 |
| 341 | 3 | 4 | +0.42 | 2 | −0.58 |
| 256 | 4 | 5 | +0.32 | 3 | −0.42 |
| 204.8 | 5 | 6 | +0.26 | 4 | −0.32 |
| 170.7 | 6 | 7 | +0.22 | 5 | −0.26 |
| 146.3 | 7 | 9 | +0.36 | 6 | −0.22 |
| 128 | 8 | 10 | +0.32 | 6 | −0.42 |
| 113.8 | 9 | 11 | +0.28 | 7 | −0.36 |
| 102.4 | 10 | 12 | +0.26 | 8 | −0.32 |
| 93.1 | 11 | 13 | +0.24 | 9 | −0.29 |
| 85.3 | 12 | 14 | +0.22 | 10 | −0.26 |
| 78.8 | 13 | 15 | +0.21 | 11 | −0.24 |
| 73.1 | 14 | 17 | +0.28 | 12 | −0.22 |
| 68.3 | 15 | 18 | +0.26 | 13 | −0.21 |
| 64 | 16 | 19 | +0.25 | 13 | −0.30 |
| 60.2 | 17 | 20 | +0.23 | 14 | −0.28 |
| 56.9 | 18 | 21 | +0.22 | 15 | −0.26 |
| 53.9 | 19 | 22 | +0.21 | 16 | −0.25 |

TABLE 3

| P | n | No. of flashes in maximum exposure time | ΔS₁ | No. of flashes in minimum exposure time | ΔS₂ |
|---|---|---|---|---|---|
| 1024 | 1 | 2 | +1 | 0 | — |
| 512 | 2 | 3 | +0.58 | 1 | −1 |
| 341 | 3 | 4 | +0.42 | 2 | −0.58 |
| 256 | 4 | 5 | +0.32 | 3 | −0.42 |
| 204.8 | 5 | 7 | +0.49 | 4 | −0.32 |
| 170.7 | 6 | 8 | +0.42 | 4 | −0.58 |
| 146.3 | 7 | 9 | +0.36 | 5 | −0.49 |
| 128 | 8 | 10 | +0.32 | 6 | −0.42 |
| 113.8 | 9 | 12 | +0.42 | 7 | −0.36 |
| 102.4 | 10 | 13 | +0.38 | 8 | −0.32 |
| 93.1 | 11 | 14 | +0.35 | 8 | −0.45 |
| 85.3 | 12 | 15 | +0.32 | 9 | −0.42 |
| 78.8 | 13 | 17 | +0.39 | 10 | −0.38 |
| 73.1 | 14 | 18 | +0.36 | 11 | −0.35 |
| 68.3 | 15 | 19 | +0.34 | 12 | −0.32 |
| 64 | 16 | 20 | +0.32 | 12 | −0.42 |
| 60.2 | 17 | 21 | +0.30 | 13 | −0.39 |
| 56.9 | 18 | 23 | +0.35 | 14 | −0.36 |
| 53.9 | 19 | 24 | +0.34 | 15 | −0.34 |

Referring now to FIGS. 4 to 10, a dynamic flat flash type electronic flash unit according to a first embodiment of the present invention will be described.

The electronic flash unit of this type has two functions, a dynamic flat flash mode and a continuous flash mode. A main circuit 100 includes a booster power supply 1 comprising a well known DC-DC converter. A negative pole output terminal of the power supply 1 is connected to a negative pole voltage supply line $l_0$ and is grounded. A positive pole output terminal of the power supply 1 is connected through a diode 2 for rectification to a positive pole voltage supply line $l_1$. Between both lines $l_0$, $l_1$, a main capacitor 3 for flashlight emission and a voltage divider composed of a series combination of resistors 4, 5 from the junction between which monitor voltage signal M is derived. Also, between both lines $l_0$, $l_1$, a charge completion detector circuit composed of a series combination of a resistor 6 and a neon lamp 7 is connected. The junction between the resistor 6 and the neon lamp 7 is connected through a trigger capacitor 8 and a primary coil of a trigger transformer 9 to the line $l_0$. The junction between the trigger capacitor 8 and the resistor 6 is connected to the anode of a thyristor 10 for the purpose of triggering. The cathode of the thyristor 10 is connected to the line $l_0$ and the gate thereof is connected through a resistor 11 to the line $l_0$. The gate of the thyristor 10 is supplied with a flash trigger signal A through a resistor 12 and a capacitor 13. The secondary coil of the transformer 9 has one end connected to the line $l_0$ and the other end connected to a trigger electrode of a flash discharge tube 14 such as a xenon discharge tube. One electrode of the discharge tube 14 is connected to the line $l_1$. A series circuit combining a resistor 15, a commutation capacitor 16 and a resistor 17 is connected between the lines $l_0$, $l_1$. A thyristor 18 is provided for rapid charging of the commutation capacitor 16. The thyristor 18 has the anode connected to the line $l_1$, the cathode connected to the junction between the resistor 15 and the capacitor 16 and the gate connected through a resistor 19 to the cathode thereof. A rapid charging signal D is supplied through a resistor 20 and a capacitor 21 to the gate of the thyristor 18. The cathode of the thyristor 18 is connected to the anode of a thyristor 22 for commutation. The cathode of the thyristor 22 is connected to the line $l_0$. The gate of the thyristor 22 is connected through a resistor 23 to the line $l_0$ and through a resistor 24 and a capacitor 25 to an output terminal of an OR gate 26. The OR gate 26 has two input terminals to which flash termination signals $C_1$, $C_2$ of two channels are applied, respectively.

The other electrode of the discharge tube 14 is connected to the junction between the capacitor 16 and the resistor 17 and to the anode of a main thyristor 27. The thyristor 27 has the cathode connected to the line $l_0$ and the gate connected through a resistor 28 to the line $l_0$. The gate of the thyristor 27 is further connected through a resistor 29 and a capacitor 30 to an output terminal of an OR gate 31. Two input terminals of the OR gate 31 are supplied with a flash initiation signal $B_1$ and a flash resumption signal $B_2$, respectively.

The main circuit 100 thus constructed is connected to a control circuit 200 which will be described with reference to FIG. 5. The control circuit 200 comprises a flash interval setting circuit 201, a monitor circuit 202 and a photometric circuit 203.

Figure 5:
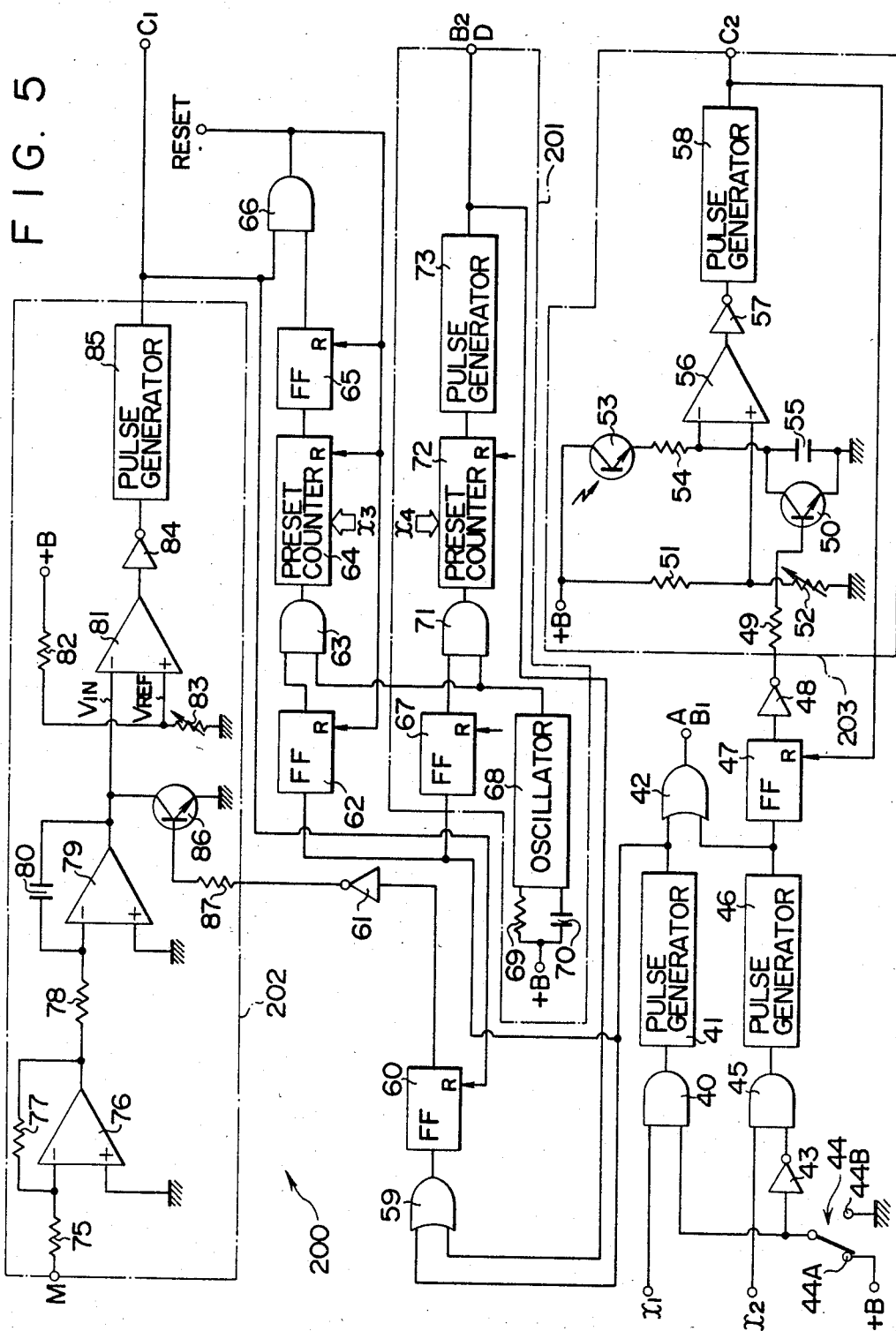
FIG. 5 is a diagram showing a control circuit connected to the main circuit shown in FIG. 4.

An AND gate 40 in FIG. 5 has one input terminal to which a flat flash initiation signal $x_1$ from a camera body (not shown) is supplied and an output terminal connected to an input terminal of a pulse generator 41. The pulse generator 41 produces signal pulses of a high level (hereinafter referred to as the H level) and a predetermined pulse width when an input signal of the AND gate 40 rises from a low level (hereinafter referred to as the L level) to the H level. An output terminal of the pulse generator 41 is connected to one input terminal of an OR gate 42. The OR gate 42 produces a flash trigger signal A and a flash initiation signal $B_1$. The other input terminal of the AND gate 40 is connected to an input terminal of an inverter 43 and a movable contact terminal of a mode changeover switch 44. The switch 44 has a first fixed contact terminal 44A connected to a terminal to which an operation voltage +B is applied and a second fixed contact terminal 44B connected to the ground.

An AND gate 45 has one input terminal to which a continuous flash initiation signal $x_2$ from the camera body (not shown) is applied and the other input terminal connected to an output terminal of the inverter 43. An output terminal of the AND gate 45 is connected to an input terminal of a pulse generator 46 similar to the pulse generator 41. An Output terminal of the pulse generator 46 is connected to the other input terminal of the OR gate 42 and to a set input terminal of an RS type flipflop circuit 47 (hereinafter referred to as FF circuit). An output terminal of the FF circuit 47 is connected through an inverter 48 and a resistor 49 to the base of an NPN type switching transistor 50. A series combination of a resistor 51 and a variable resistor 52 which is set based on a film speed, a diaphragm aperture and the like and a series combination of the collector-emitter path of an NPN type phototransistor 53, a resistor 54 and an integration capacitor 55 are both connected between a terminal to which the operation voltage +B is applied and the ground. The junction between the resistor 51 and the variable resistor 52 is connected to a non-inverting input terminal of an operational amplifier 56 which forms a voltage comparator. The inverting input terminal of the amplifier 56 is connected to the junction between the resistor 54 and the capacitor 55. The collector and emitter of the transistor 50 are connected across the capacitor 55.

An output terminal of the amplifier 56 is connected through an inverter 57 to an input terminal of a pulse generator 58 similar to the pulse generator 41. An output terminal of the pulse generator 58 connected to a reset input terminal of the FF circuit 47 produces a flash termination signal $C_2$.

An output terminal of the pulse generator 41 is connected to one input terminal of an OR gate 59. An output terminal of the OR gate 59 is connected to a set input terminal of an FF circuit 60. An output terminal of the FF circuit 60 is connected to an input terminal of an inverter 61. In addition, the output terminal of the pulse generator 41 is connected to set input terminals of FF circuits 62, 67. An output terminal of the FF circuit 62 is connected to one input terminal of an AND gate 63. An output terminal of the AND gate 63 is connected to a count input terminal of a preset counter 64. An output terminal of the preset counter 64 is connected to a set input terminal of an FF circuit 65. An output terminal of the FF circuit 65 is connected to one input terminal of an AND gate 66. An output terminal of the AND gate 66 is connected to reset input terminals of the FF circuits 62, 65 and the preset counter 64 and supplies a reset signal RESET for resetting all the control circuit 200.

In the preset counter 64, a value $x_3$ based on a total flash time $U_1$ (see FIG. 6) in the dynamic flat flash mode is preset, which time $U_1$ is set to a period of time more than that from initiation of film exposure by starting running of a first shutter blind to the termination of the film exposure upon completion of running of a second shutter blind. The other input terminal of the AND gate 66 is connected to a reset input terminal of the FF circuit 60. The other input terminal of the AND gate 63 is connected to an output terminal of an oscillator 68. A resistor 69 and a capacitor 70 for setting an oscillation frequency are connected between the oscillator 68 and a terminal to which the operation voltage +B is applied. An output terminal of the oscillator 68 is connected to one input terminal of an AND gate 71. The other input terminal of the AND gate 71 is connected to an output terminal of an FF circuit 67. An output terminal of the AND gate 71 is connected to an input terminal of a preset counter 72. An output terminal of the preset counter 72 is connected to an input terminal of a pulse generator 73 similar to the pulse generator 41. An output terminal of the pulse generator 73 delivers a flash resumption signal $B_2$ and a rapid charging signal D.

A value $x_4$ based on a flash interval $U_2$ (FIG. 6) from initiation of a previous pulse flash to resumption of the next pulse flash in the dynamic flat flash mode is preset to the preset counter 72. The flash interval $U_2$ is set based on a shutter speed and the like. The preset counter 72 generates a one-shot pulse when counting up to the value $x_4$ to resume its counting. The output terminal of the pulse generator 73 is further connected to the other input terminal of the OR gate 59.

A resistor 75 to which a monitor voltage signal M from the main circuit 100 is applied is connected to an inverting input terminal of an operational amplifier 76 which forms an inverting amplifier circuit. A resistor 77 is connected between the inverting input terminal of the amplifier 76 and an output terminal thereof. A non-inverting input terminal of the amplifier 76 is grounded. The output terminal of the amplifier 76 is further connected through a resistor 78 for integration to an inverting input terminal of an operational amplifier 79 which forms an integration circuit. A capacitor 80 for integration is connected between the inverting input terminal of the amplifier 79 and an output terminal thereof. A non-inverting input terminal of the amplifier 79 is grounded. The output terminal of the amplifier 79 is further connected to an inverting input terminal of an operational amplifier 81 which forms a voltage comparator. A voltage divider comprising a resistor 82 and a variable resistor 83 is provided between a terminal to which the operation voltage +B is applied and the ground. The junction between the resistors 82, 83 is connected to a non-inverting input terminal of the amplifier 81. The variable resistor 83 is a resistor which is set in accordance with a shutter speed and the like. An output of the amplifier 81 is connected through an inverter 84 and a pulse generator 85 to the other input terminal of the AND gate 66 and a reset input terminal of the FF circuit 60. The pulse generator 85 delivers a flash termination signal $C_1$. An NPN type switching transistor 86 has the collector connected to the output terminal of the amplifier 79, the emitter grounded and the base connected through a resistor 87 to an output terminal of the inverter 61.

An operation of the dynamic flat flash type electronic flash unit of the above construction will be described with reference to FIGS. 6 to 10.

In the dynamic flat flash mode, in which the movable contact terminal of the switch 44 is switched to the first fixed contact terminal 44A, the operation voltage +B is supplied to the other input terminal of the AND gate 40 to open its gate. Also, an output of the L level is supplied through the inverter 43 to the other input terminal of the AND gate 45 to close its gate. Accordingly, a flat flash initiation signal $x_1$ from a camera body is inputted and a continuous flash initiation signal $x_2$ is not inputted. When the flat flash initiation signal $x_1$ rises to the H level, an output of the AND gate 40 turns to the H level and a one-shot pulse of the H level is produced from the pulse generator 41. The one-shot pulse of the H level is applied as a flash trigger signal A (FIG. 6) through the OR gate 42 and the series combination of the capacitor 13 and the resistor 12 to the gate of the trigger thyristor 10 (FIG. 4) to render it conductive. Thereby, the trigger capacitor 8 is short-circuited through the primary coil of the trigger transformer 9. A discharge current by the charge on the capacitor 8 flows through the primary coil of the transformer 9 to generate a high voltage in the secondary coil thereof. This high voltage is applied to the trigger electrode of the discharge tube 14 to energize it. At the same time, the one-shot pulse of the H level which is produced from the pulse generator 41 (FIG. 5) is applied as a flash initiation signal $B_1$ (FIG. 6) through the OR gate 42 and through the OR gate 31, the capacitor 30 and the resistor 29 to the main thyristor 27 to render it conductive. Thereby, the charge on the main capacitor 3 is discharged through the discharge tube 14 in the energized condition and the anode-cathode path of the main thyristor 27 to permit the discharge tube 14 to initiate flash emission (see FIG. 8). In addition, at the same time, the one-shot pulse of the H level which is produced from the pulse generator 41 shown in FIG. 5 sets the FF circuit 60 through the OR gate 59 to turn an output of the FF circuit 60 to the H level. Since this H level output is inverted to the L level by the inverter 61, the transistor 86 turns off.

In addition, since the FF circuit 62 is set by the one-shot pulse of the H level which is produced from the pulse generator 41, an output of the FF circuit 62 is inverted to the H level. The AND gate 63 is in turn opened to allow output pulses of the oscillator 68 to be sent to the preset counter 64, initiating counting of a total flash time $U_1$.

In addition, since the FF circuit 67 is set by the one-shot pulse of the H level which is produced from the pulse generator 41, an output of the FF circuit 67 is inverted to the H level. The AND gate 71 is in turn opened to allow output pulses of the oscillator 68 to be sent to the preset counter 72, initiating counting of a flash interval $U_2$ (see FIG. 8).

On the other hand, a monitor voltage signal M which is produced by dividing a voltage of the main capacitor 3 by the resistors 4, 5, is inverted and amplified in the amplifier 76 which forms an inverting amplifier. The inverted and amplified voltage signal is integrated with a time constant which is determined by the resistor 78 and the capacitor 80. At this time, an output voltage of the amplifier 79 is applied as a comparison voltage $V_{IN}$ to an inverting input terminal of the amplifier 81 which forms a voltage comparator and is compared with a reference voltage $V_{REF}$ which is produced by dividing the operation voltage +B by the resistor 82 and the variable resistor 83. When the voltage of the main capacitor 3 is high, as shown by a characteristic curve a in FIG. 7, a time $t_1$ until the comparison voltage $V_{IN}$ reaches the reference voltage $V_{REF}$ is reduced. When the voltage of the main capacitor 3 is low, as shown by a characteristic curve b in FIG. 7, a time $t_2$ until the comparison voltage $V_{IN}$ reaches the reference voltage $V_{REF}$ is increased. When the comparison voltage $V_{IN}$ exceeds the reference voltage $V_{REF}$, namely, $V_{IN} \geq V_{REF}$, an output of the operational amplifier 81 turns to the L level. When the L level output of the amplifier 81 is inverted by the inverter 84 to the H level, a one-shot pulse is produced at an output terminal of the pulse generator 85. This H level pulse is applied as a flash termination signal $C_1$ through the OR gate 26, the capacitor 25 and the resistor 24 to the commutation thyristor 22 to render it conductive. When the thyristor 22 becomes conductive, the anode-cathode path of the main thyristor 27 is reversely biased by the charge on the commutation capacitor 16 so that the thyristor 27 is rendered non-conductive. In addition, when the flash termination signal $C_1$ rises to the H level, the FF circuit 60 is reset. Accordingly, an output of the FF circuit 60 is inverted to the L level and the transistor 86 turns on. Thereby, the inverting input terminal of the operational amplifier 81 is forcedly turned to the ground level and the monitor circuit 202 which detects a monitor voltage signal M is disabled.

When counting of the number of counts corresponding to the flash interval $U_2$ by the preset counter 72 is completed, an output of the preset counter 72 turns to the H level and pulses of the H level are in turn produced at an output terminal of the pulse generator 73. These H level pulses are applied as a flash resumption signal $B_2$ through the OR gate 31, the capacitor 30 and the resistor 29 to the gate of the main thyristor 27 to render it conductive. When the main thyristor 27 becomes conductive, the discharge tube 14 is refired. At the same time, since the flash resumption signal $B_2$ of the H level pulse sets the FF circuit 60 through the OR gate 59, an output of the FF circuit 60 is inverted to the H level and an output of the inverter 60 turns to the L level to turn the transistor 86 off. Accordingly, an operation of integrating the monitor voltage signal M is resumed by the operational amplifier 79 in the same way as the foregoing.

Figure 6:
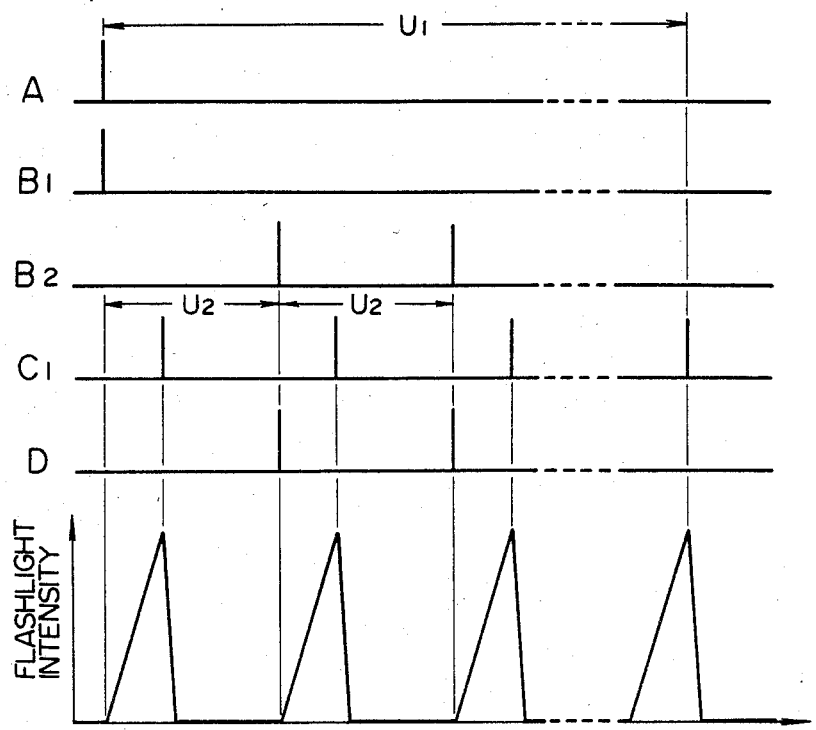
FIG. 6 is a diagram showing signal waveforms for explaining an operation of a flat flash mode in the dynamic flat flash type electronic flash unit according to the first embodiment shown in FIGS. 4 and 5.
Figure 7:
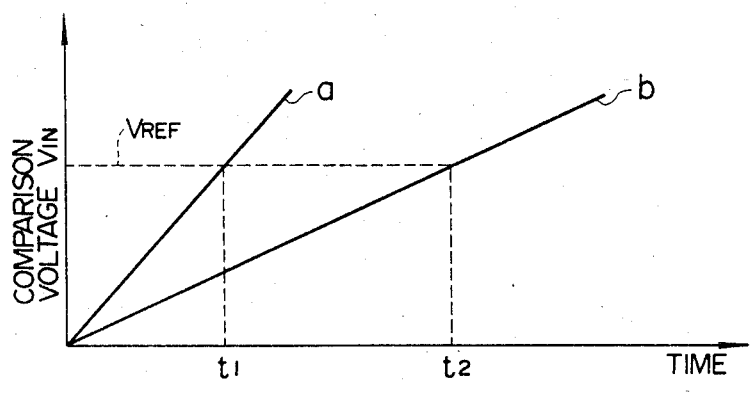
FIG. 7 is a diagram for explaining an operation of a monitor circuit shown in FIG. 5.
Figure 8:
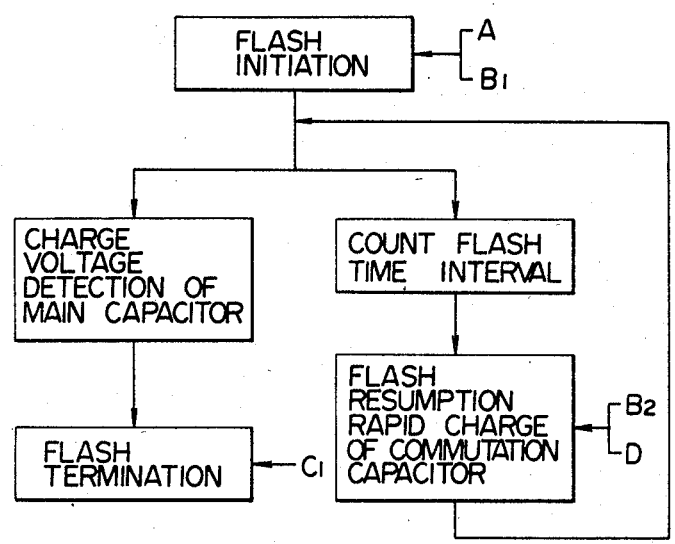
FIG. 8 is a flow chart showing an operation of the flat flash mode with the dynamic flat flash type electronic flash unit according to the first embodiment.

The flash resumption signal $B_2$ of the H level pulse is applied as a rapid charging signal D of the H level pulse through the capacitor 21 and the resistor 20 to the gate of the thyristor 18 to render it conductive. Thereby, the commutation capacitor 16 is rapidly charged in an extremely short time via the main path from the line $l_1$ through the anode-cathode path of thyristor 18, the commutation capacitor 16 and the anode-cathode path of main thyristor 27 to the line $l_0$. When the charging of the capacitor 16 is completed, a current to the thyristor 18 becomes less than its holding current to render it non-conductive. When an output voltage of the operational amplifier 79, that is, the comparison voltage $V_{IN}$, exceeds the reference voltage $V_{REF}$, an output of the operational amplifier 81 is inverted to the L level. In turn, an output of the inverter 84 turns to the H level and a flash termination signal $C_1$ of the H level pulse is produced from the pulse generator 85 in the same way as the foregoing. Similarly, since a flash resumption signal $B_2$ and a rapid charging signal D are H level pulses, the intensity of flashes emitted from the discharge tube 14 exhibits the intermittent triangular waveform as shown in FIG. 6.

When counting of the number of counts corresponding to a total flash time $U_1$ by the preset counter 64 is completed, the FF circuit 65 is set and an output thereof is inverted to the H level. As a result, when a flash termination signal $C_1$ of the H level pulse is produced after completion of the counting, the signal $C_1$ is derived as a reset signal RESET from the AND gate 66. When the reset signal RESET is produced, it resets the FF circuit 62, the preset counter 64 and the FF circuit 65 and simultaneously all other circuits. Thus, a series of the dynamic flat flash operations is completed.

In the foregoing flat flash mode, in which the movable contact terminal of the switch 44 is switched to the first fixed terminal 44A, the other input terminal of the AND gate 45 is at the L level and the gate of the AND gate 45 is closed with the result that circuits downstream from the pulse generator 46 has no effect even when a continuous flash initiation signal $x_2$ is delivered from a camera. At the same time, since an output of the inverter 48 is at the H level, the transistor 50 turns on without fail so that there is no possibility that the flash termination signal $C_2$ is produced from the photometric circuit 203.

When the movable contact terminal of the switch 44 is switched to the second fixed terminal 44B and thus the continuous flash mode is selected with the above electronic flash unit, the other input terminal of the AND gate 40 is at the L level. Thereby, the AND gate 40 is closed not to receive the flat flash initiation signal $x_1$. At the same time, since the other input terminal of the AND gate 45 turns to the H level, the AND gate 45 is opened to receive the continuous flash initiation signal $x_2$.

Specifically, when the continuous flash initiation signal $x_2$ is delivered from the camera, an output of the AND gate 45 turns to the H level and the pulse generator 46 produces a pulse of the H level. This H level pulse is applied as a flash trigger signal A (FIG. 9) through the OR gate 42 and further through the capacitor 13 and the resistor 12 to the trigger thyristor 10 to render it conductive and is applied as a flash initiation signal $B_1$ (FIG. 9) through the OR gate 31, the capacitor 30 and the resistor 29 to the main thyristor 27 to render it conductive. Accordingly, the charge stored on the main capacitor 3 is discharged through the discharge tube 14 and the main thyristor 27 to permit the discharge tube 14 to initiate flash emission (see FIG. 10). In addition, the FF circuit 47 is set by an output of the H level of the pulse generator 46. An output of the FF circuit 47 is in turn inverted to the H level and is applied through inverter 48 and resistor 49 to the base of the transistor 50 to turn it off. As a result, a photocurrent produced in the phototransistor 53 is integrated by the capacitor 55 and the photometric circuit 203 initiates its photometry (see FIG. 10).

In the photometry circuit 203, when an integrated voltage of the capacitor 55 exceeds a reference voltage which is a voltage at the junction between resistors 51, 52, an output of the amplifier 56 is inverted to the L level and in turn an output of the inverter 57 turns to the H level. As a result, a pulse of the H level is produced as a flash termination signal $C_2$ (FIG. 9) from the output terminal of the pulse generator 58 and is applied through the OR gate 26, capacitor 25 and resistor 24 to the thyristor 22 to render it conductive.

Figure 10:
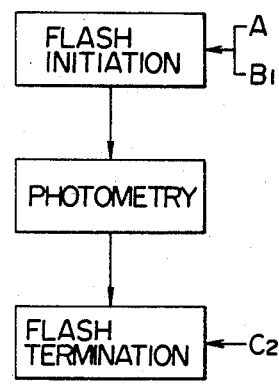
FIG. 10 is a flow chart showing an operation of the continuous flash mode with the dynamic flat flash type electronic flash unit according to the first embodiment.
Figure 9:
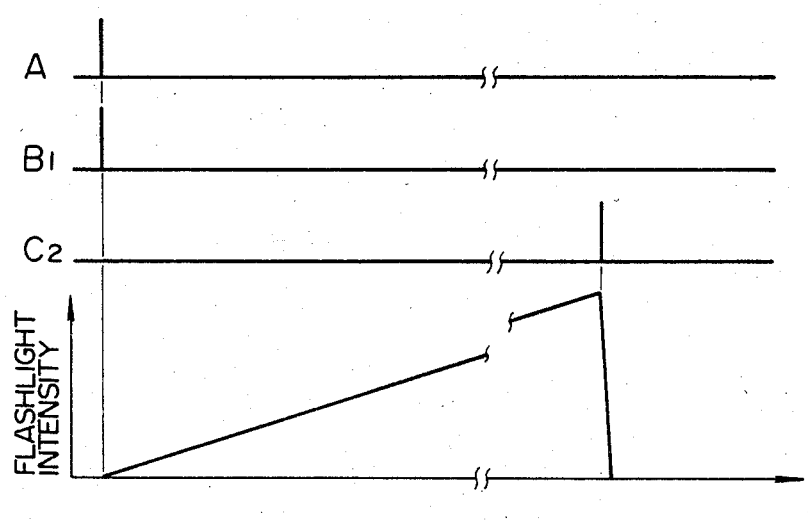
FIG. 9 is a diagram showing signal waveforms for explaining a continuous flash mode with the dynamic flat flash type electronic flash unit according to the first embodiment.

As a result of the foregoing, the main thyristor 27 is rendered non-conductive to terminate its flash emission in the same way as operations in the previously mentioned flat flash mode (see FIG. 10). Accordingly, when the movable contact terminal of the mode switching switch 44 is switched to the fixed terminal 44B, the electronic flash unit according to the first embodiment of the present invention functions as an ordinary automatic electronic flash unit. This is also true with respect to the following embodiments.

FIG. 11 illustrates a modified version of the control circuit 200 shown in FIG. 5. In this control circuit 200A, only a flash interval setting circuit 201A differs from the circuit 201 shown in FIG. 5 in that (1) a set input terminal of an FF circuit 67 is connected to an output terminal of a pulse generator 85, not to the output terminal of the pulse generator 41 in the circuit 201, (2) the FF circuit 67 and a preset counter 72 are reset by an output pulse of a pulse generator 73, not by the reset signal RESET which is produced from the AND gate 66 in the circuit 201, and (3) an input terminal of a delay circuit 74 is connected to an output terminal of the pulse generator 73 and a rapid charging signal D is produced from an output terminal of the delay circuit 74.

Since the structure of the control circuit 200A other than the foregoing is identical to that of the control circuit 200 shown in FIG. 5, corresponding parts are given corresponding reference characters. Therefore, a detailed description of the control circuit 200A will be omitted (The same is also true with respect to the following embodiments).

Figure 4:
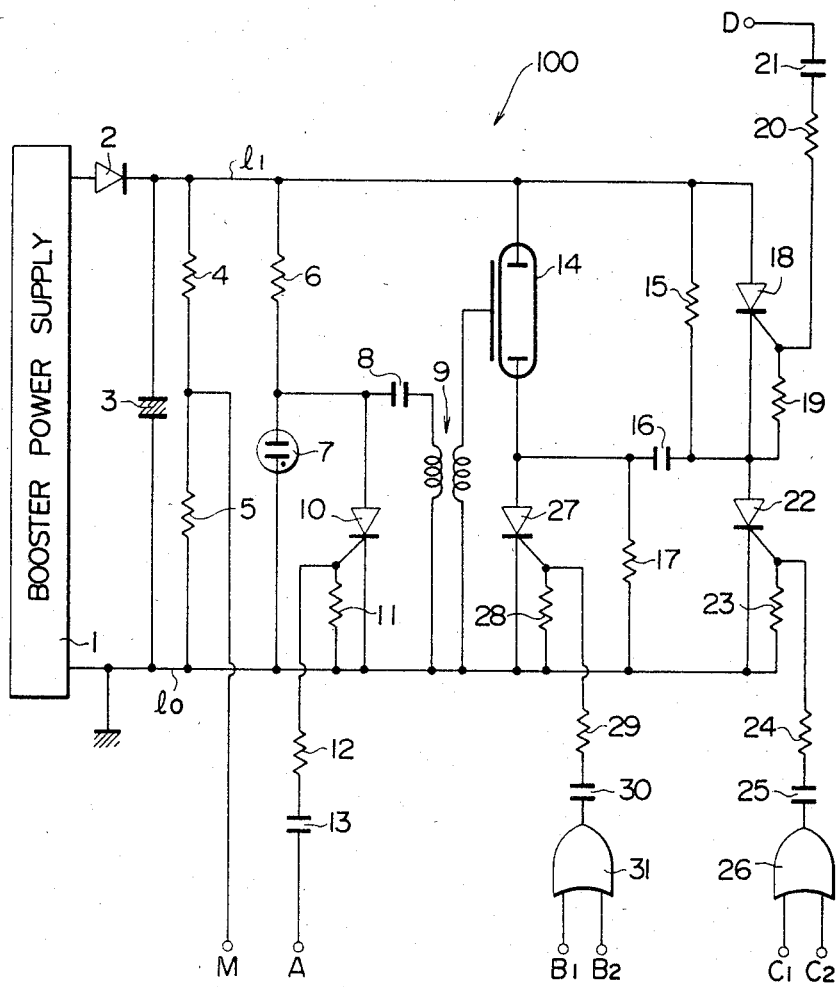
FIG. 4 is a diagram showing a main electric circuit of the dynamic flat flash type electronic flash unit according to a first embodiment of the present invention.
Figure 12:
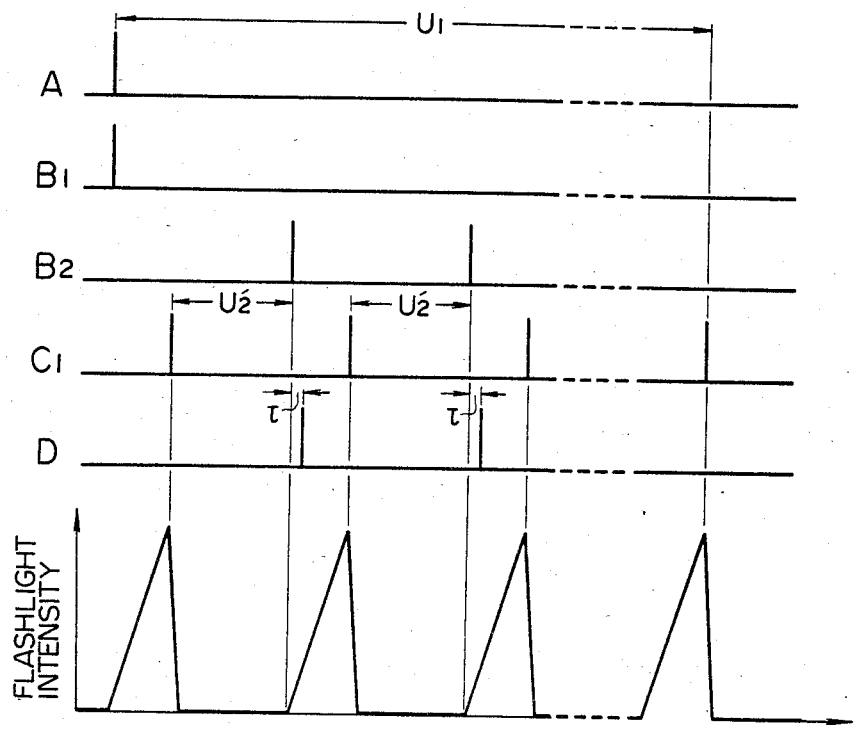
FIG. 12 is a diagram showing signal waveforms for explaining an operation of a flat flash mode with the dynamic flat flash type electronic flash unit including the control circuit shown in FIG. 11.
Figure 13:
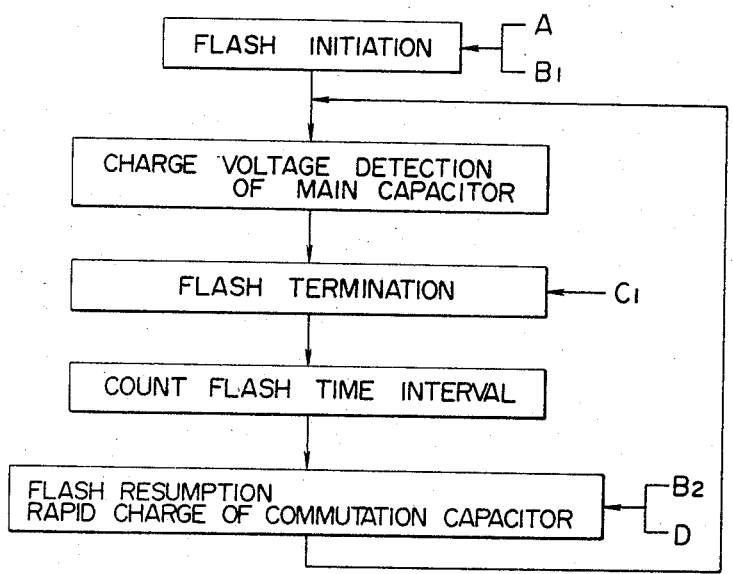
FIG. 13 is a flow chart showing an operation of the flat flash mode with the dynamic flat flash type electronic flash unit including the control circuit shown in FIG. 11.

In an electronic flash unit having the control circuit 200A just described, when a flash trigger signal A and a flash initiation signal $B_1$ (see FIG. 12) are produced, the discharge tube 14 (FIG. 4) initiates its flash emission (see FIG. 13) and at the same time the monitor circuit 202 initiates detection of a charged voltage on the main capacitor 3 (FIGS. 4 and 13). When a flash termination signal $C_1$ (FIG. 12) of the H level is produced from the monitor circuit 202, the discharge tube 14 and the monitor circuit 202 are both disabled, and at the same time the FF circuit 67 is set and the AND gate 71 is in turn opened to permit an output pulse of the oscillator 68 to be inputted into the preset counter 72. Accordingly, counting of a flash interval $U_2$ (FIG. 12) is initiated from the time when the flash termination signal $C_1$ is produced (FIG. 13). When the number of counts corresponding to the flash interval $U_2'$ is completely counted by the preset counter 72, an output thereof turns to the H level and a flash resumption signal $B_2$ (FIG. 12) of the H level is produced at an output terminal of the pulse generator 73, which signal renders the main thyristor 27 (FIG. 4) conductive to permit the discharge tube 14 to resume its flash emission (FIG. 13). At the same time, the FF circuit 67 and the preset counter 72 are reset and the operation of the monitor circuit 202 is resumed. In addition, the flash resumption signal $B_2$ is delayed by a time duration $\tau$ (FIG. 12) by the delay circuit 74 and the delayed signal renders the thyristor 18 (FIG. 4) conductive to appear at its output as the rapid charging signal D (FIG. 12) of the H level. As a result, the commutation capacitor 16 (FIG. 4) is rapidly charged (FIG. 13).

As such, the flash termination signal $C_1$, the flash resumption signal $B_2$ and the rapid charging signal D are successively produced with the repetition of the foregoing operations and the intensity of flashlight emitted from the discharge tube 14 assumes the intermittent triangular waveform as shown in FIG. 12.

When the flash termination signal $C_1$ is produced after the counting of the number of counts corresponding to the total flash time $U_1$ has been completed by the preset counter 64, the reset signal RESET is produced and the circuit 200A is entirely reset, resulting in the completion of a series of dynamic flat flashing operations.

While the control circuit 200 shown in FIG. 5 initiates the counting of the flash interval $U_2$ simultaneously with the initiation and resumption of the flash emission, the control circuit 200A shown in FIG. 11 initiates the counting of the flash interval $U_2'$ simultaneously with the termination of the flash emission. However, it is possible to freely choose the time for initiating counting of the flash interval from the above cases. (This is also true with respect to the following embodiment.)

A second embodiment of the present invention will be described with reference to FIGS. 14 to 17. This embodiment also has a structure for effecting two functions, dynamic flat flash and continuous flash modes, in the same manner as in the first embodiment. A main circuit 300 is identical to the main circuit 100 (FIG. 4) according to the first embodiment except that only part of elements are modified.

The anode-cathode path of a thyristor 32 of a normally-on electrostatic induction type (SI type) is connected between one electrode of the discharge tube 14 and the line $l_0$. The gate of the thyristor 32 is connected to the junction between commutation capacitor 16 and resistor 17 and is further connected to the cathode of a thyristor 33. The anode of the thyristor 33 is connected to the line $l_0$. A resistor 34 is connected between the gate and the cathode of the thyristor 33. The gate of the thyristor 33 is supplied through a resistor 35 and a capacitor 36 with a flash resumption signal E.

Figure 15:
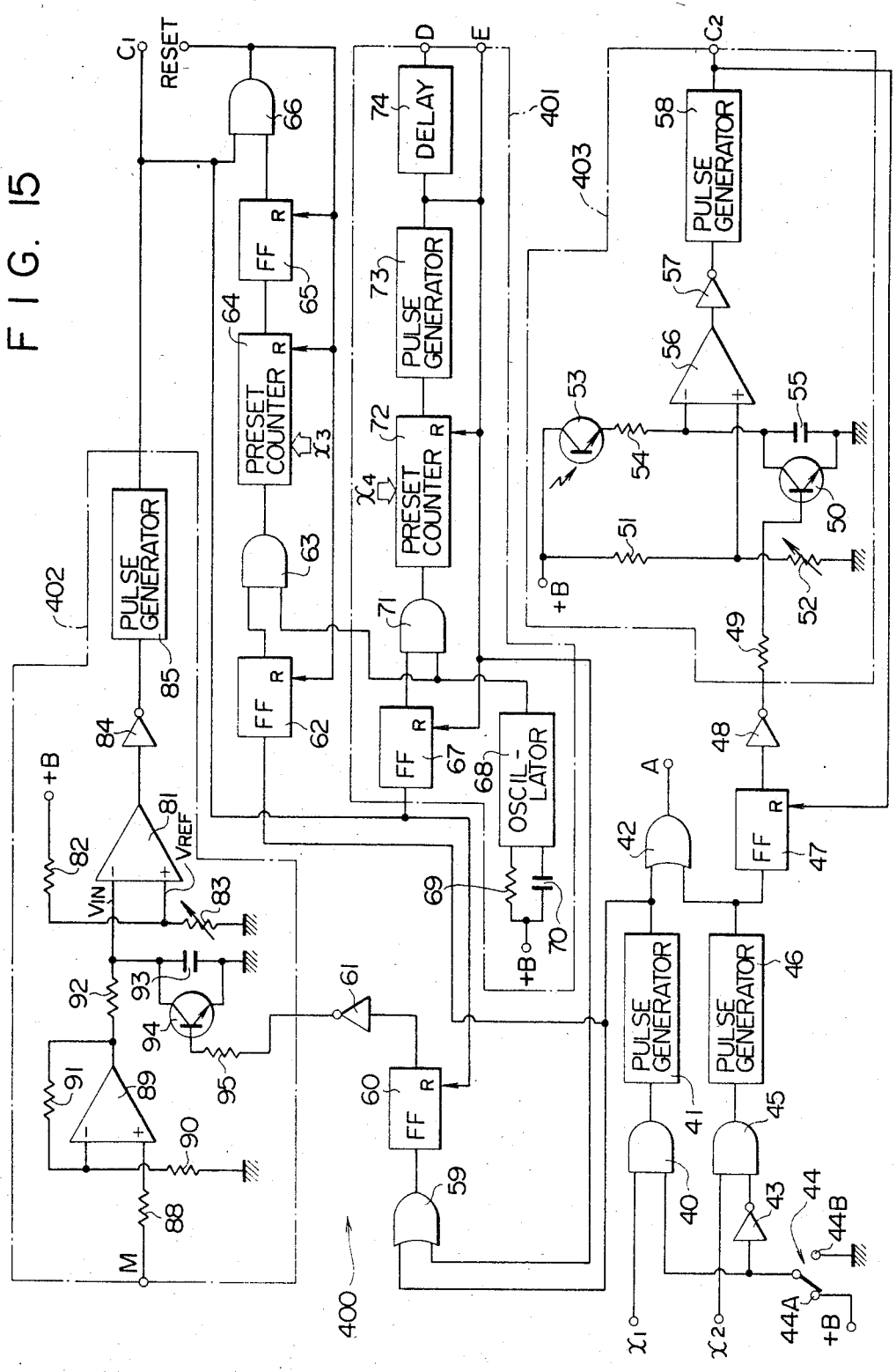
FIG. 15 is a diagram showing a control circuit connected to the main circuit shown in FIG. 14.

The main circuit 300 thus constructed is connected to a control circuit 400 of a structure as shown in FIG. 15. The control circuit 400 comprises a flash interval setting circuit 401, a monitor circuit 402 and a photometric circuit 403. The control circuit 400 is identical to the control circuit 200 of the first embodiment except that part of elements are modified.

An output terminal of a pulse generator 73 in the flash interval setting circuit 401 is connected to reset terminals R of both an FF circuit 67 and a preset counter 72 and delivers the flash resumption signal E to the main circuit 300. An input terminal of the FF circuit 67 is connected to an output terminal of a pulse generator 85.

An operational amplifier 89 which forms a non-inverting amplifier has a non-inverting input terminal connected to a resistor 88 through which a monitor voltage signal M from the main circuit 300 is applied to a monitor circuit 402 and an inverting input terminal which is grounded through a resistor 90. A resistor 91 is connected between the inverting terminal and an output terminal of the amplifier 89. The output terminal of the amplifier 89 is connected to an integration circuit comprising a series combination of a resistor 92 and a capacitor 93. An NPN type switching transistor 94 has the emitter and the collector connected to respective opposite ends of the capacitor 93. The emitter of the transistor 94 is grounded and the base thereof is connected through a resistor 95 to an output of an inverter 61. The junction between resistor 92 and capacitor 93 is connected to an inverting input terminal of an operational amplifier 81.

An operation of the dynamic flat flash mode in the dynamic flat flash type electronic flash unit according to the second embodiment will be described with reference to FIGS. 16 and 17.

In the flat flash mode, in which the movable contact terminal of the switch 44 is switched to the fixed contact terminal 44A, the operation voltage +B is applied to the input terminal of the AND gate 40 to open it. In addition, the voltage +B is applied to the inverter 43 and the resulting output of the L level thereof is applied to the AND gate 45 to close it.

As a result, the flat flash initiation signal $x_1$ from a camera body is allowed to be inputted and the continuous flash initiation signal $x_2$ is not allowed to be inputted. When the signal $x_1$ is inputted, the trigger thyristor 10 is rendered conductive by the flash trigger signal A from the output terminal of the OR gate 42 in the same manner as in the first embodiment and the discharge tube 14 becomes in the excited condition. The charge stored on the main capacitor 3 is discharged through the discharge tube 14 in the excited condition and the anode-cathode path of the main thyristor 32 to permit the discharge tube 14 to emit its flash emission. At the same time, a one-shot pulse of the H level from the pulse generator 41 sets an FF circuit 60 through an OR gate 59 and an output of the FF circuit 60 turns to the H level. This H level output is inverted to the L level through the inverter 61. Accordingly, the transistor 94 turns off to permit the monitor circuit 402 to initiate an integrating operation.

Furthermore, since an FF circuit 62 is set by the one-shot pulse of the H level from the pulse generator 41, an output of the FF circuit 62 is inverted to the H level and an AND gate 63 is opened. Output pulses of an oscillator 68 are in turn allowed to be inputted into a preset counter 64 and are counted therein.

On the other hand, a monitor voltage signal M which is produced by dividing a voltage of the main capacitor 3 by the resistors 4 and 5 is amplified by the amplifier 89 and the amplified voltage signal is integrated with a time constant which is determined by the resistor 92 and the capacitor 93. The integrated voltage is applied as a comparison voltage $V_{IN}$ to an inverting input terminal of the amplifier 81 to compare it with the reference voltage $V_{REF}$ which is produced by dividing the operation voltage +B by resistors 82 and 83. When an output of the amplifier 81 turns to the L level, namely, $V_{IN} \geq V_{REF}$, the L level output is inverted to the H level through the inverter 84. Then, a one-shot pulse of the H level is produced at an output terminal of the pulse generator 85. The H level pulse is applied as a flash termination signal $C_1$ through the OR gate 26, the capacitor 25 and the resistor 24 to the commutation thyristor 22 to render it conductive. When the thyristor 22 is conductive, the charge stored on the commutation capacitor 16 is discharged through the path including the commutation capacitor 16, the anode-cathode path of the commutation thyristor 22 and the resistor 17. Thereby, since the main thyristor 32 is reversely biased between its gate and cathode, the main thyristor 32 is momentarily rendered non-conductive to terminate flash emission. Since the discharge tube 14 has its deionization time, it is necessary to uninterruptedly maintain the reversely biased condition for the deionization time duration. Accordingly, it is necessary to define the time constant which is determined by the commutation capacitor 16 and the resistor 17 so as to be in excess of the deionization time. In addition, when the flash termination signal $C_1$ rises to the H level, the FF circuit 67 is set and the AND gate 71 is opened. Output pulses of the oscillator 68 are in turn inputted into the preset counter 72 and are counted therein. When the flash termination signal $C_1$ rises to the H level, the FF circuit 60 is reset and an output thereof is inverted to the L level. As a result, the transistor 94 turns on and the charge stored on the capacitor 93 is discharged and hence the monitor circuit 402 which detects the monitor voltage signal M is disabled.

When counting of the number of counts corresponding to the flash interval $U_2'$ by the preset counter 72 is completed, an output of the preset counter 72 turns to the H level and a pulse of the H level is in turn produced at the output terminal of the pulse generator 73. The H level pulse is applied as a flash resumption signal E through the capacitor 36 and the resistor 35 to the gate of the thyristor 33.

Accordingly, since the thyristor 33 is now rendered conductive and the resistor 17 is short-circuited, the charge stored on the commutation capacitor 16 is discharged, the discharge path being changed from the path including the anode-cathode path of the commutation thyristor 22 and the resistor 17 to a discharge path including the anode-cathode path of the commutation thyristor 22 and the anode-cathode path of the thyristor 33. Then, the gate potential of the main thyristor 32 becomes substantially the ground potential to render it conductive. Thus, the discharge tube 14, which is before the expiration of its deionization time after the previous flash termination, resumes its flash emission. At the same time, the FF circuit 67 and the preset counter 72 are both reset. In addition, since a flash resumption signal E which is a pulse of the H level sets the FF circuit 60 through the OR gate 59, an output of the FF circuit 60 is inverted to the H level and an output of the inverter 61 turns to the L level to turn the transistor 94 off. Accordingly, integration of the monitor voltage signal M is resumed in the monitor circuit 402.

In addition, the flash resumption signal E is delayed by the time duration $\tau$ in the delay circuit 74 and is then applied as a rapid charging signal D of a pulse of the H level through the capacitor 21 and the resistor 20 to the gate of the thyristor 18 to render it conductive. When the thyristor 18 is conductive, the commutation capacitor 16 is charged in an extremely short time through a main path including the line $l_1$, the anode-cathode path of thyristor 18, the commutation capacitor 16, the gate-cathode path of main thyristor 32 and the line $l_0$. When the charging of the capacitor 16 is completed, a current to the thyristor 18 becomes less than its holding current to render it non-conductive. When a voltage integrated with the resistor 92 and capacitor 93, that is, a comparison voltage $V_{IN}$, exceeds the reference voltage $V_{REF}$, an output of the amplifier 81 is inverted to the L level. In turn, an output of the inverter 84 turns to the H level and the flash termination signal $C_1$ of a pulse of the H level is produced from the pulse generator 85 as previously stated. Similarly, the same operations as described in the foregoing are achieved hereafter. The result is that the flash resumption signal E and the rapid charging signal D become a pulse of the H level and flashlight intensity of the discharge tube 14 has the intermittent triangular waveform (FIG. 16).

When counting of the number of counts corresponding to the total flash time $U_1$ by the preset counter 64 is completed, the FF circuit 65 is set and an output thereof is inverted to the H level. Thereafter, when the flash termination signal $C_1$ of a pulse of the H level is produced, the signal $C_1$ is applied as a reset signal RESET through the AND gate 66 to the FF circuit 62, the preset counter 64 and the FF circuit 65 to reset these circuits. At the same time, all other circuits also are reset by the signal $C_1$ and thus a series of operations of the dynamic flat flash mode terminates.

Next, when the movable contact terminal of the switch 44 is switched to the second fixed terminal 44B and thus the continuous flash mode is selected, the same operations as those of the continuous flash mode in the first embodiment is effected and their description will be omitted. In the second embodiment, however, since the normally-on thyristor 32 is employed, the flash initiation signal $B_1$ in the flow chart of FIG. 10 is not required in the same manner as in the above-mentioned flat flash mode.

Figure 18:
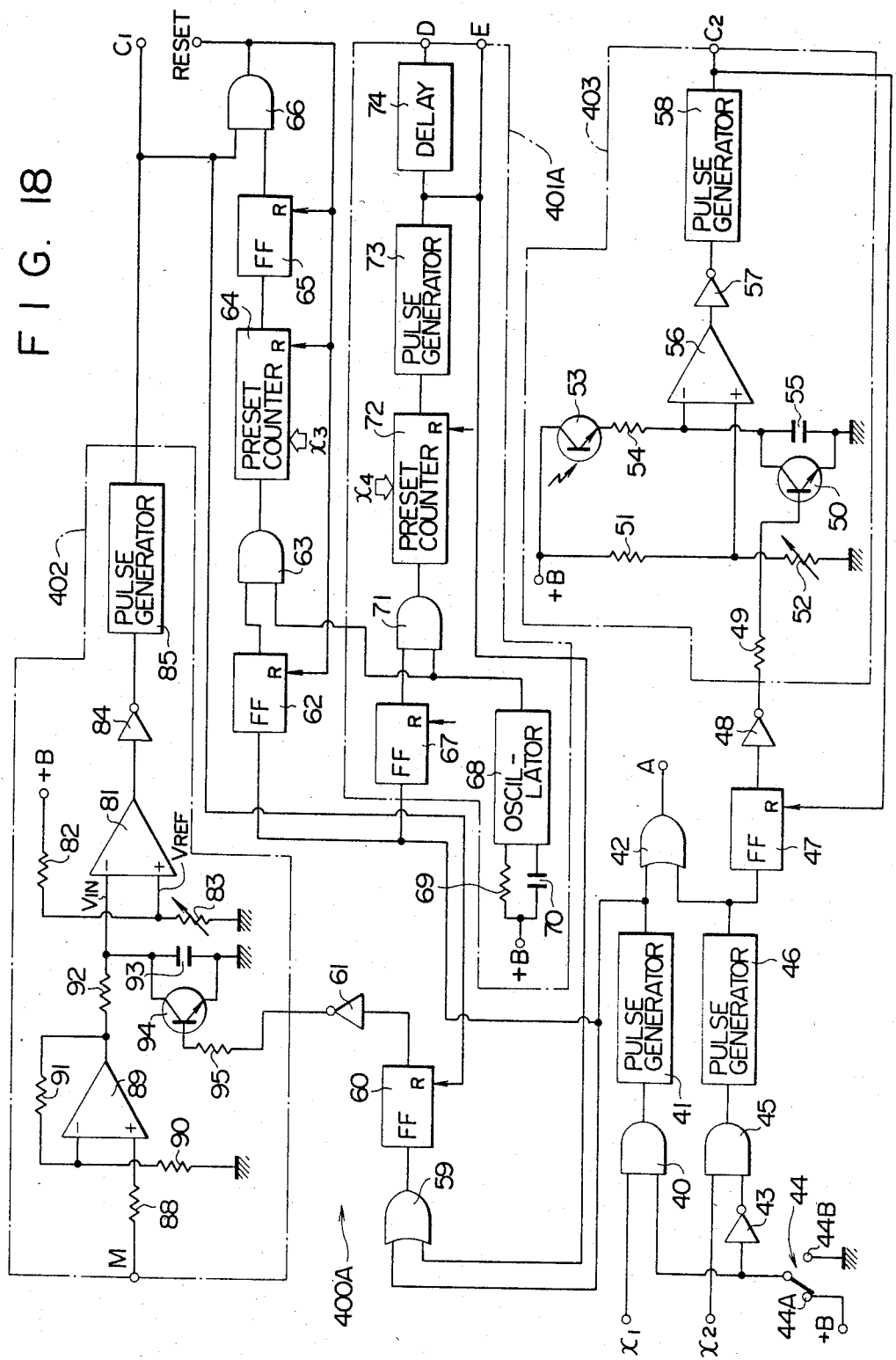
FIG. 18 is a circuit diagram showing a modification of the control circuit shown in FIG. 15.

FIG. 18 illustrates a modified version of the control circuit 400 shown in FIG. 15. In a control circuit 400A, only a flash interval setting circuit 401A differs from the flash interval setting circuit 401 shown in FIG. 15, in that a set input terminal of the FF circuit 67 is connected to an output terminal of the pulse generator 41, not to the output terminal of the pulse generator 85, and both the FF circuit 67 and the preset counter 72 are reset by a reset signal RESET, not by an output pulse of the pulse generator 73.

Figure 14:
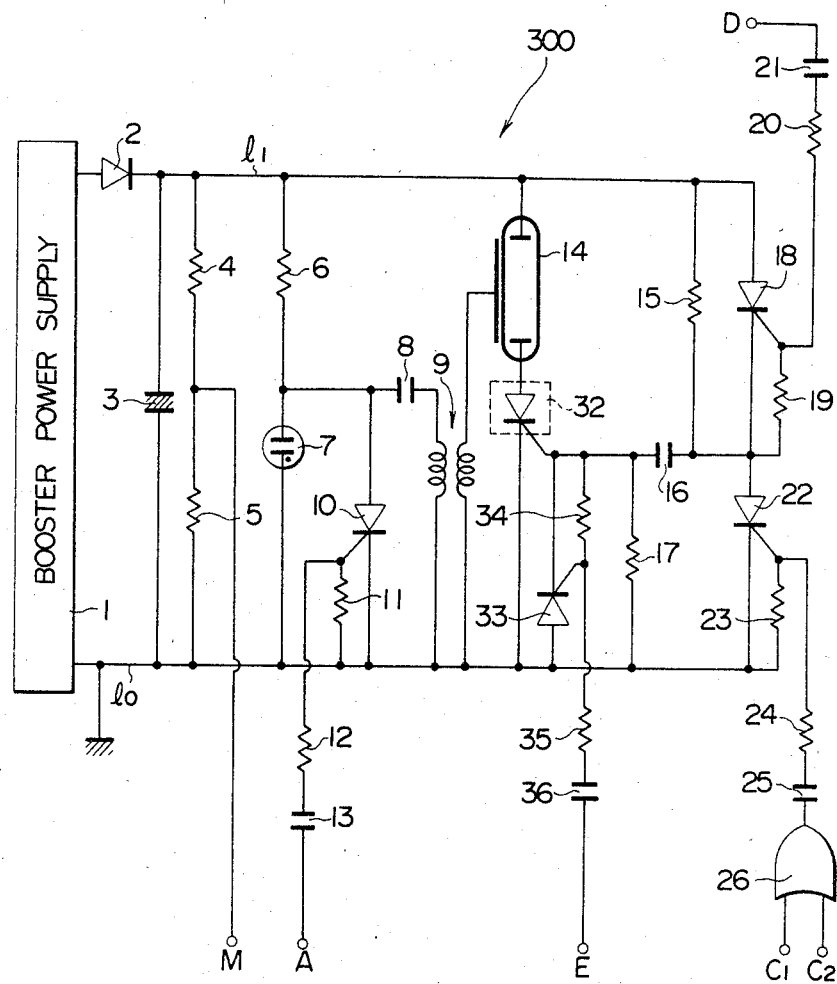
FIG. 14 is a circuit diagram showing a main circuit of a dynamic flat flash type electronic flash unit according to a second embodiment of the present invention.
Figure 19:
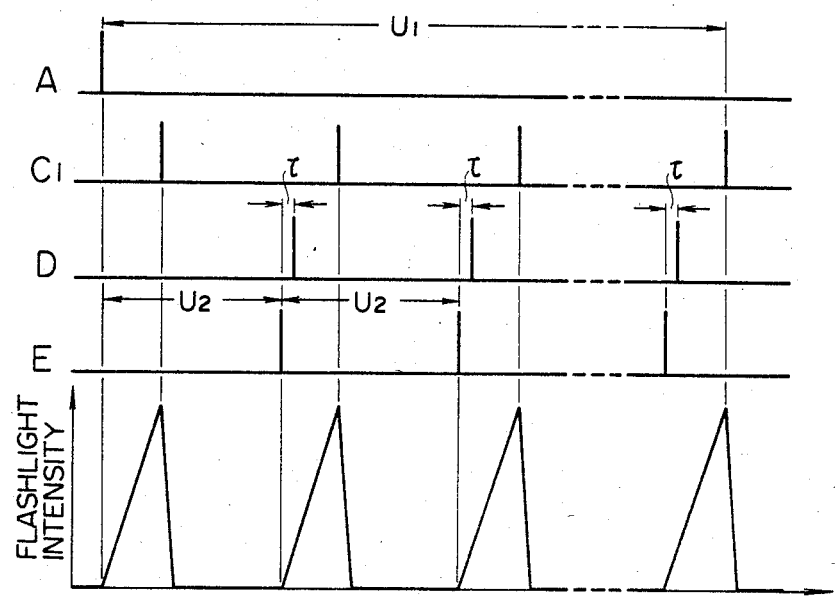
FIG. 19 is a diagram showing signal waveforms for explaining an operation of a flat flash mode with the dynamic flat flash type electronic flash unit including the control circuit shown in FIG. 18.
Figure 20:
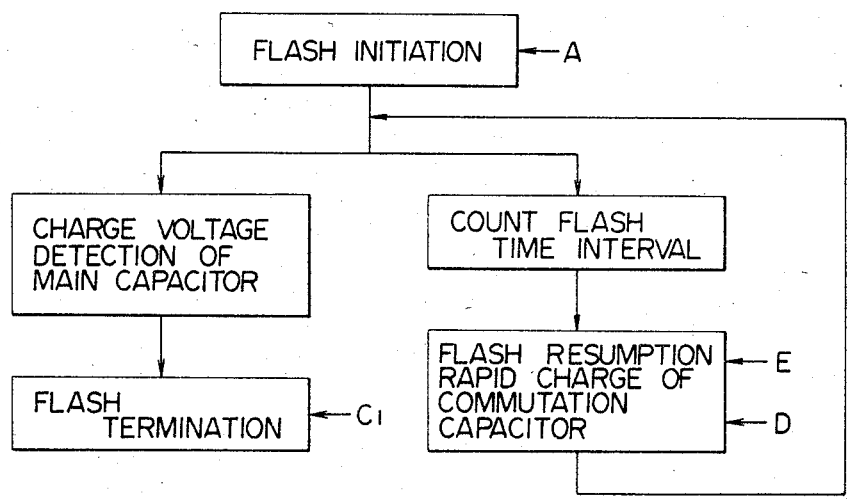
FIG. 20 is a flow chart illustrating an operation of the flat flash mode in the dynamic flat flash type electronic flash unit having the control circuit shown in FIG. 18.

In an electronic flash unit with the control circuit 400A, when a flash trigger signal A (FIG. 19) is produced, the discharge tube 14 (FIG. 14) initiates flash emission (Fi 20) and at the same time the monitor circuit 402 initiates detection of a charged voltage on the main capacitor (FIGS. 14 and 20). In addition, the FF circuit 67 is set and the AND gate 71 is opened to permit output pulses of the oscillator 68 to be inputted into the preset counter 72. As a result, counting of a flash interval $U_2$ (FIG. 19) is initiated (FIG. 20). When the flash termination signal $C_1$ (FIG. 19) is produced from the monitor circuit 402, the flash emission of the discharge tube 14 terminates (FIG. 20) and the monitor circuit 402 is disabled. When counting of the number of counts corresponding to the flash interval $U_2$ by the preset counter 72 is completed, an output of the counter 72 turns to the H level and a flash resumption signal E (FIG. 19) is produced at an output terminal of the pulse generator 73 to resume the flash emission of the discharge tube 14 (FIG. 20). At the same time, the monitor circuit 402 resumes its operation. The flash resumption signal E is delayed by the time $\tau$ (FIG. 19) in the delay circuit 74 and the delayed signal renders the thyristor 18 (FIG. 14) conductive as a rapid charging signal D (FIG. 19). Hence, the commutation capacitor 16 (FIG. 14) is rapidly charged (FIG. 20).

With repetition of the above operations, the flash termination signal $C_1$, the flash resumption signal E and the rapid charging signal D are successively produced and the discharge tube 14 repeats its pulse flash emission in the intermittent triangular waveforms as shown in FIG. 19.

When the flash termination signal $C_1$ is produced upon the counting of the number of counts corresponding to the total flash time $U_1$ in the preset counter 64, a reset signal RESET is produced and all the circuits are in turn reset to terminate a series of operations of the dynamic flat flash mode.

It will be understood that an operation in the continuous flash mode with the electronic flash unit having the control circuit 400A is the same as that in the continuous flash mode with the electronic flash unit having the control circuit 400 shown in FIG. 15.

Figure 21:
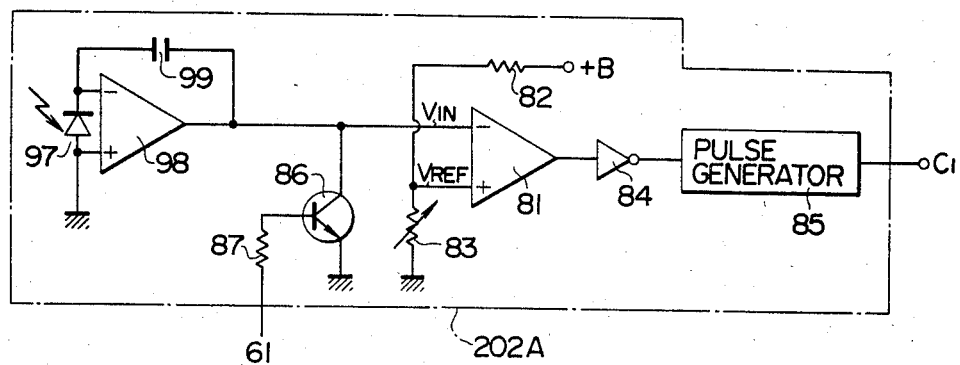
FIG. 21 is a circuit diagram illustrating a modification of a monitor circuit adapted to be used in place of the monitor circuit shown in FIGS. 5 and 11 or in FIGS. 15 and 18.

FIG. 21 illustrates a modified version of a monitor circuit 202A adapted to be used in place of the monitor circuit 202 shown in FIGS. 5 and 11 or the monitor circuit 402 shown in FIGS. 15 and 18. While in the monitor circuits 202 and 402, a charged voltage on the main capacitor 3 (FIGS. 4 and 14) is monitored in terms of the monitor voltage signal M, in the monitor circuit 202A a photoelectric transducer element 97 such as a photodiode is attached to a reflector shade, for example, of an electronic flash unit so as to directly detect a quantity of flashlight of the discharge tube 14.

The cathode of the transducer element 97 is connected to an inverting input terminal of an operational amplifier 98 which forms an integrator and further to an output terminal of the amplifier 98 through a capacitor 99. the anode of the transducer element 97 is connected to a non-inverting input terminal of the amplifier 98 and further to the ground. The output terminal of the amplifier 98 is connected to an inverting input terminal of an operational amplifier 81 for voltage comparison and to the collector of a switching transistor 86. The connections to input terminals of the amplifier 81 are the same as those in the monitor circuits 202 and 402.

In operation, when the discharge tube 14 is fired by the flash trigger signal A, the emitted flashlight is received by the transducer element 97. The capacitor 99 is charged by a current flowing through the transducer element 97 in accordance with intensity of received flashlight. An output of the amplifier 98, that is, an integrated voltage across the capacitor 99, is supplied as a comparison input $V_{IN}$ to the inverting input terminal of the amplifier 81 to compare with a reference voltage $V_{REF}$ which is defined by a resistor 82 and a variable resistor 83. When the comparison voltage $V_{IN}$ exceeds the reference voltage, an output of the amplifier 81 is inverted to the L level. In turn, an output of the inverter 84 turns to the H level and a flash termination signal $C_1$ of an H level pulse is produced from a pulse generator 85. Similarly, the same operations as in the foregoing are obtained hereafter. The result is that a flash resumption signal $B_2$ and a rapid charging signal D become an H level pulse and the discharge tube 14 emits intermittent pulse flashes.

Figure 22:
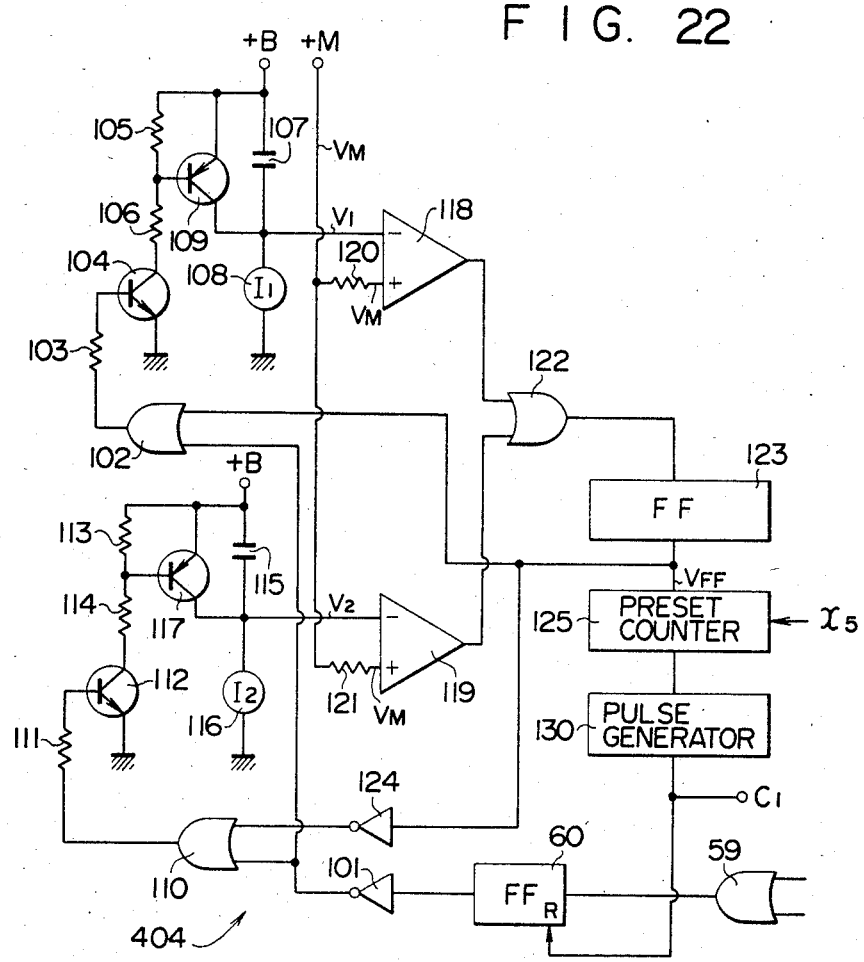
FIG. 22 is a circuit diagram illustrating an example of a time setting circuit adapted to be used in place of a flash interval setting circuit or a monitor circuit in the control circuit shown in FIGS. 5, 11, 15 and 18.

It is to be noted that a time setting circuit 404 as shown in FIG. 22 may be substituted for the monitor circuits 202 and 402 shown in FIGS. 5, 11, 15 and 18. Specifically, in the time setting circuit 404, an FF circuit 60 has a set input terminal connected to an output terminal of the OR gate 59 and a reset input terminal, to which a flash termination signal $C_1$ is supplied, connected to an output terminal of a pulse generator 130. An output terminal of the FF circuit 60 is connected through an inverter 101 to one input terminal of an OR gate 102. An output terminal of the OR gate 102 is connected through a resistor 103 to the base of an NPN type switching transistor 104. A series combination of resistors 105, 106 and the emitter-collector path of a transistor 104 and another series combination of an integration capacitor 107 and a constant current circuit 108 are both connected between a terminal to which the operation voltage +B is supplied and the ground. The terminal of the operation voltage +B is connected to the emitter of a PNP type transistor 109. The base of the transistor 109 is connected to the junction between the resistors 105 and 106 and the collector thereof is connected to the junction between the capacitor 107 and the constant current circuit 108.

The output terminal of the inverter 101 is further connected to one input terminal of an OR gate 110. An output terminal of the OR gate 110 is connected through a resistor 111 to the base of an NPN type switching transistor 112. A series combination of resistors 113, 114 and the collector-emitter path of the transistor 112 and another series combination of an integration capacitor 115 and a constant current circuit 116 are both connected between the terminal of the operation voltage +B and the ground. The terminal of the operation voltage +B is further connected to the emitter of a PNP type transistor 117. The base of the transistor 117 is connected to the junction between the resistors 113 and 114 and the collector thereof is connected to the junction between the capacitor 115 and the constant current circuit 116.

The junction between the capacitor 107 and the constant current circuit 108 is connected to an inverting input terminal of an operational amplifier 118 which forms a voltage comparator. The junction between the capacitor 115 and the constant current circuit 116 is connected to an inverting input terminal of an operational amplifier 119 which forms a voltage comparator. Non-inverting input terminals of the amplifiers 118, 119 are supplied with a monitor voltage signal M through resistors 120, 121, respectively.

Output terminals of the amplifier 118, 119 are connected to two input terminals of an OR gate 122, respectively. An output terminal of the OR gate 122 is connected to a set input terminal of an FF circuit 123. An output terminal of the FF circuit 123 is connected to an input terminal of an inverter 124 as well as the other input terminal of the OR gate 102. An output terminal of the inverter 124 is connected to the other input terminal of the OR gate 110. An output terminal of the FF circuit 123 is connected to a count input terminal of a preset counter 125 which is set by a value $x_5$ to a predetermined number of counts. A count output terminal of the preset counter 125 is connected to an input terminal of a pulse generator 130. An output terminal of the pulse generator 130 delivers a flash termination signal $C_1$.

An operation of the time setting circuit 404 will be described with reference to time charts shown in FIGS. 23A and 23B.

When an output of the FF circuit 60 is at the L level, outputs of the inverter 101 and the OR gates 102, 110 are at the H level so that the transistors 104, 112 are on. In turn, the transistors 109, 117 turn on. As a result, each of the capacitors 107, 115 is short-circuited. Accordingly, voltages at the inverting input terminals of the amplifiers 118, 119 are substantially the same as the operation voltage +B. Thereby, outputs of the amplifiers 118, 119 are at the L level and the time setting circuit 404 is inoperative. When an H level pulse from the OR gate 59 is applied to the set input terminal of the FF circuit 60, the latter is set and in turn an output of the inverter 101 turns to the L level. Thereby, outputs of the OR gates 102, 110 are dependent upon an output of the FF circuit 123. Specifically, when an output of the FF circuit 123 is at the L level, an output of the OR gate 102 is at the L level and hence the transistor 104 is off, whereas an output of the OR gate 110 is at the H level and hence the transistor 112 is on. As a result, the transistor 109 is off and the transistor 117 is on.

From this time, the capacitor 107 is charged by a constant current $I_1$ flowing through the constant current circuit 108. A voltage $V_1$ at the junction between the capacitor 107 and the constant current circuit 108 gradually decreases with the charging of the capacitor 107, as shown in FIG. 23A. When the voltage $V_1$ falls below a voltage $V_M$ of the monitor voltage signal M, which is a voltage at the non-inverting input terminal of the amplifier 118, an output of the amplifier 118 is inverted to the H level. This H level signal is delivered through the OR gate 122 to the FF circuit 123 to set it and hence an output $V_{FF}$ of the FF circuit 123 is inverted to the H level. The H level voltage $V_{FF}$ is applied through the OR gate 102 and the resistor 103 to the transistor 104 to turn it on and hence the transistor 109 turns on. As a result, the charge stored on the capacitor 107 is discharged and in turn an output of the amplifier 118 is again inverted to the L level. In addition, at the same time an output of the inverter 124 turns to the L level and hence an output of the OR gate 110 turns to the L level, resulting in turning off of both of the transistors 112, 117. From this time, the capacitor 115 is charged by a constant current $I_2$ flowing through the constant current circuit 116. A potential $V_2$ at the junction between the capacitor 115 and constant current circuit 116 gradually decreases in the same manner as the potential $V_1$. When the potential $V_2$ falls below the potential $V_M$ of the monitor voltage signal M which is the voltage at the non-inverting input terminal of the amplifier 119, an output of the latter is inverted to the H level. When this H level signal is applied through the OR gate 122 to the FF circuit 123 to reset it, an output $V_{FF}$ of the FF circuit 123 is inverted to the L level. The L level $V_{FF}$ is applied to the OR gate 102 to turn the transistor 104 off. The $V_{FF}$ is also inverted by the inverter 124 and the inverted $V_{FF}$ is applied to the OR gate 110 to turn the transistor 112 on. As a result, the potential $V_2$ again rises to the operating voltage $+B$ and the potential $V_1$ falls toward the potential $V_M$.

Similarly, the foregoing operations are repeated hereafter. The result is that a pulse train signal is obtained as an output $V_{FF}$ of the FF circuit 123, which $V_{FF}$ has a period $T_{FF}$. When the potential $V_M$ of the monitor voltage signal M that is a charged voltage on the main capacitor 3 is low as shown in FIG. 23B compared with that as shown in FIG. 23A, the output $V_{FF}$ has a longer period $T_{FF}'$ than the period $T_{FF}$ shown in FIG. 23B. Conversely, when the potential $V_M$ is higher than that in the condition shown in FIG. 23A, the output $V_{FF}$ has a shorter period than the period $T_{FF}$.

When the output $V_{FF}$ is applied to the preset counter 125, the latter counts the number of pulses corresponding to a value $x_5$ which has been preset. Upon completion of the counting, an H level pulse is applied from the preset counter 125 to the pulse generator 130. As a result, the flash termination signal $C_1$ of an H level pulse is delivered from an output terminal of the pulse generator 130. The FF circuit 60 is in turn reset by the signal $C_1$ and an output of the FF circuit 60 is inverted to the L level and thus the circuit 60 is returned to its initial condition. Thereafter, the time setting circuit 404 is inoperative until an output pulse of the OR gate 59 is produced. As such, since a flash time of each pulse flash is determined by the condition of the preset counter 125 which depends upon a pulse period of the output $V_{FF}$ of the FF circuit 123, when a voltage of the main capacitor 3 is low a flash time of each pulse flash increases and when a voltage of the main capacitor 3 is high the flash time decreases. Accordingly, it is possible to maintain a quantity of each pulse flash constant irrespective of the magnitude of a charged voltage on the main capacitor 3.

It is to be noted that a similar circuit to the time setting circuit 404 shown in FIG. 22 may be substituted for the flash interval setting circuits 201, 201A, 401 and 401A shown in FIGS. 5, 11, 15 and 18. In such case, however, it is necessary to permit the monitor circuits 202, 402 to produce a flash termination signal $C_1$ at a definite interval and to exchange the connecting positions of the capacitor for integrating the operation voltage $+B$ and the constant current circuit in the time setting circuit. The reason is that in the monitor circuits 202, 402, the higher a charged voltage on the main capacitor 3, the sooner the flash termination signal $C_1$ is produced, while in the time setting circuit, the higher a charged voltage on the main capacitor 3, the later the flash resumption signals $B_2$, E and the rapid charging signal D should be produced. In that case, the higher a charged voltage on the main capacitor 3, the longer a flash interval and hence it is possible to make a quantity of flashlight per unit time constant.

Figure 24:
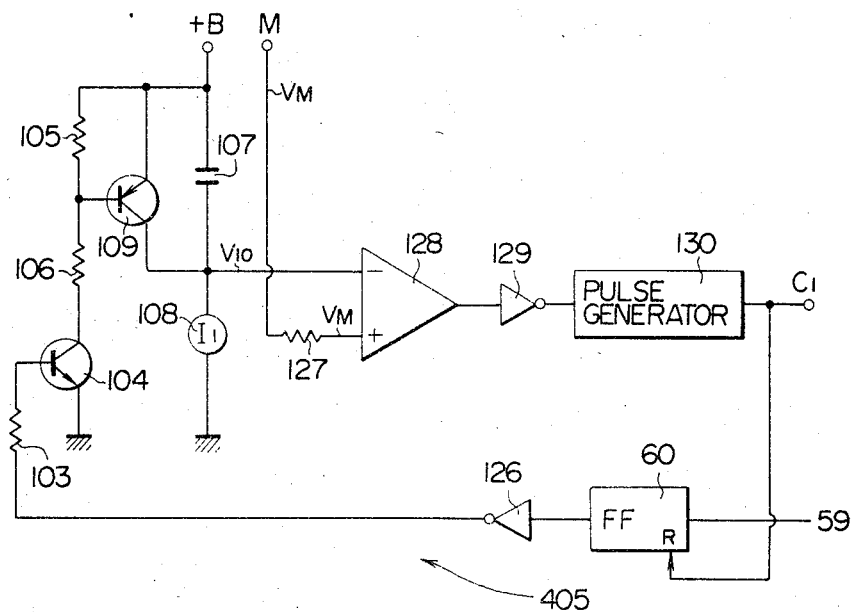
FIG. 24 is a circuit diagram illustrating another example of a time setting circuit adapted to be used in place of a flash interval setting circuit or a monitor circuit in the control circuit shown in FIGS. 15 and 18.
Figure 25A:
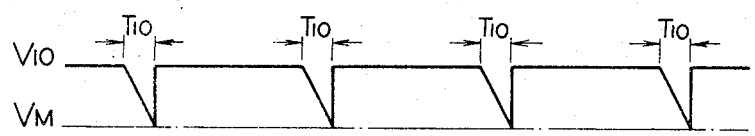
FIGS. 25A and 25B are diagrams showing signal waveforms for explaining an operation of the time setting circuit shown in FIG. 24.
Figure 25B:
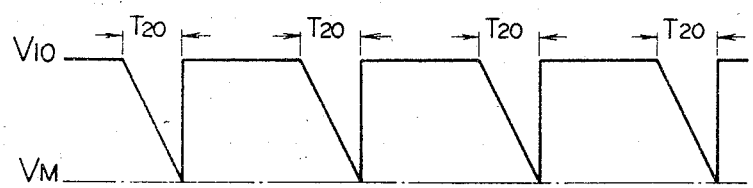

Further, a time setting circuit 405 as shown in FIG. 24 may be substituted for the time setting circuit 404 shown in FIG. 22. The circuit 405 has a construction in which the junction between a capacitor 107 and a constant current circuit 108, which forms the same constant current charge circuit as that in the time setting circuit 404 shown in FIG. 22, is connected to an inverting input terminal of an operational amplifier 128 which forms a voltage comparator, a non-inverting input terminal of the amplifier 128 is supplied with a monitor voltage signal M through a resistor 127, an output terminal of the amplifier 128 is connected through an inverter 129 to an input terminal of a pulse generator 130 and an output terminal of an FF circuit 60 is connected through an inverter 126 to a resistor 103. With this construction, for an integrated voltage $V_{10}$ of the capacitor 107, in the same manner as in the case described with reference to FIG. 22 and FIGS. 23A and 23B, when a potential $V_M$ of the monitor voltage signal M that is a voltage of the main capacitor 3 is high an integrating time $T_{10}$ decreases as shown in FIG. 25A, and when a potential $V_M$ is low an integrating time $T_{20}$ increases as shown in FIG. 25B. As a result, the less the voltage of the main capacitor 3, the more the delay in an inverting time point of an output level of the amplifier 128, so that a pulse flash time increases.

As described above, when pulse flashes are successively emitted, a voltage of the main capacitor 3 decreases with time. Accordingly, when a flash time duration of each pulse flash is constant, a quantity of each pulse flashlight decreases with time. Consequently, it is possible to maintain a quantity of each pulse flashlight constant irrespective of a voltage of the main capacitor 3 by changing a flash time of each pulse flash in accordance with a voltage of the main capacitor 3.

In view of the foregoing, it is possible to maintain a quantity of flashlight per unit time constant by keeping a flash time of each pulse flash constant and changing a flash interval with a circuit similar to that in the above stated embodiment. Specifically, to this end, for example, a circuit in which the capacitor 107 and the constant current circuit 108 in the circuit 405 shown in FIG. 24 are inversely connected between the operation voltage $+B$ terminal and the ground is used so that a flash interval decreases as a voltage of the main capacitor 3 decreases.

It should be understood that resistors may be used in place of the constant current circuits 108, 116 in the foregoing embodiments.

Figure 26:
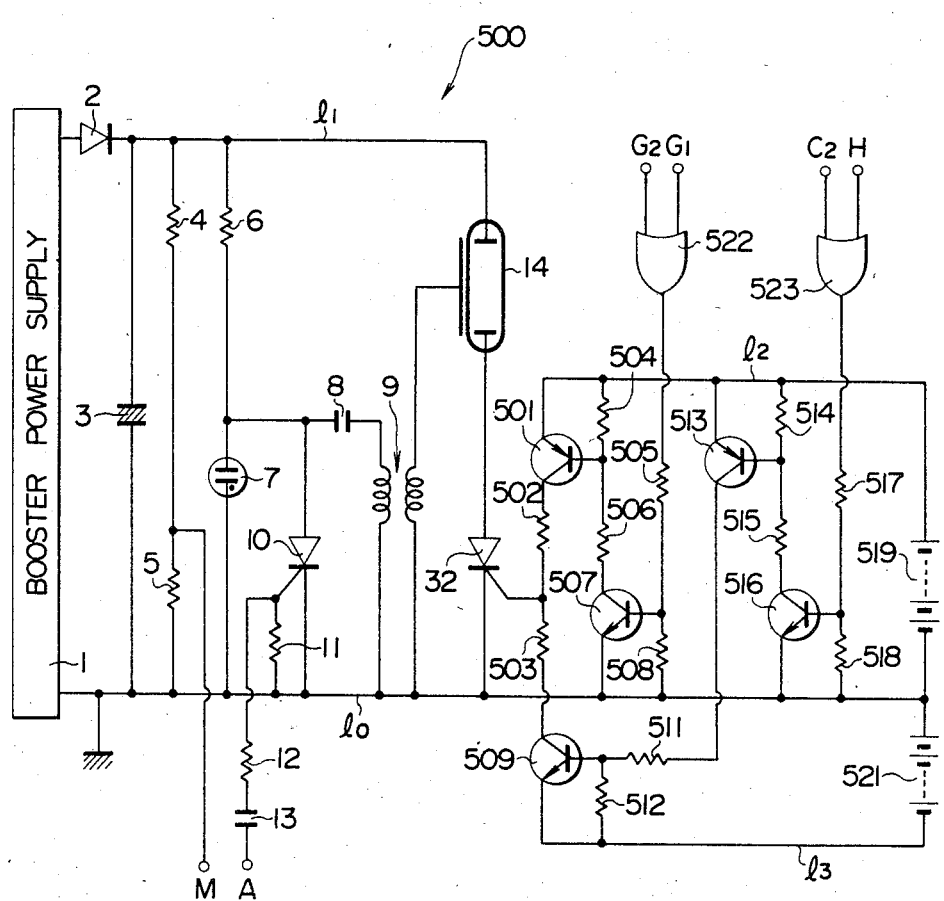
FIG. 26 is a diagram illustrating a main circuit of a dynamic flat flash type electronic flash unit according to a third embodiment of the present invention.

A third embodiment of the present invention will be described with reference to FIGS. 26, 27, in which no commutation capacitor is used for the on-off control of a main thyristor. This embodiment also has two functions, dynamic flat flash mode and continuous flash mode, as in the first embodiment. In a main circuit 500 shown in FIG. 26, the anode-cathode path of a normally-on type electrostatic induction (SI type) thyristor 32 is connected between the electrode of the discharge tube 14 and the line $l_0$ and one gate of the thyristor 32 is connected to the junction between resistors 502, 503 which are connected in series.

An output terminal of an OR gate 522 is grounded through a series combination of resistors 505, 508. The junction of the resistors 505, 508 is connected to the base of an NPN type transistor 507, the emitter of which is grounded. The collector of the transistor 507 is connected through a series combination of resistors 506, 504 to a line $l_2$ which is connected to the positive pole of a first d.c. power supply 519. The junction between the resistors 506, 504 is connected to the base of a PNP type transistor 501. The emitter of the transistor 501 is connected to the line $l_2$, the collector of which is connected to the resistor 502.

An output terminal of an OR gate 523 is connected through a series combination of resistors 517, 518 to the line $l_0$. The line $l_0$ is connected to the negative pole of the d.c. power supply 519 and further to the positive pole of a second d.c. power supply 521. The junction between the resistors 517, 518 is connected to the base of an NPN type transistor 516. The emitter of the transistor 516 is connected to the line $l_0$, the collector of which is connected through a series combination of resistors 515, 514 to the line $l_2$. In addition, the junction between resistors 514, 515 is connected to the base of a PNP type transistor 513. The emitter of the transistor 513 is connected to the line $l_2$, the collector of which is connected through a resistor 511 to the base of an NPN type transistor 509. The emitter of the transistor 509 is connected to a line $l_3$ which is connected to the negative pole of the power supply 521 and the base thereof is connected through a resistor 512 to the line $l_3$. The collector of the transistor 509 is connected through the resistor 503 to the gate of the main thyristor 32.

As described above, by ingeniously arranging two d.c. power supplies 519, 521, either a higher potential or a lower potential than the ground potential that is a reference potential is supplied to the gate of the main thyristor 32 to effect the on-off control of the thyristor 32.

Figure 27:
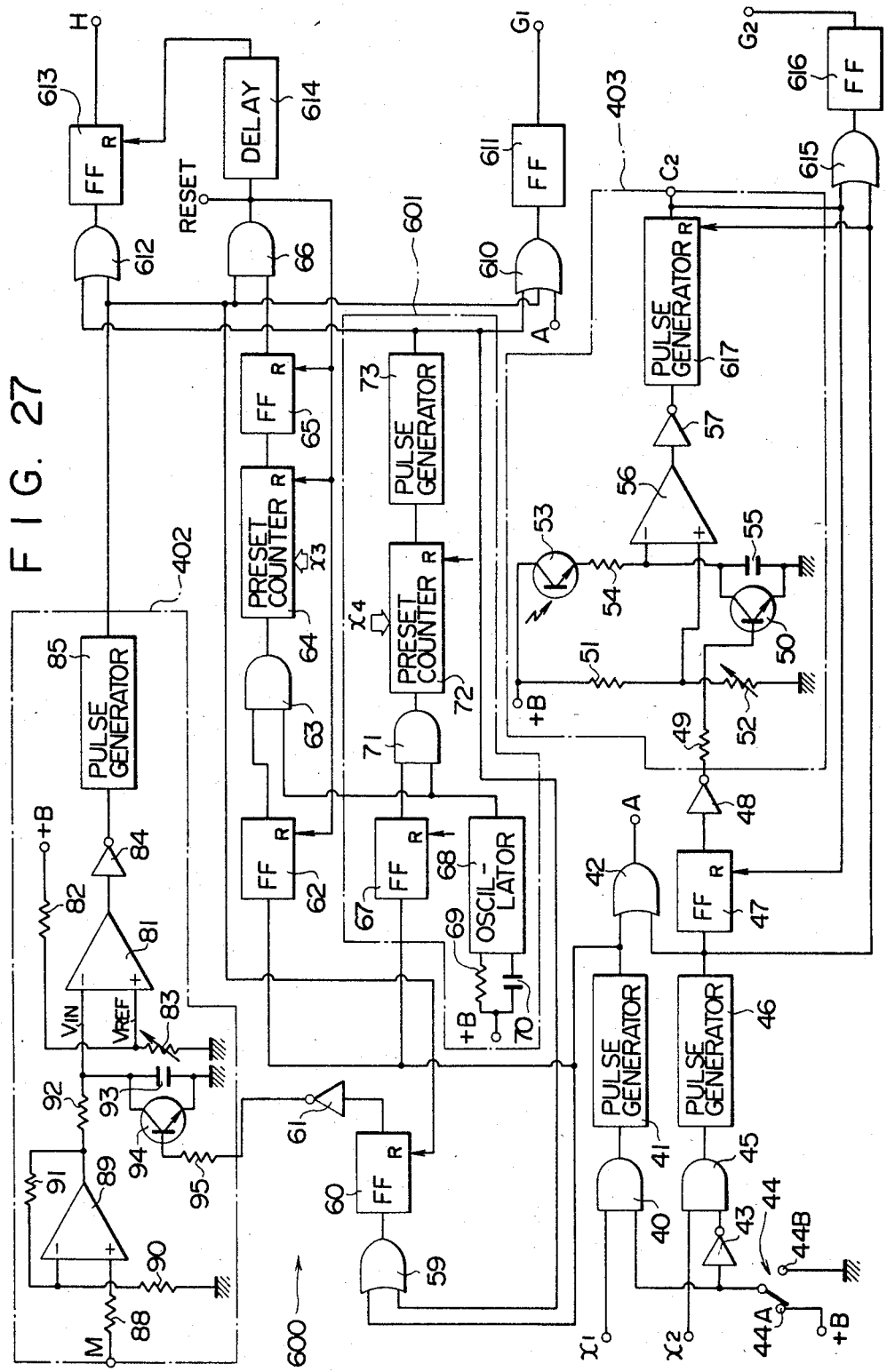
FIG. 27 is a diagram illustrating a control circuit connected to the main circuit shown in FIG. 26.

The main circuit 500 thus constructed is connected to a control circuit 600 as shown in FIG. 27. The control circuit 600 has the same construction as that of the control circuit 400 in the second embodiment (FIG. 15) except for a construction of part of the control circuit 400 and addition of some elements thereto. Specifically, an output terminal of a pulse generator 73 which forms a flash interval setting circuit 601 is connected to one input terminal of the OR gate 59 and further to a first-input terminal of three input OR gate 610. A second-input terminal of the OR gate 610 is connected to an output terminal of the pulse generator 85 and a third-input terminal thereof is supplied with a flash trigger signal A which is delivered from the OR gate 42. An output terminal of the OR gate 610 is connected to an input terminal of an FF circuit 611. An output terminal of the FF circuit 611 produces a flash initiation control signal $G_1$ which is applied to one input terminal of the OR gate 522 in the main circuit 500.

An output terminal of the pulse generator 73 is connected to one input terminal of an OR gate 612. The other input terminal of the OR gate 612 is connected to an output terminal of the pulse generator 85. An output terminal of the OR gate 612 is connected to an input terminal of an FF circuit 613. An output terminal of the FF circuit 613 delivers a flash termination signal H which is applied to one input terminal of the OR gate 523 in the main circuit 500. A reset terminal of the FF circuit 613 is connected to an output terminal of a delay circuit 614. An input terminal of the delay circuit 614 is connected to an output terminal of the AND gate 66.

An output terminal of the inverter 57 is connected to an input terminal of a pulse generator 617. An output terminal of the pulse generator 617 delivers a flash termination signal $C_2$ which is applied to the other input terminal of the OR gate 523 (FIG. 26). One input terminal of an OR gate 615 is connected to an output terminal of the pulse generator 617 and the other input terminal thereof is connected to a reset terminal of the pulse generator 617 and an output terminal of the pulse generator 46. An output terminal of the OR gate 615 is connected to an input terminal of an FF circuit 616. An output terminal of the FF circuit 616 delivers a flash initiation control signal $G_2$ which is applied to the other input terminal of the OR gate 522 in the main circuit 500.

An operation of the dynamic flat flash mode with an electronic flash unit of the third embodiment will be described. In the dynamic flat flash mode, in which the movable contact terminal of the switch 44 is switched to the fixed contact terminal 44A, the operation voltage $+B$ is applied to an input terminal of the AND gate 40 to open it. In addition, an output of the L level is applied through the inverter 43 to an input terminal of the AND gate 45 to close it. Consequently, a flat flash initiation signal $x_1$ from a camera body is allowed to be inputted and a continuous flash initiation signal $x_2$ is inhibited from entering. When the signal $x_1$ is inputted, an output of the pulse generator 41 is applied as a flash trigger signal A through the OR gate 42 and through the capacitor 13 and the resistor 12 (FIG. 26) to the gate of the trigger thyristor 10 to render it conductive. Accordingly, a trigger current flows from the trigger capacitor 8 to the primary coil of the trigger transformer 9. On the other hand, the signal A sets the FF circuit 611 through the OR gate 610 and an output of the H level of the FF circuit 611 is applied as a flash initiation signal control signal $G_1$ to one input terminal of the OR gate 522 in the main circuit 500. As a result, the transistors 507, 501 turn on successively and the thyristor 32 is rendered conductive. Thereby, since the trigger current is flowing through the primary coil of the trigger transformer 9 as described above, the discharge tube 14 initiates its flash emission.

Simultaneously with the initiation of flash emission, the monitor circuit 402 initiates integration by a one-shot pulse of the H level from the pulse generator 41 and the preset counter 64 also initiates counting, in the same manner as in the second embodiment.

When definite brightness has been reached as the result of the flash emission, an output of the amplifier 81 is inverted in the same manner as in the second embodiment and is transmitted through the inverter 84 to the pulse generator 85. The output of the H level from the generator 85 is applied to the OR gate 610. Thus, the H level signal from the OR gate 610 is applied to the FF circuit 611. The circuit 611 is in turn reset and delivers a signal of the L level. Thereby, an output of the OR gate 522 also turns to the L level. On the other hand, an output of the pulse generator 85 is applied to the OR gate 612 and an output of the H level is applied to the FF circuit 613. The circuit 613 is in turn set and delivers an output of the H level. Then, an output of the OR gate 523 turns to the H level to successively render the transistors 516, 513, 509 conductive and the gate potential of the thyristor 32 is in turn rendered lower than the ground potential. Consequently, the thyristor 32 is disabled and the discharge tube 14 terminates its flash emission.

On the other hand, since the H level output of the pulse generator 41 sets the FF circuit 67 to render the AND gate 71 conductive, output pulses of the H level from the oscillator 68 are applied to the preset counter 72 only when the output pulses are produced. An output from the counter 72 is applied to the pulse generator 73 and an output pulse of the pulse generator 73 is applied through the OR gate 610 to the FF circuit 611 to set it. Thus, the FF circuit 611 produces a signal of the H level. The output of the pulse generator 73 also is applied to the OR gate 612 to invert the FF circuit 613. The FF circuit 613 in turn delivers a signal of the L level and the output of the OR gate 523 turns to the L level. Consequently, the discharge tube 14 resumes the flash emission in the same manner as previously described. By repetition of these operations the discharge tube 14 consecutively performs the flash emission and interruption.

Thereafter, when counting of the number of counts corresponding to a total flash time is completed in the preset counter 64 which is in operation as described above, an output of the FF circuit 65 turns to the H level to open the AND gate 66. As a result, an output pulse of the pulse generator 86 is delivered as a reset signal RESET through the AND gate 66. An output of the delay circuit 614 into which a delay time larger than the deionization time of the discharge tube 14 has been preset is applied to a reset terminal of the FF circuit 613 to reset it. Specifically, the thyristor 32 is maintained in the off state for the deionization time to prevent the discharge tube 14 from resuming the flash emission. In addition, with the reset signal RESET, the FF circuit 62, the preset counter 64 and the FF circuit 65 are reset and at the same time all the other circuits are reset. Thus, a series of operations of the dynamic flat flash mode is completed.

In the continuous flash mode, the movable contact terminal of the switch 44 is switched to the second fixed terminal 44B in the same manner as in the first embodiment. At this time, an output of the H level of the pulse generator 46 sets the FF circuit 616 through the OR gate 615 and the FF circuit 616 produces a signal of the H level. This signal is applied as a flash initiation control signal $G_2$ to the other input terminal of the OR gate 522 (FIG. 26) to cause the discharge tube 14 to emit a flash and further to a reset terminal of the pulse generator 617 to reset it. Then, after a proper exposure an output of the amplifier 56 is inverted to the L level and this signal is further inverted to the H level in the inverter 57. A pulse signal of the H level from the pulse generator 617 is applied to the OR gate 615 and the FF circuit 616 in turn produces a signal of the L level. In addition, when the proper exposure has elapsed, an output of the H level is applied as a flash termination signal $C_2$ to the OR gate 523 and the transistors 516, 513, 509 successively turn on. The gate of the thyristor 32 is reversely biased so that it turns off. As a result, the flash emission of the discharge tube 14 is interrupted. In this case, when the resistance of the resistor 503 is too large, the turn-off time of the thyristor 32 increases and therefore a proper resistance should be selected. Also, it is necessary to make a pulse width of the pulse generator 617 longer than the deionization time of the discharge tube 14. In addition, an output signal of the pulse generator 46 is applied to a reset terminal of the pulse generator 617. Even while an output signal is being produced from the generator 617, the latter is reset by an output signal of the pulse generator 46. The reason for such arrangement is as follows. With a pulse width of the flash termination signal $C_2$ from the pulse generator 617 which is sufficiently larger than the deionization time of the discharge tube 14, when high speed photography is effected using a motor drive unit, the flash initiation control signal $G_2$ is inputted into the OR gate 522 before the flash termination signal $C_2$ from the pulse generator 617 turns from the H level to the L level. Thus, both the signals $G_2$ and $C_2$ are simultaneously applied to a control unit for the thyristor 32 in the main circuit 500. Since it is undesirable to simultaneously input such signals that are contrary to each other into the control unit, a pulse width of the flash termination signal $C_2$ is intentionally reduced so as to prevent the flash emission from being interrupted with the control unit reversely biased.

It should be understood that with such construction the on-off control of the main thyristor 32 can be achieved without a commutation capacitor, permitting the discharge tube to initiate and terminate its flash emission at an extremely reduced interval.

In general, as for a quantity of flashlight in the artificial illumination for photography, a guide number (GN) at a film speed ASA (ISO) 100 is employed as a most common evaluation value. There are a variety of theories for coefficient correction between a guide number GN and a quantity of flashlight L (cd. s). In principle, assuming that K represents a correction coefficient, the following equation is given:

$$GN = K\sqrt{L} \qquad (8)$$

It is known that when a quantity of flashlight is indicated by a guide number GN, a diaphragm value for a proper exposure can be derived using a simple calculation of $$GN = (\text{a diaphragm value}) \times (\text{distance}).$$

In the embodiments of the present invention, the concept of indicating a quantity of flashlight by a guide number will be adopted. When a slit exposure is performed, in which only part of a quantity of flashlight contributes to an actual exposure on a film surface, an indication in terms of GN for the total quantity of flashlight is unsuitable. Therefore, in the embodiments of the present invention only part of a quantity of flashlight passing through a slit and contributing to an actual exposure on a film surface is indicated as an effective guide number GNe at a film speed ISO 100. Since the effective guide number GNe, of course, varies with a slit width or an exposure time, it is necessary to specify an exposure time. Namely, an effective guide number GNe(t) should be specified at an exposure time t. In other words, when a pulse emission of flashlight which has a quantity per pulse $l_0$ is repeated $n_0$ times during a slit exposure time t (ms), an effective guide number is given from the equation (8) as follows:

$$GNe(t) = K\sqrt{l_0 \times n_0} \quad (9)$$

Accordingly, a change of the effective guide number GNe(t) permits an object at the same distance to be photographed with a different diaphragm value. This means that it is possible for the object at a comparatively near distance to take a picture with a reduced effective guide number GNe(t), resulting in saving of a power consumption of the electronic flash unit, which is the same effect as in a switching of guide numbers in a common electronic flash unit.

In an embodiment of the present invention which will be described later, an example is given in which an effective guide number at a shutter speed 1/1000 (that is, an exposure time 1 ms) is switchable to three steps of 5.6, 8 and 11. When a guide number GNe is switched by a photographer using a manual switching ring which is provided outside the electronic flash unit, the ring is interrelated with a means for controlling a quantity of pulse flashlight in a circuit of the flash unit so as to change a quantity of pulse flashlight. Now, assuming that when a pulse emission of flashlight which has a quantity per pulse $l_1$ is repeated $n_1$ times during a slit exposure time 1 ms (1/1000), an effective guide number GNe(1) is 8; it follows from the equation (9) that $$GNe(1) = 8 = K\sqrt{l_1 \times n_1} \quad (10)$$

Accordingly, when the effective guide number GNe(1) is switched to 5.6 without changing a flash interval or the number of flash $n_1$, the quantity of pulse flashlight $l_1$ indicated by the equation (10) may be changed to a quantity value l which satisfies the following equation:

$$5.6 = K\sqrt{l \times n_1} \quad (11)$$

Solving the equations (10) and (11), it follows that $$l = l_1 \times \left(\frac{5.6}{8}\right)^2 \approx 0.5 \, l_1 \quad (12)$$

Namely, it is noted that a value l may be obtained by multiplying the quantity $l_1$ by 0.5 when the effective guide number GNe is 8 and conversely when an effective guide number GNe(1) is to be switched to 11, a quantity value l may be obtained by multiplying the value $l_1$ by 2.

As a procedure for switching the effective guide number GNe, the number $n_0$ of flash emissions for a time t (that is, a flash emission interval $t/n_0$) may be changed in addition to changing a quantity of pulse flashlight $l_0$, as can be seen from the equation (9). Specifically, when an effective guide number is switched from 8 to 5.6 or 11, a flash emission interval or a timing for emitting pulse flashlight may be adjusted by multiplying the number of flash emission $n_1$ in the equation (10) by 0.5 or 2.0. In addition, by combining both procedures mentioned above, it is possible to accurately change an effective guide number GNe over a wide range.

It will be understood from the foregoing that a proper selection of a flash interval for successively emitting pulse flashes permits a uniform exposure free from exposure unevenness to be substantially achieved and an effective guide number can be switched by changing a flash emission interval or an intensity of each pulse flashlight.

Figure 28:
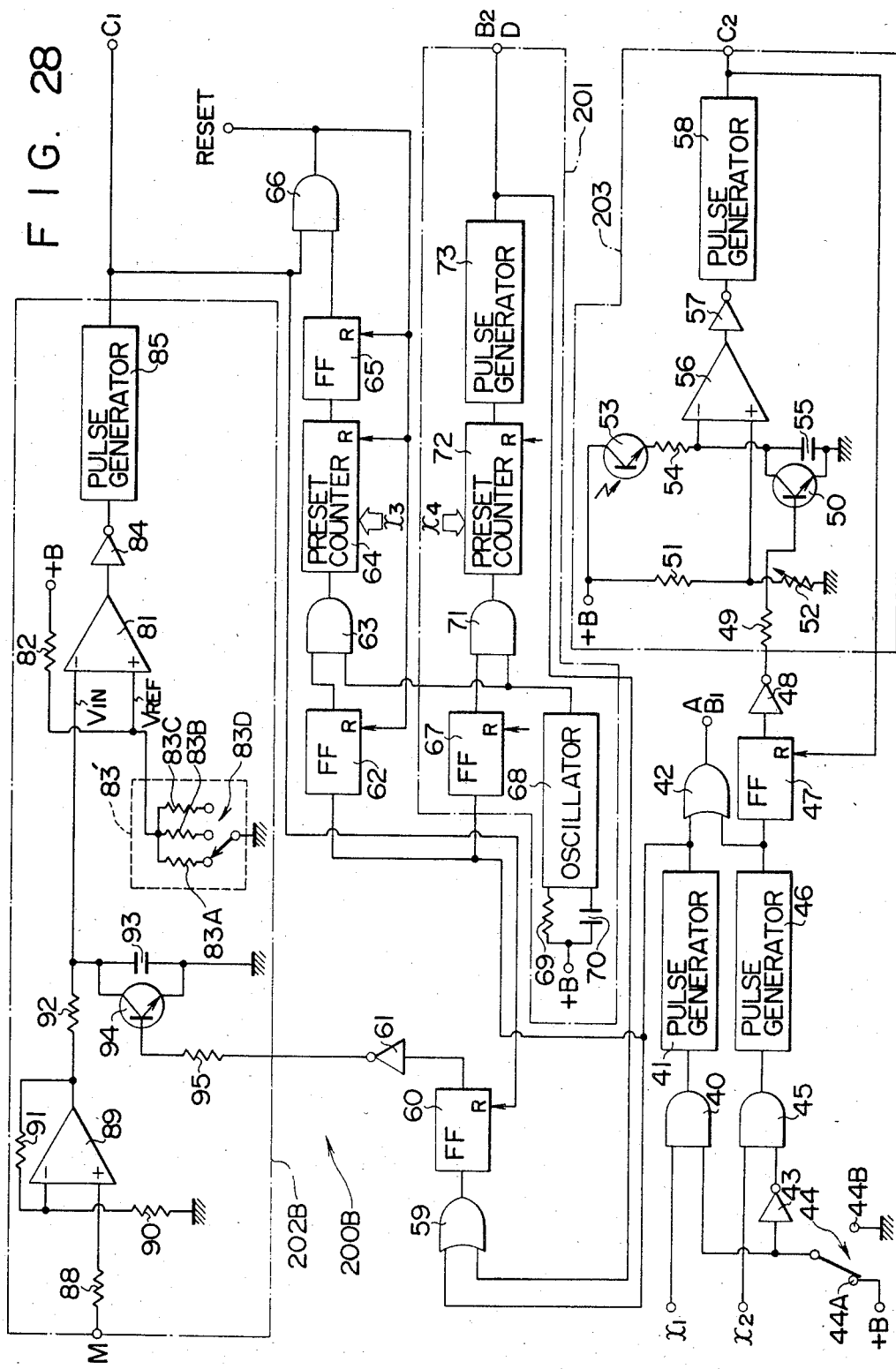
FIG. 28 is a diagram illustrating a control circuit of a dynamic flat flash type electronic flash unit according to a fourth embodiment of the present invention.

FIG. 28 illutrates a control circuit 200B for use in a dynamic flat flash type electronic flash unit according to a fourth embodiment of the present invention. A main circuit for the control circuit 200B is the same as the main circuit 100 shown in FIG. 4. The control circuit 200B includes a new monitor circuit 202B which is substituted for the monitor circuit 202 for the control circuit 200 shown in FIG. 5. The monitor circuit 202B is identical to the monitor circuit 402 shown in FIG. 15, except that only a resistor switching circuit 83' is substituted for the variable resistor 83 in FIG. 15. The resistor switching circuit 83' comprises resistors 83A, 83B and 83C, each one end of which is connected to a resistor 82, and a switch 83D, fixed contact terminals of which are connected to respective other ends of the resistors 83A, 83B and 83C. A movable contact terminal of the switch 83D is grounded. The resistances of the resistors 83A, 83B and 83C are defined so as to correspond to three steps of effective guide numbers GNe 5.6, 8 and 11.

Figure 29:
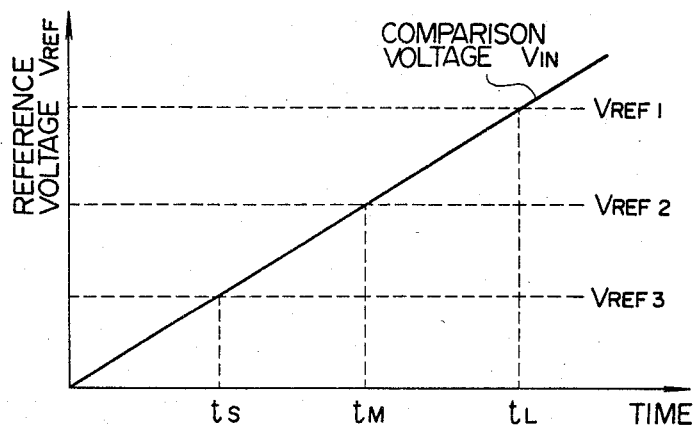
FIG. 29 is a diagram for explaining an operation of a monitor circuit shown in FIG. 28.

In operation, a monitor voltage signal M which is derived by dividing a voltage of the main capacitor 3 by resistors 4 and 5 is non-invertedly amplified by an operational amplifier 89 which forms a non-inverting amplifier circuit. This non-inverting amplified voltage signal is integrated with a time constant defined by a resistor 92 and a capacitor 93. The integrated voltage is applied as a comparison voltage $V_{IN}$ to an inverting input terminal of an operational amplifier 81 which forms a voltage comparison circuit to compare with the reference voltage $V_{REF}$ which is derived by dividing the operation voltage +B by the resistor 82 and a resistor of resistor switching circuit 83'. Depending upon the resistances of resistors 83A to 83C, as shown in FIG. 29, when the switch 83D is connected to the resistors 83A, 83B and 83C, reference voltages $V_{REF1}$, $V_{REF2}$ and $V_{REF3}$ are obtained, respectively, which are $V_{REF1} > V_{REF2} > V_{REF3}$. Accordingly, a time point when an output of the amplifier 81 is inverted to the L level will be changed in accordance with the switching operation of the switch 83D. Specifically, when the resistor 83A is selected, it needs a time period $t_L$, when the resistor 83B is selected, it needs a time period $t_M$ and when the resistor 83C is selected, it needs a time period $L_S$, resulting in the relation $t_S < t_M < t_L$. When the comparison voltage $V_{IN}$ reaches and exceeds the reference voltage $V_{REF}$, $V_{IN} \geq V_{REF}$, an output of the amplifier 81 turns to the L level. When this L level output is inverted by an inverter 84 to the H level, a flash termination signal $C_1$ of the H level is produced at an output terminal of a pulse generator 85.

Other operations are the same as those in the dynamic flat flash type electronic flash unit according to the embodiment shown in FIGS. 4 and 5.

Figure 30:
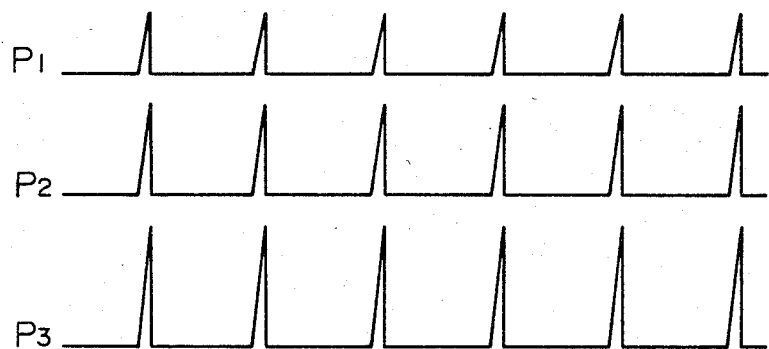
FIG. 30 is a diagram of signal waveforms illustrating a change in flashlight intensity with the dynamic flat flash type electronic flash unit having the control circuit shown in FIG. 28.

Accordingly, it is possible to obtain a dynamic flat flash emission whose intensities $P_1$, $P_2$ and $P_3$ of each pulse flashlight decrease in order, as shown in FIG. 30, in accordance with selection out of the resistors 83A, 83B and 83C, respectively.

Figure 31:
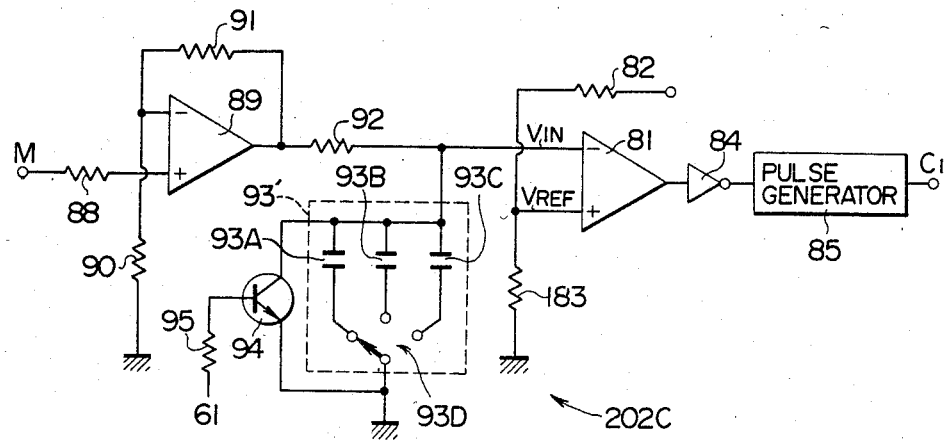
FIG. 31 is a circuit diagram illustrating another example of a monitor circuit in the control circuit shown in FIG. 28.

FIG. 31 illustrates a modified version of the monitor circuit 202B shown in FIG. 28. While the circuit 202B switches an effective guide number GNe to three steps of 5.6, 8 and 11 by changing the reference voltage $V_{REF}$ of the amplifier 81 with the resistor switching circuit 83', a monitor circuit 202C in FIG. 31 substitutes a fixed resistor 183 for the resistor switching circuit 83' and further substitutes a capacitor switching circuit 93' for a capacitor 93. The capacitor switching circuit 93' comprises capacitor of a capacitor 93A, a capacitor 93B and a capacitor 93C, each of which corresponds to respective effective guide numbers 11, 8 and 5.6 at a film speed ISO 100 and a shutter speed 1/1000 and a switch 93D for switching an effective guide number to these three steps. All one ends of capacitors 93A to 93C are connected in common and the other ends of capacitors 93A to 93C are connected to respective fixed contact terminals of the switch 93D. The movable contact terminal of the switch 93D is grounded. The commonly connected terminal of capacitors 93A to 93C is connected to the collector of a transistor 94. The emitter of the transistor 94 is grounded.

Figure 32:
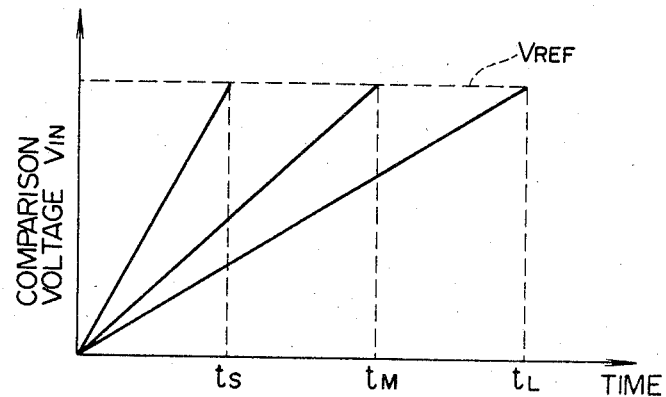
FIG. 32 is a diagram for explaining an operation of the monitor circuit shown in FIG. 31.

When the switch 93D is connected to the capacitor 93A, a monitor voltage signal M which corresponds to a charged voltage on the main capacitor 3 is non-invertedly amplified by the amplifier 89 in the same manner as described above, the amplified voltage is integrated in an integration circuit comprising the resistor 92 and the capacitor 93A and a comparison voltage $V_{IN}$ reaches the reference voltage $V_{REF}$ in a time $t_L$, as shown in FIG. 32. Similarly, when the switch 93D is connected to the capacitor 93B, a time $t_M$ is obtained and when connected to the capacitor 93C, a time $t_S$ is obtained, resulting in $t_S < t_M < t_L$, as shown in FIG. 23. As such, it is possible to change a pulse flash emission time by switching the capacitors 93A to 93C and thus to obtain a quantity of pulse flashlight corresponding to an effective guide number GNe.

Figure 33:
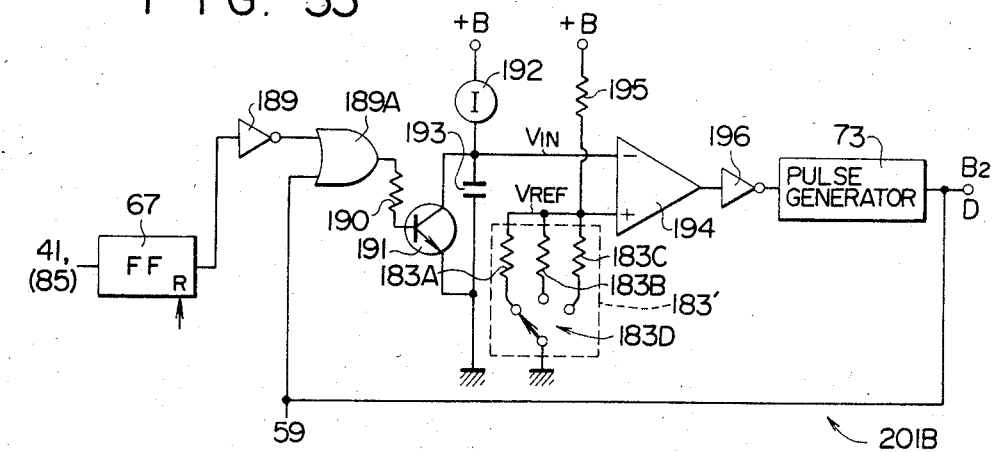
FIG. 33 is a circuit diagram illustrating a modification of a flash interval setting circuit in the control circuit shown in FIG. 28.

In addition, a pulse flash interval setting circuit 201B as shown in FIG. 33 may be used for changing an effective guide number GNe by changing a pulse flash interval with an arrangement of a monitor circuit which employs a fixed capacitor 93 and a fixed resistor 183 instead of those switchable elements in the monitor circuit 202B and 202C. Specifically, in the circuit 201B in FIG. 33 an output of the FF circuit 67 is connected through an inverter 189, one input terminal and an output terminal of an OR gate 189A and a resistor 190 to the base of an NPN type switching transistor 191. The other input terminal of the OR gate 189A is connected to an output terminal of the pulse generator 73. A series combination of a constant current circuit 192 and a capacitor 193 for integration is connected between a terminal to which the operation voltage +B is applied and the ground. The capacitor 193 is connected in the collector-emitter path of the transistor 191. The junction between the constant current circuit 192 and the capacitor 193 is connected to an inverting input terminal of an operational amplifier 194 which forms a voltage comparison circuit. A series combination of a resistor 195 and a resistor switching circuit 183' is connected between a terminal to which the operation voltage +B is applied and the ground. The junction between the resistor 195 and the resistor switching circuit 183' is connected to a non-inverting input terminal of the amplifier 194. An output terminal of the amplifier 194 is connected through an inverter 196 to an input terminal of the pulse generator 73.

The resistor switching circuit 183' comprises resistors 183A to 183C and a switch 183D in the same manner as the resistor switching circuit 83' shown in FIG. 28.

Figure 34:
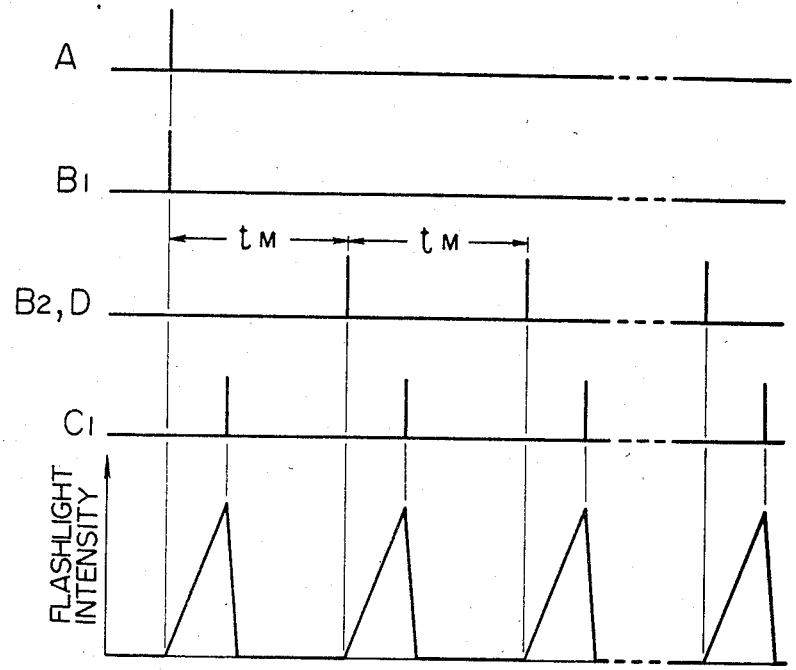
FIG. 34 is a diagram of signal waveforms for explaining an operation of a flat flash mode with the dynamic flat flash type electronic flash unit having the flash interval setting circuit shown in FIG. 33.

In a dynamic flat flash type electronic flash unit of the embodiment employing the flash interval setting circuit 201B described above, when the switch 183D is connected to the resistor 183B corresponding to an effective guide number 8 in the dynamic flat flash mode, a flash trigger signal A, a flash initiation signal $B_1$ and a flash termination signal $C_1$ are successively produced, as shown in FIG. 34, in the same manner as in the fourth embodiment. In addition, since the FF circuit 67 is set by a one-shot pulse of the H level which is produced from the pulse generator 41 or 85, an output of the FF circuit 67 is inverted to the H level and in turn the transistor 191 turns off, resulting in charging of the capacitor 193 by the constant current circuit 192. A voltage thus charged is applied as a comparison input $V_{IN}$ to the inverting input terminal of the amplifier 194 to compare with a voltage divided by resistors 195 and 183B, that is, a reference voltage $V_{REF2}$ (FIG. 29). After a period of time $t=t_M$ (FIG. 34), an output of the amplifier 194 is inverted to the L level and an output of the inverter 196 is turned to the H level. Then, a flash resumption signal $B_2$ and a rapid charging signal D are delivered from an output terminal of the pulse generator 73 and hence the flash resuming and rapid charging operations are performed in the same manner as in the fourth embodiment. Similarly, the same operations previously described are repeated hereafter.

The output of the pulse generator 73 turns the transistor 191 on through the OR gate 189A and the resistor 190 to short-circuit the capacitor 193. As a result, a charged voltage on the capacitor 193 is discharged. Now, a potential at the inverting input terminal of the amplifier 194 is larger than a potential at the non-inverting input terminal thereof so that an output of the amplifier 194 is inverted from the L level to the H level. Since a width of a pulse from the pulse generator 73 is equal to a period of time sufficient to discharge the charged voltage on the capacitor 193 through the transistor 191, when an H level pulse of the pulse generator 73 turns to the L level, this L level output again turns the transistor 191 off to initiate the charging of the capacitor 193.

When the switch 183D is connected to the resistor 83C corresponding to an effective guide number GNe 11, in which a reference voltage $V_{REF3}$ is lower than the reference voltage $V_{REF2}$, as shown in FIG. 29, a period of time t from generation of an H level pulse for the previous flash resumption signal $B_2$ to generation of an H level pulse for the next flash resumption signal $B_2$ is a time $t_S$ which is less than the time $t_M$ described above. As a result, it is possible to obtain a pulse train of successive flashes having a reduced flash interval.

When the switch 183D is connected to the resistor 183A corresponding to an effective guide number GNe 5.6, in which a reference voltage $V_{REF3}$ is larger than the reference voltage $V_{REF2}$, it is possible to obtain a pulse train of successive flashes having an interval $t_L$ larger than the interval $t_M$.

Figure 35:
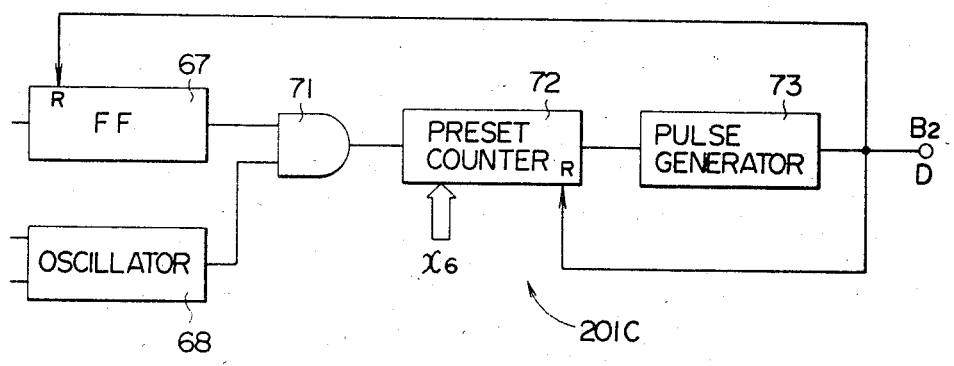
FIG. 35 is a circuit diagram illustrating another modification of a flash interval setting circuit in the control circuit shown in FIG. 28.

A flash interval setting circuit 201C shown in FIG. 35, which is similar to part of the circuit shown in FIG. 28, may be substituted for the flash interval setting circuit 201B shown in FIG. 33. In the circuit 201C, a preset value $x_6$ which is inputted into the preset counter 72 varies in accordance with an effective guide number. As a result, a pulse flash interval varies in accordance with an effective guide number GNe.

Figure 36:
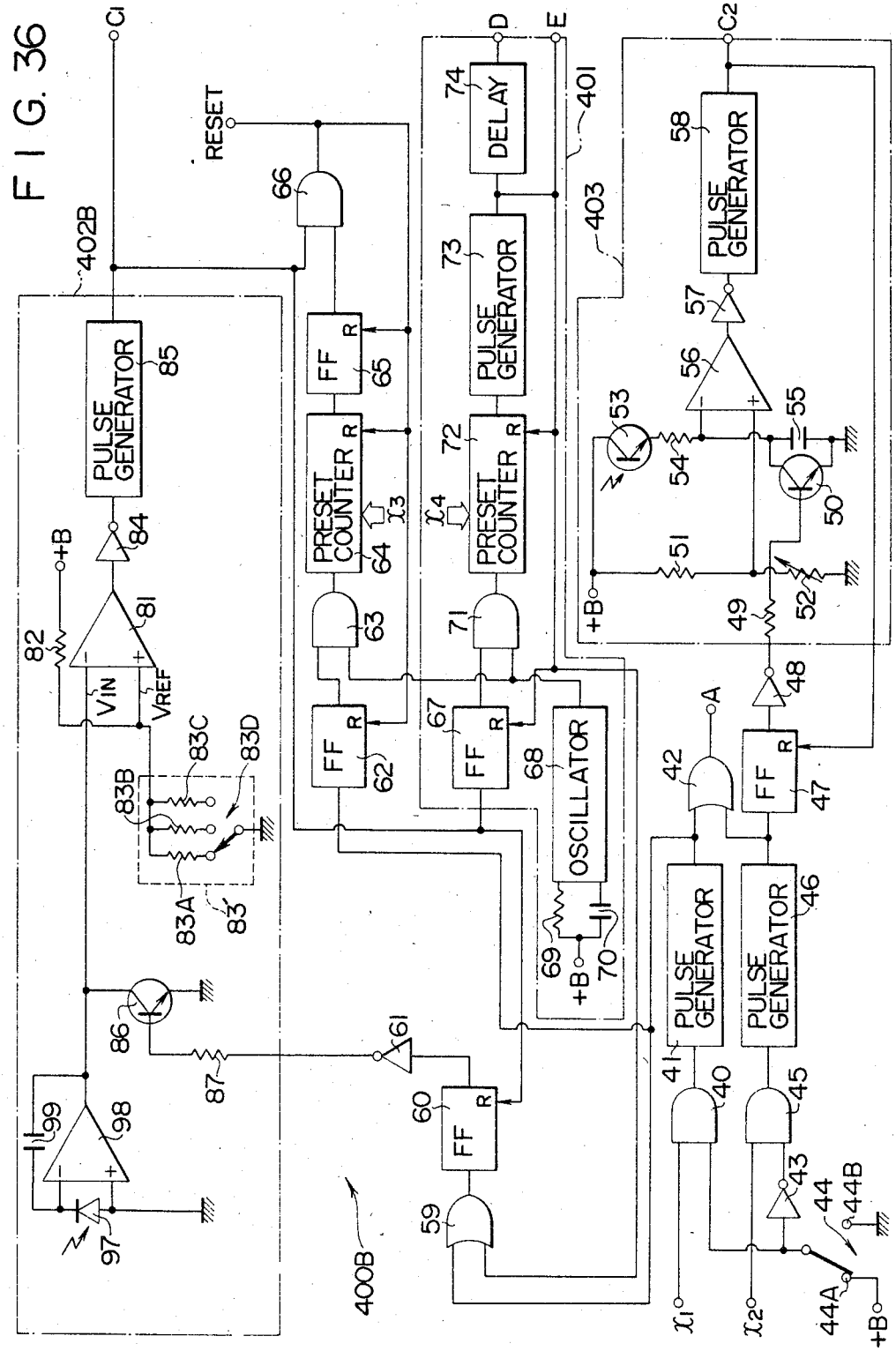
FIG. 36 is a diagram illustrating a control circuit of a dynamic flat flash type electronic flash unit according to a fifth embodiment of the present invention.
Figure 37:
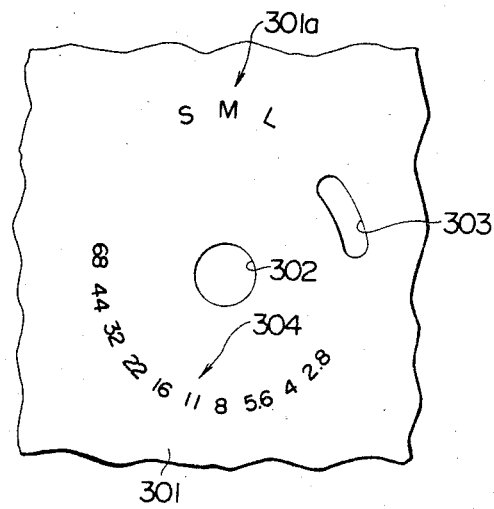
FIG. 37 is a plan view illustrating part of the body of the electronic flash unit according to the fourth and the fifth embodiment of the present invention.
Figure 38:
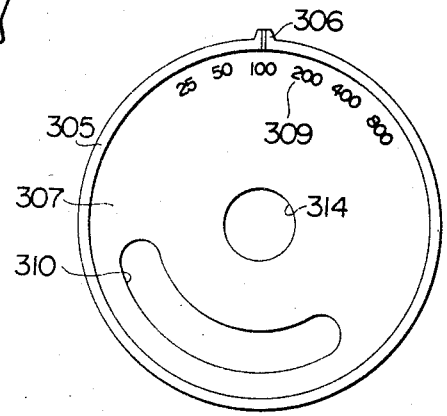
FIG. 38 is a plan view illustrating an example of an operation board fixed to the body of the electronic flash unit shown in FIG. 37.
Figure 39:
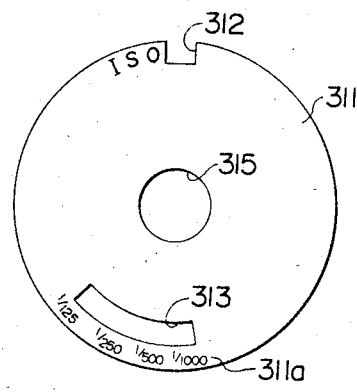
FIG. 39 is a plan view illustrating an example of a film speed setting board fixed to the operation board shown in FIG. 38.
Figure 40:
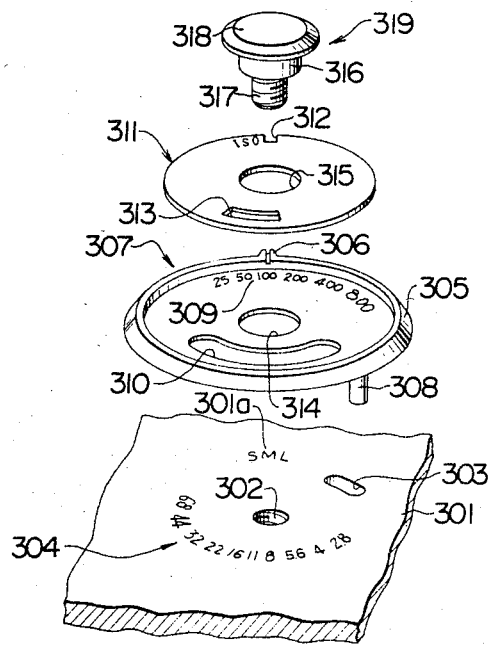
FIG. 40 is an exploded perspective view of a light quantity switching member comprising the operation board and the film speed setting board.

FIG. 36 illustrates a control circuit 400B for a dynamic flat flash type electronic flash unit according to a fifth embodiment of the present invention. The main circuit 300 which uses the SI type thyristor 32 shown in FIG. 14 is used as a main circuit for the control circuit 400B. The control circuit 400B has an arrangement in which a monitor circuit 402B is substituted for the monitor circuit 402 in the control circuit 400 shown in FIG. 15. The monitor circuit 402B has an arrangement in which only the resistor switching circuit 83' shown in FIG. 28 is substituted for the variable resistor 83 in the monitor circuit 202A shown in FIG. 21.

It will be understood that, with the dynamic flat flash type electronic flash unit having the control circuit 400B just described, it is possible to obtain a dynamic flat flash emission having an intensity of each pulse flashlight which increases in accordance with selection of the resistors 83A, 83B and 83C.

Examples embodying a flashlight intensity switching member for manually operating the switches 83D, 93D and 183D which switches an effective guide number shown in FIGS. 28, 31, 33 and 36 will be described with reference to FIGS. 37 to 41.

A body of the dynamic flat flash type electronic flash unit has a threaded hole 302 for fixing and a circular arc-shaped elongated hole 303 for guide whose center is the center of the hole 302. An indicator 304 for indicating a plurality of effective guide numbers is provided on a circular arc whose diameter is larger than that of the circular arc-shaped hole 303 and a flash intensity indicator 301a is formed which indicates three steps "S", "M" and "L" of intensity on a circular arc whose diameter is larger than that of the indicator 304. There is provided an operating member 305 in the form of truncated cone which spreads over the body 301. An operating board 307 in a disc form is mounted on the operating member 305, which board has an indicator 306 which projects from part of the operating member 305. A switch drive pin 308 which projects downwardly from the lower surface of the operating board 307 is formed so as to engage the switches 83D, 93D, 183D for switching an effective guide number which is shown in FIGS. 28, 31, 33 and 36. The pin 308 is guided in the elongated hole 303. A film speed indicator 309 which indicates a film speed in an ISO value is formed adjacent to the outer periphery of the upper surface of depression provided on the operating board 307. The operating board 307 has an elongated hole 310 in a circular arc form which is in opposing relationship with the guide number indicator 304. A film speed setting board 311 is rotatably disposed within the depression on the upper surface of the operating board 307. A window 312 for setting a film speed is provided on part of the outer edge of the film speed setting board 311. A window 313 through which part of the guide number indicator 304 can be seen is provided on the film speed setting board 311. A shutter speed indicator 311a is formed along the window 313.

Holes 314, 315 are provided on respective centers of the operating board 307 and the film speed setting board 311. Both the operating board 307 and the film speed setting board 311 are mounted on the body 301 by means of a screw 319. Specifically, the screw 319 has a collar 318, a stepped portion 316 which is formed below the collar 318 and fits in the holes 315, 314 and a threaded portion 317 which lies lowest and engages the threaded hole 302. Thus, the boards 307, 311 are rotatably mounted on the body 301.

Figure 41:
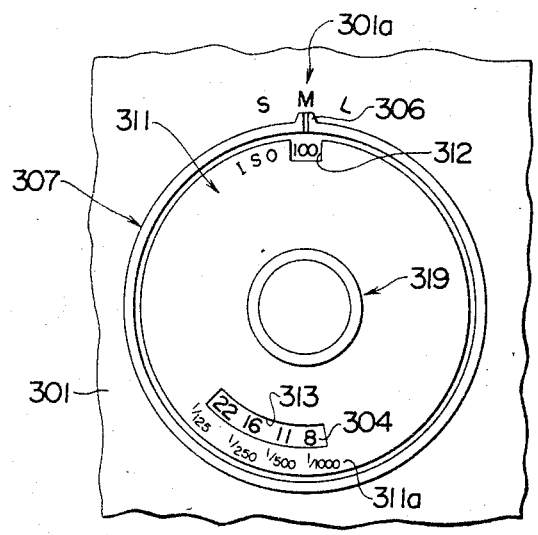
FIG. 41 is a plan view of the light quantity switching member shown in FIG. 40.

As shown in FIG. 41, when the indicator 306 of the operating board 307 is aligned with the mark "M" (a medium quantity of flashlight) of the flash intensity indicator 301a and the window 312 of the film speed setting board 311 is aligned with the numeric value "100" on the film speed indicator 309, which represents a film speed 100 ISO, it will be noted that an effective guide number GNe(1) is 8 at a shutter speed 1/1000. In this condition, the switch 83D, 93D, 183D is selectively connected to the resistor 83B, 183B and capacitor 93B. When the indicator 306 is aligned with the mark "L" (a large quantity of flashlight) by rotating the operating board 307 integrally with the film speed setting board 311, an effective guide number GNe(1) is indicated as 11 at a film speed 100 in ISO and a shutter speed 1/1000. Similarly, when the indicator 306 is aligned with the mark "S" (a small quantity of flashlight), an effective guide number GNe(1) is indicated as 5.6 at a film speed 100 in ISO and a shutter speed 1/1000. It should be understood that an effective guide number varies with a film speed or a shutter speed. For example, as is obvious from FIG. 41, even when the indicator 306 is aligned with the mark "M", an effective guide number GNe varies to 11, 16 and 22 when a shutter speed is switched to 1/500, 1/250 and 1/125, respectively. In addition, it should be understood that when an ISO value "200" is indicated through the window 312 by rotating the film speed setting board 311 clockwise by one step with respect to the operating board 307, an effective guide number GNe, in the condition that the indicator 306 is aligned with a mark "M", is 11, 16, 22 and 32 at a shutter speed 1/1000, 1/500, 1/250 and 1/125, respectively.

Figure 42:
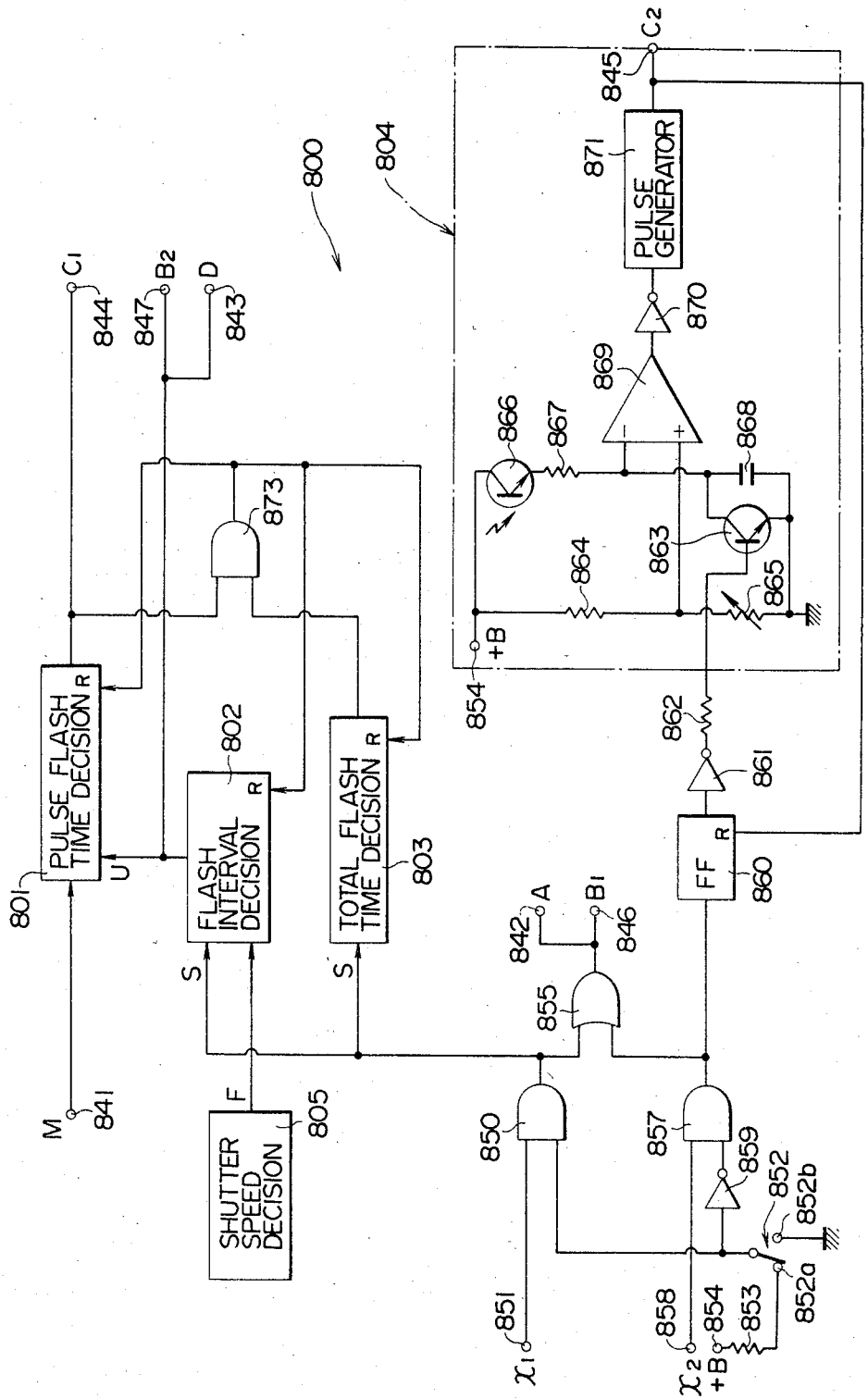
FIG. 42 is a diagram of a control circuit in a dynamic flat flash type electronic flash unit according to a sixth embodiment of the present invention.

FIG. 42 illustrates a control circuit 800 for a dynamic flat flash type electronic flash unit according to a sixth embodiment of the present invention. A main circuit for the control circuit 800 is the same as the main circuit 100 shown in FIG. 4. The control circuit 800 comprises a pulse flash time decision circuit 801, a pulse flash interval decision circuit 802, a total flash time decision circuit 803 for determining a total flash time from initiation of running of a first shutter blind to termination of running of a second shutter blind, a photometric circuit 804 and a shutter speed decision circuit 805 mounted on a camera body for producing a signal corresponding to a preset shutter speed. One input terminal of an AND gate 850 is connected to a terminal 851 to which a flash initiation signal $x_1$ from a camera body (not shown) is applied and the other input terminal thereof is connected to a movable contact terminal of a switch 852 for switching (i.e. selecting) a flash mode. A first fixed contact terminal 852a of the switch 852, which terminal is conductive in the flat flash mode, is connected through a resistor 853 to a terminal 854 to which the operation voltage +B is applied and a second fixed contact terminal 852b thereof, which terminal is conductive in the continuous flash mode, is grounded. An output terminal of the AND gate 850 is connected to one input terminal of an OR gate 855. An output terminal of the OR gate 855 is connected to terminals 842 and 846 which are connected to the main circuit 100 for supplying a flash trigger signal A and a flash initiation signal $B_1$, respectively.

One input terminal of an AND gate 857 is connected to a terminal 858 to which a flash initiation signal $x_2$ from the camera body (not shown) is applied and the other input terminal thereof is connected through an inverter 859 to the movable contact terminal of the switch 852. An output terminal of the AND gate 857 is connected to the other input terminal of the OR gate 855 and further to an input terminal of an FF circuit 860. An output terminal of the FF circuit 860 is connected through an inverter 851 and a resistor 862 to the base of an NPN type switching transistor 863. In the photometric circuit 804, between a terminal 854 to which the operation voltage +B is applied and the ground, a series combination of a resistor 864 and a variable resistor 865 which is set based on a film speed, a diaphragm value and the like and another series combination of the collector-emitter path of an NPN type phototransistor 866, a resistor 867 and a capacitor 868 for integration are connected. The junction between the resistor 864 and the variable resistor 865 is connected to a non-inverting input terminal of an operational amplifier 869 which forms a voltage comparison circuit. An inverting input terminal of the amplifier 869 is connected to the junction between the resistor 867 and the capacitor 868. The capacitor 868 is connected in the collector-emitter path of the transistor 863. An output terminal of the amplifier 869 is connected through an inverter 870 to an input terminal of a pulse generator 871 which produces one-shot pulse of the H level having a predetermined width when an input signal is turned from the L level to the H level. An output terminal of the pulse generator 871 is connected to a reset terminal of the FF circuit 860 and to a terminal 845 which supplies a flash termination signal $C_2$ to the main circuit 100.

An output terminal of the AND gate 850 is connected to input terminals of the flash interval decision circuit 802 and the total flash time decision circuit 803 to permit a flat flash initiation signal S from the AND gate 850 to be inputted into both the circuits 802, 803. The flash interval decision circuit 802 is supplied with a shutter speed information F from a shutter speed decision circuit 805 provided on the camera body, which will be described later. A flash interval signal U is supplied from the flash interval decision circuit 802 to the pulse flash time decision circuit 801. The signal U also becomes a flash resumption signal $B_2$ and a rapid charging signal D which are applied to terminals 847, 843 connected to the main circuit 100, respectively. A monitor voltage signal M is supplied from the main circuit 100 through a terminal 841 to the pulse flash time decision circuit 801. An output terminal of the circuit 801 is connected to a terminal 844 through which a flash termination signal $C_1$ is applied to the main circuit 100 and to one input terminal of an AND gate 873. The other input terminal of the AND gate 873 is connected to an output terminal of the total flash time decision circuit 803. An output terminal of the AND gate 873 is connected to reset terminals of the circuits 801, 802 and 803.

Figure 43:
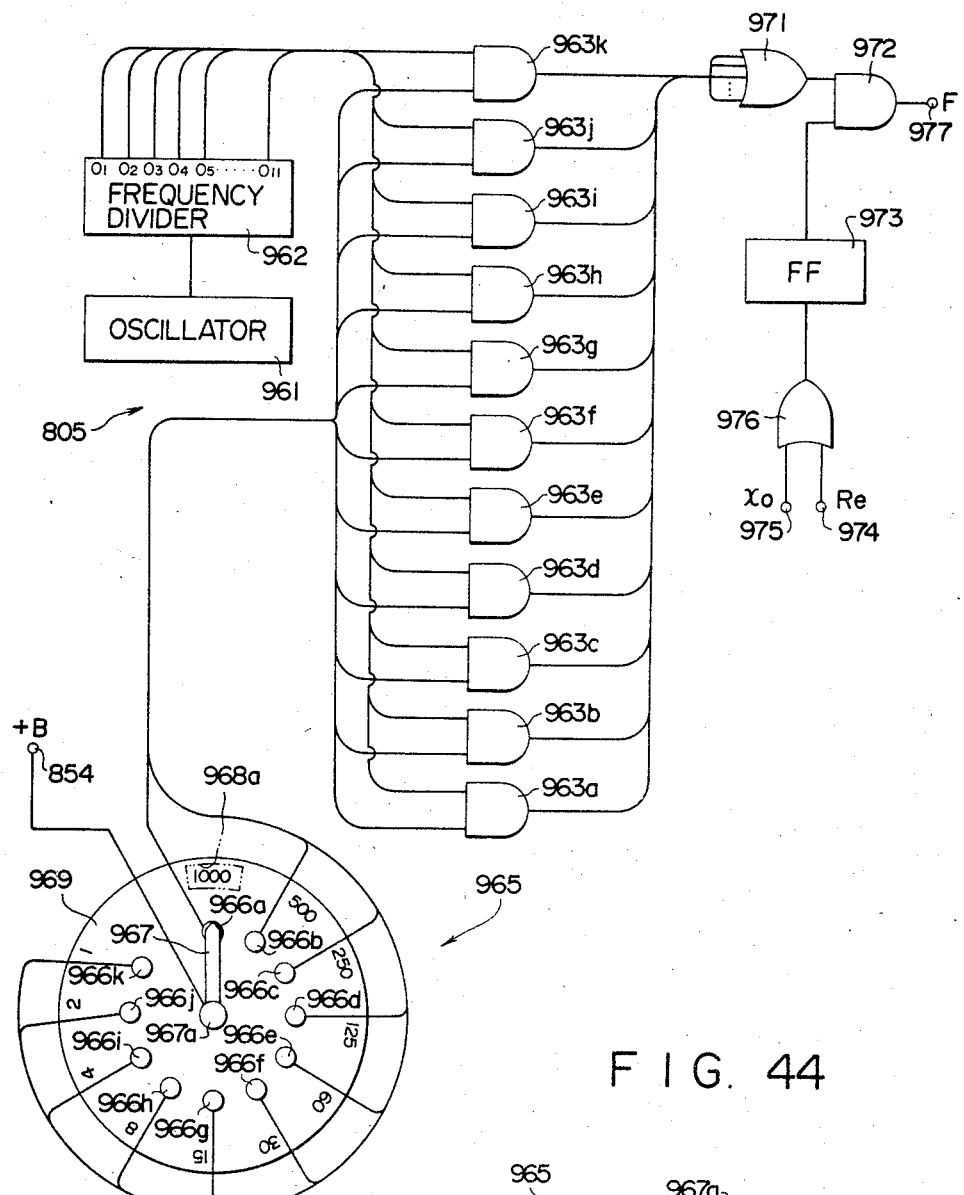
FIG. 43 is a diagram of a shutter speed decision circuit in the control circuit shown in FIG. 42.
Figure 44:
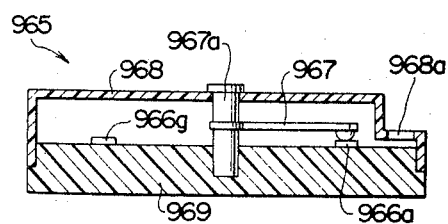
FIG. 44 is a sectional view illustrating a construction of a shutter speed selection mechanism shown in FIG. 43.

The shutter speed decision circuit 805 has a construction as shown in FIG. 43, which is provided in a camera body. An output terminal of an oscillator 961 which produces a reference signal of a definite frequency is connected to an input terminal of a frequency divider 962. Output terminals $O_1$ to $O_{11}$ of the frequency divider 962 which deliver eleven signals of different frequencies which are produced by successively dividing the reference signal in frequency are connected to respective input terminals of AND gates 963k to 963a. On the other hand, a shutter speed selection mechanism 965 which manually selects a shutter speed is disposed outside the camera body where a photographer grapher will find it easy to operate. The shutter speed selection mechanism 965 has a construction of a rotary type switch. A movable contact 967 of the mechanism 965 is rotatable about a shaft 967a integrally with the cover dial 968, as shown in FIG. 44. Eleven fixed contacts 966a to 966k which are brought into contact with the movable contact 967 are provided on a fixed base plate 969 which is fixed to the camera body. Numerical values 1000, 500, 250, ..., 2, 1 indicative of manual shutter speeds 1/1000, 1/500, 1/250, ..., 1/2, 1 are indicated adjacent to the outer periphery of the base plate 969 at positions corresponding to the fixed contacts 966a to 966k. A window 968a for indication is formed on part of the cover dial 968 in opposing relationship with the numerical values in such a manner that when the window 968a is aligned with a desired manual shutter speed value by rotating the cover dial 968, the movable contact 967 is brought into contact with the fixed contact corresponding to a desired numerical value which is indicated in the window 968a. The movable contact 967 is connected to a terminal 854 for a power supply through the shaft 967a. The fixed contacts 966a to 966k each are connected to the respective other input terminals of AND gates 963a to 963k. When the movable contact 967 is brought into contact with one of the fixed contacts 966a to 966k by rotating the cover dial 968, one of the AND gates 963a to 963k corresponding to the fixed contact which is in contact with the movable contact 967 is opened. Through the opened AND gate passes a signal of a predetermined frequency, that is, a shutter speed information, from an output terminal of the frequency divider 962 which is connected to the opened AND gate. Output terminals of the AND gates 963a to 963k are connected to respective eleven input terminals of an OR gate 971. An output terminal of the OR gate 971 is connected to one input terminal of an AND gate 972. The other input terminal of the AND gate 972 is connected to an output terminal of an FF circuit 473. An input terminal of the FF circuit 473 is connected to an output terminal of an OR gate 976. Input terminals of the OR gate 976 are connected to a terminal 474 to which a shutter release signal Re generated by a shutter release operation is applied and a terminal 975 to which a signal $x_0$ generated after a definite time upon generation of the release signal Re is applied, respectively. An output terminal of the AND gate 972 is connected to a terminal 977 which delivers a shutter speed information F of a frequency selected and determined in the shutter speed decision circuit 805 to the flash interval decision circuit 802 on the electronic flash unit. Here, the signal $x_0$ may be produced at any time during a period from after the lapse of a time required to read the shutter speed information F which has been delivered to the electronic flash unit side to completion of taking a picture. For example, the signal $x_0$ may be delivered at a time when a mirror rises or falls, or a first shutter blind starts to run, or a second shutter blind completes its running.

Figure 45:
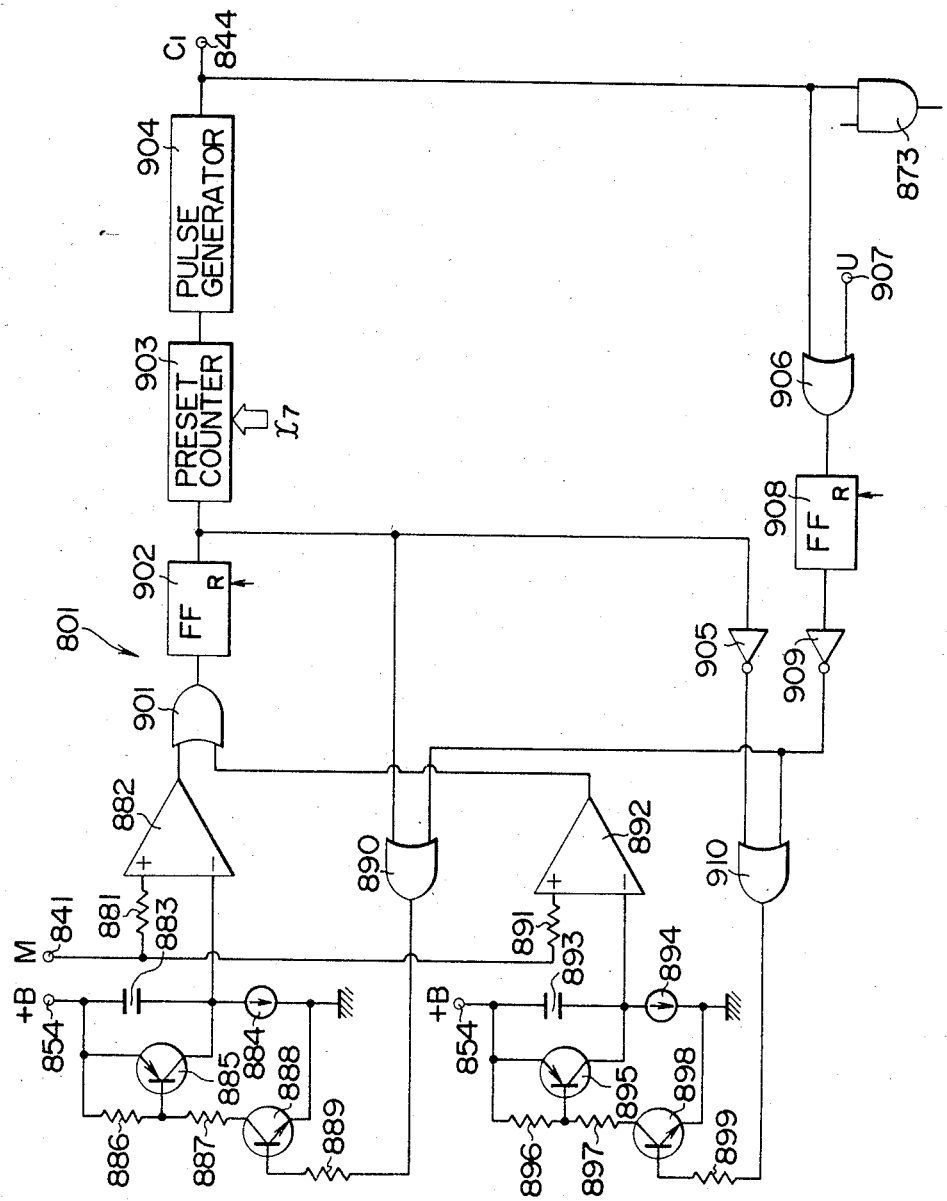
FIG. 45 is a circuit diagram of a pulse flash time decision circuit in the control circuit shown in FIG. 42.

The pulse flash time decision circuit 801 is constructed as shown in FIG. 45. A terminal 841 connected to the main circuit 100 is connected through resistors 881, 891 to non-inverting input terminals of operational amplifiers 882, 892 which form a comparator. An inverting input terminal of the amplifier 882 is connected to the junction between a capacitor 883 and a constant current circuit 884 which are both connected in series between a power supply terminal 854 and the ground and further to the collector of a PNP type transistor 885. The emitter of the transistor 885 is connected to the terminal 854 and one end of a resistor 886 and the base thereof is connected through the other end of the resistor 886 and a resistor 887 to the collector of an NPN transistor 888. The emitter of the transistor 888 is grounded and the base thereof is connected through a resistor 889 to an output terminal of an OR gate 890. A circuit arrangement similar to the above circuit is provided between an inverting input terminal of the amplifier 892 and an output terminal of an OR gate 910, which includes a capacitor 893, a constant current circuit 894, a PNP transistor 895, resistors 896, 897, an NPN transistor 898 and a resistor 899.

Output terminals of the amplifiers 882, 892 are connected to respective input terminals of an OR gate 901. An output terminal of an OR gate 901 is connected to an input terminal of an FF circuit 902. An output terminal of the FF circuit 902 is connected to an input terminal of a preset counter 903 and further to one input terminal of the OR gate 890 and to one input terminal of the OR gate 910 through an inverter 905. The preset counter 903 counts output pulses from the FF circuit 902 by a preset value $x_7$ corresponding to a preset guide number in order to give a flash time period of a single flashlight pulse. An output terminal of the preset counter 903 is connected to an input terminal of a pulse generator 904. An output terminal of the pulse generator 904 is connected to a terminal 844 from which the flash termination signal $C_1$ is delivered and one input terminal of an AND gate 873 (FIG. 42) which delivers a reset signal and further to one input terminal of an OR gate 906. The other input terminal of the OR gate 906 is connected to an input terminal 907 to which a flash interval signal U from the flash interval decision circuit 802 is applied. An output terminal of the OR gate 906 is connected to an input terminal of an FF circuit 908. An output terminal of the FF circuit 908 is connected through an inverter 909 to the other input terminals of the OR gates 890 and 910.

Figure 46:
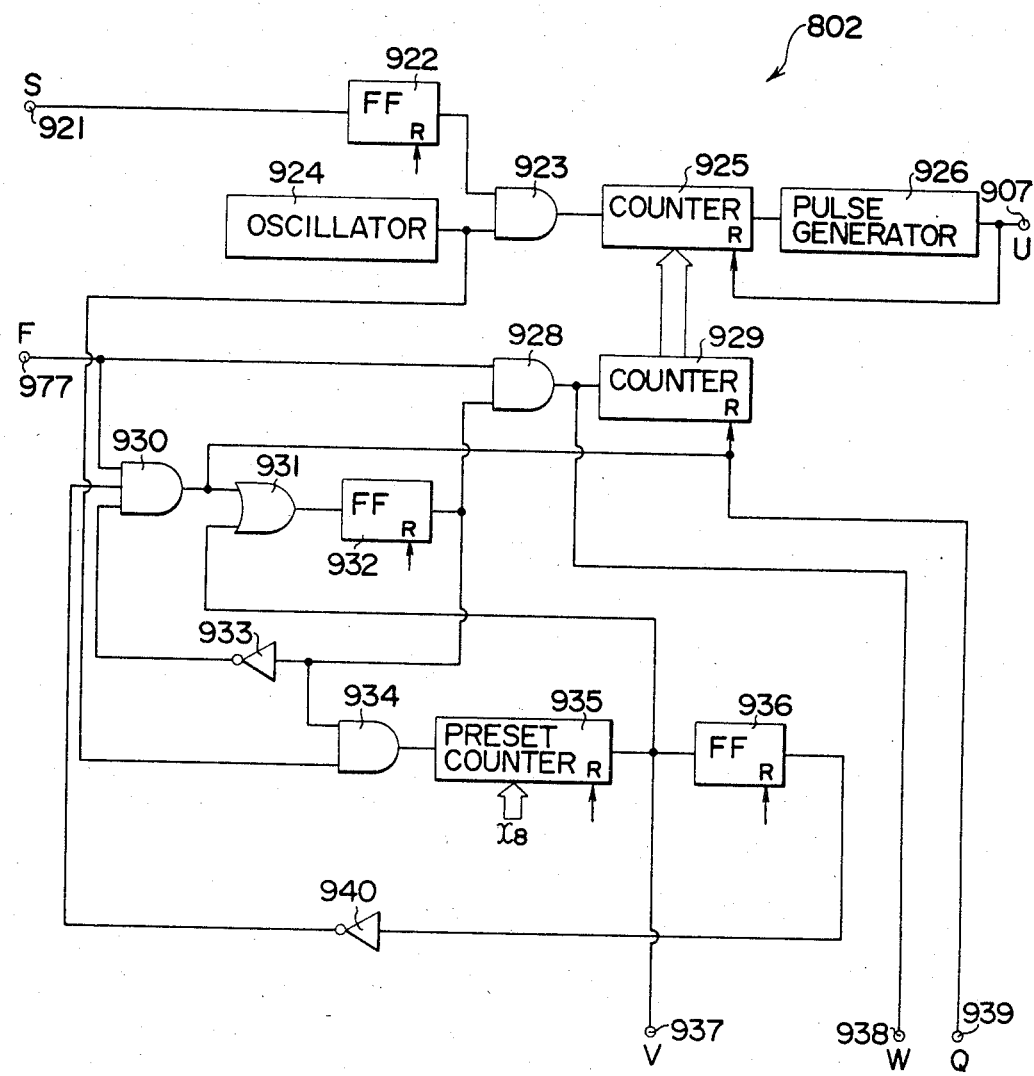
FIG. 46 is a diagram of a flash interval decision circuit in the control circuit shown in FIG. 42.

The flash interval decision circuit 802 is constructed as shown in FIG. 46. A terminal 921 to which a flat flash initiation signal S from the AND gate 850 is applied is connected to an input terminal of an FF circuit 922. An output terminal of the FF circuit 922 is connected to one input terminal of an AND gate 923. The other input terminal of the AND gate 923 is connected to an output terminal of an oscillator 924. An output terminal of the AND gate 923 is connected to an input terminal of a counter 925 for determining a flash interval. An output terminal of the counter 925 is connected through a pulse generator 926 to an input terminal 907 of the pulse flash time decision circuit 801 and to a reset terminal R of the counter 925. A terminal 977 to which shutter speed information F of the shutter speed decision circuit 805 is applied is connected to one input terminal of an AND gate 928 and to a first-input terminal of an AND gate 930. An output terminal of the AND gate 928 is connected to an input terminal of a counter 929 for setting shutter speed information and to a terminal 938 from which a signal W is supplied to the total flash time decision circuit 803. An output terminal of the AND gate 930 is connected to a reset terminal R of the counter 929 and to a terminal 939 from which a signal Q is supplied to the total flash time decision circuit 803. The output terminal of the AND gate 930 is further connected to one input terminal of an OR gate 931. An output terminal of the OR gate 931 is connected to an input terminal of an FF circuit 932. An output terminal of the FF circuit 932 is connected to the other input terminal of the AND gate 928 and to a third-input terminal of the AND gate 930 through an inverter 933. The output terminal of the FF circuit 932 is further connected to one input terminal of an AND gate 934. The other input terminal of the AND gate 934 is connected to the output terminal of the oscillator 924. An output terminal of the AND gate 934 is connected to an input terminal of a preset counter 935 for setting a shutter speed information read-in time. An output terminal of the preset counter 935 is connected to an input terminal of an FF circuit 936 and to the other input terminal of the OR gate 931 and a terminal 937 from which a signal V is supplied to the total flash time decision circuit 803. An output terminal of the FF circuit 936 is connected through an inverter 940 to a second-input terminal of the AND gate 930. The number of counts of the counter 929 is supplied to the counter 925 in order to compare with the number of counts of the counter 925.

The total flash time decision circuit 803 is constructed as shown in FIG. 47. A terminal 941 to which a flat flash initiation signal S from the AND gate 850 is applied is connected to an input terminal of an FF circuit 942. An output terminal of the FF circuit 942 is connected to one input terminal of an AND gate 943. The other input terminal of the AND gate 943 is connected to an output terminal of a frequency divider 944. An input terminal of the frequency divider 944 is connected to an output terminal of an oscillator 945. An output terminal of the AND gate 943 is connected to an input terminal of a counter 946 for counting a total flash time. An output terminal of the counter 946 is connected to an input terminal of an FF circuit 947. An output terminal of the FF circuit 947 is connected to the other input terminal of the AND gate 873 (FIG. 42). A terminal 938 into which a signal W from the flash interval decision circuit 802 is inputted is connected to one input terminal of an OR gate 949. An output terminal of the OR gate 949 is connected to an input terminal of an AND gate 950. An output terminal of the oscillator 945 is connected to one input terminal of an AND gate 951. The other input terminal of the AND gate 951 is connected through an FF circuit 953 to a terminal 937 into which a signal V from the flash interval decision circuit 802 is inputted. An output terminal of the AND gate 951 is connected to the other input terminal of the OR gate 949 and to an input terminal of a preset counter 954 for counting a first shutter blind running time. An output terminal of the counter 954 is connected to an input terminal of an FF circuit 955. An output terminal of the FF circuit 955 is connected through an inverter 956 to the other input terminal of the AND gate 950. An output terminal of the AND gate 950 is connected to an input terminal of a counter 957 for counting a period of time from the initiation of first shutter blind running to the completion of second shutter blind running. A reset terminal R of the counter 957 is connected to a terminal 939 into which a signal Q from the flash interval decision circuit 802 is inputted. The number of counts of the counter 957 is supplied to the counter 946 in order to compare with the number of counts of the counter 946.

Figure 48:
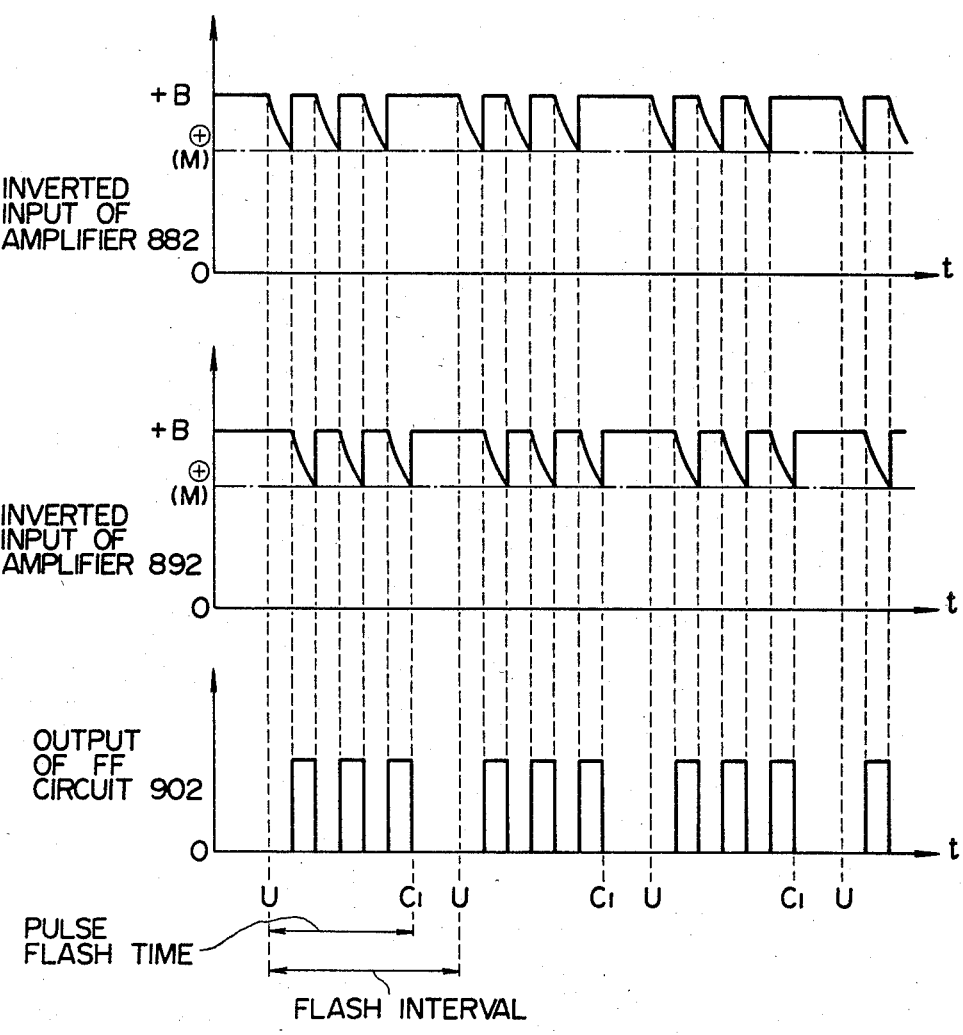
FIGS. 48 and 49 are timing charts of signal waveforms for explaining an operation of the pulse flash time decision circuit shown in FIG. 45.
Figure 49:
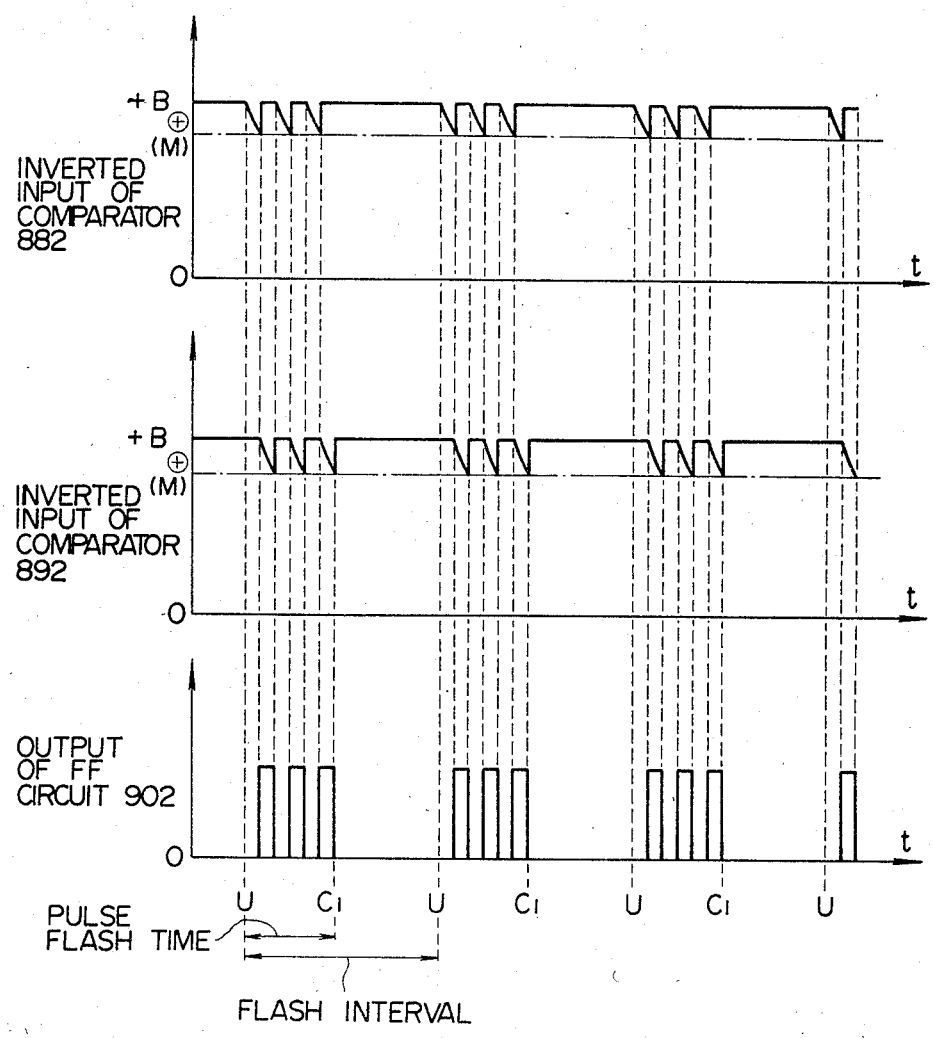

An operation of the dynamic flat flash type electronic flash unit according to the sixth embodiment of the present invention will be described with reference to time charts shown in FIGS. 48 and 49.

First, in a normal continuous flash mode, in which the movable contact terminal of the switch 852 is connected to the second fixed contact terminal 852$b$ thereof, the input terminal of the AND gate 850 turns to the L level and hence the AND gate 850 is closed. As a result, a flat flash initiation signal $x_1$ is prevented from being inputted. At the same time, since the other input terminal of the AND gate 857 turns to the H level, the AND gate 857 is opened. As a result, a continuous flash initiation signal $x_2$ is allowed to be inputted.

Specifically, when the continuous flash initiation signal $x_2$ is inputted with a shutter release operation at a camera side, an output of the AND gate 857 turns to the H level, which is supplied as a flash trigger signal A through the OR gate 855 to the main circuit 100 to render the trigger thyristor 10 conductive. At the same time, when the output of the H level of the AND gate 857 is supplied as a flash initiation signal $B_1$ through the OR gate 855 to the main circuit 100, the main thyristor 27 is rendered conductive. Thereby, the charge stored on the main capacitor 3 is discharged through the discharge tube 14 and the main thyristor 27 and the discharge tube 14 starts to emit flashlight. In addition, the FF circuit 860 is set by the output of the H level of the AND gate 857 and hence an output of the circuit 860 turns to the H level. The H level output is inverted by the inverter 861 to the L level signal. The L level signal is applied through the resistor 862 to the base of the transistor 863 to turn it off. As a result, a photocurrent which is generated by the phototransistor 866 is integrated by the capacitor 868 and the photometric circuit 804 initiates its photometric operation.

In the photometric circuit 804, when an integrated voltage of the capacitor 868 exceeds a reference voltage at the junction between resistors 864 and 865, an output of the amplifier 869 is inverted to the L level and an output of the inverter 870 turns to the H level. A one-shot pulse of the H level is generated as a flash termination signal $C_2$ from an output terminal of the pulse generator 871 to render the commutation thyristor 22 of the main circuit 100 conductive. As a result, the discharge tube 14 terminates its flash emission. As such, the dynamic flat flash type electronic flash unit operates as a normal automatic flash control type electronic flash unit when the movable contact terminal of the switch 852 is switched to the second fixed contact terminal 852b.

Next, an operation of the dynamic flat flash mode will be described. In the mode, in which the switch 852, as shown in FIG. 42, is connected to the first fixed contact 852a, the other input terminal of the AND gate 850 turns to this H level and the other input terminal of the AND gate 857 turns to the L level. Accordingly, the flat flash initiation signal $x_1$ from a camera side which is produced by a shutter release operation is allowed to be inputted and a continuous flash initiation signal $x_2$ is prevented from being inputted.

Prior to the shutter release operation, the window 968a is aligned with a desired value of shutter speed by rotating the cover dial 968 of the shutter speed selection mechanism 965 in the shutter speed decision circuit 805 provided in the camera. Thereby, since the fixed contact corresponding to a selected shutter speed is brought into contact with the movable contact 467, the operation voltage +B is applied through the movable contact 967 and the fixed contact in contact therewith to one of the other input terminals of the AND gates 963a to 963k. Since signals having frequencies derived by successively dividing the reference signal are being supplied from output terminals $O_1$ to $O_{11}$ of the frequency divider 962 to respective one input terminals of the AND gates 963a to 963k, only one of the AND gates corresponding to a shutter speed selected by the mechanism 965 allows a frequency signal from the frequency divider 962 to pass therethrough. For example, frequency signals produced from the output terminals $O_1$ to $O_{11}$ are 1024, 512, 256, 128, 64, 32, 16, 8, 4, 2 and 1 KHz in the order of the output terminals. It is to be understood, instead, that these values may be 1000, 500, 250, ..., 1 KHz. Accordingly, when the window 968a of the cover dial 968 is aligned with the numerical value "1000" (manual shutter speed 1/1000), the gate of the AND gate 963a opens and a signal of frequency 1 KHz which is produced from the output terminal $O_{11}$ is supplied through the AND gate 963a and the OR gate 971 to one input terminal of the AND gate 972. Similarly, when a shutter speed is selected to 1/500, 1/250, 1/125, etc., a divided frequency signal corresponding to respective shutter speeds of 2, 4, 8 KHz, etc., is supplied to one input terminal of the AND gate 972.

Here, when a shutter is released, a release signal Re of the H level is applied to the terminal 974 in FIG. 43 and further to the FF circuit 973 through the OR gate 976. The output of the FF circuit 973 and the other input terminal of the AND gate 972 therefore become the H level. As a result, shutter speed information F of a frequency signal corresponding to a selected shutter speed is supplied from the AND gate 972 through the terminal 977 to the flash interval decision circuit 802. The signal F is produced from the shutter speed decision circuit 805 until the signal $x_0$ is inputted into the OR gate 976.

When the shutter speed information F is supplied to the terminal 977 of the flash interval decision circuit 802, the information F of a predetermined frequency is applied to one input terminal of the AND gate 928 and the first-input terminal of the AND gate 930. Since outputs of the FF circuits 932 and 936 are at the L level in the initial condition, the second- and third-input terminals of the AND gate 930 are at the H level. As a result, the information F is applied through the AND gate 930 to the reset terminal R of the counter 929 to reset it at the initial rising leading edge of the information F. Further, the information F is supplied through the OR gate 931 to the FF circuit 932 to turn its output to the H level. Thereby, the output of the H level of the FF circuit 932 is applied to the other input terminal of the AND gate 928. At this time, the information F is applied through the AND gate 928 to the counter 929. The counter 929 starts to count the number of pulses of the inputted information F.

When an output of the FF circuit 932 turns to the H level, the H level signal is supplied through the inverter 933 to the AND gate 930 to turn its output to the L level. In addition, when an output of the FF circuit 932 turns to the H level, an output pulse train of the oscillator 924 is fed through the AND gate 934 to the preset counter 935. When the preset counter 935, into which a value $x_8$ of a time for reading-in of the information F has been preset, completes counting of the value $x_8$, its output of the H level is supplied through the OR gate 931 to the FF circuit 932. An output of the FF circuit 932 is in turn inverted to the L level and hence an output of the AND gate 928 turns to the L level. In addition, when an output of the FF circuit 932 turns to the L level, the L level output is applied through the inverter 933 to the third-input terminal of the AND gate 930 to render it at the H level. At this time, as an output of the preset counter 435 turns to the H level, an output of the FF circuit 936 turns to the H level. The H level output is applied through the inverter 940 to the second-input terminal of the AND gate 930 to turn it to the L level. As a result, an output of the AND gate 930 is maintained at the L level. Thereby, the counter 929 counts the number of pulses of the information F for a period of time corresponding to the set value $x_8$ in the preset counter 935. For example, assuming that the set value $x_8$ is 1 ms, when a shutter speed 1/1000 has been set by the shutter speed selection mechanism 965, the counter 929 remains in the condition that one pulse for the information F of 1 KHz has been counted. When a shutter speed is set to 1/500, the counter 929 remains in the condition that 2 pulses for the information of 2 KHz has been counted. The same is true for all manual shutter speeds. It is to be noted that the counter 929, upon completion of a series of flat flashing operations, remains in the previous condition as long as the next shutter speed information F is not applied to the terminal 977. Since the information F is produced simultaneously with generation of a release signal Re, there is a period of time more than 20 ms between the times when a shutter is released and when a flat flash initiation signal $x_1$ is produced so that it is possible for the counter 929 to complete its reading-in of the information F. The number of counts in the counter 929 is sent to the counter 925 for determining a flash interval.

Pulses of the shutter speed information F which are applied through the AND gate 928 of the flash interval decision circuit 802 to the counter 929 are further sent as a signal W to the OR gate 949 of the total flash time decision circuit 803 shown in FIG. 47. Since an output of the FF circuit 955 is at the L level in its initial condition, the signal W passing through the OR gate 949 is sent through the AND gate 950 to the counter 957. The counter 957 is reset by an output of the AND gate 930, that is, a signal Q, when the counting of the information F is initiated. Namely, a shutter speed which is in the counter 929 is first set to the counter 957. When an output of the preset counter 935 of the flash interval decision circuit 802 turns to the H level and an output of the AND gate 928 turns to the L level, the information F which has been inputted as the W signal through the OR gate 949 and the AND gate 950 into the counter 957 is interrupted. At the same time, however, since an output of the H level of the counter 935 is applied as a signal V to the FF circuit 953, an output of the FF circuit 953 turns to the H level and an output of the oscillator 945 is therefore inputted through the AND gate 951 into the preset counter 954 to initiate its counting operation. At the same time, the output of the oscillator 945 is supplied through the OR gate 949 and the AND gate 950 to the counter 957 to resume its counting operation. Since a period of time more than the shutter blind running time from the initiation of a first shutter-blind running to its completion has been preset as a set value $x_9$ to the preset counter 957, when the set value $x_9$ is counted an output of the preset counter 954 turns to the H level and an output of the FF circuit 955 turns to the H level. As a result, an output of the AND gate 950 turns to the L level and the counter 957 terminates the counting of output pulses of the pulse counter 945. Namely, at this time, the counter 957 remains in the condition that the counter 957 has the number of counts more than (the number of pulses of the information F) plus (the number of pulses of the shutter blind running period information). This condition is maintained, in a manner similar to the counter 929, until the signal Q as a reset signal is subsequently inputted into the reset terminal R of the counter 957. The number of counts in the counter 957 is delivered to the counter 946.

After the shutter speed information F has been produced from the camera side, when a flat flash initiation signal $x_1$ is supplied from the camera side to the terminal 851 in synchronism with the initiation of running of the first shutter blind, an output of the AND gate 850 turns to the H level and a flash trigger signal A is sent through the OR gate 855 to the main circuit 100. The flash trigger signal A renders the trigger thyristor 10 conductive. At the same time, an output of the H level of the OR gate 855 is applied as a flash initiation signal $B_1$ to the main thyristor 27 to render it conductive. As a result, the discharge tube 14 initiates its flash discharge. Further, at the same time, a signal of the H level from the AND gate 850 that is a flat flash initiation signal S is sent to the flash interval decision circuit 802 and the total flash time decision circuit 803.

When the flat flash initiation signal S is applied to the FF circuit 922 of the flash interval decision circuit 802 shown in FIG. 46, an output of the FF circuit 922 turns to the H level. This H level output is applied to the AND gate 923, allowing it to supply an output pulse train of the oscillator 924 to the counter 925. The counter 925, in which the number of counts corresponding to a shutter speed, that is the number of counts in the counter 929 has been supplied as a comparison signal, counts output pulses of the oscillator 924 and produces an output of the H level when the counted number coincides with the value set in the counter 929. When an output of the counter 925 turns to the H level, the pulse generator 926 generates a one-shot pulse of the H level and sends it as a flash interval signal U to the pulse flash time decision circuit 801. At the same time, an output of the pulse generator 926 is applied as a reset signal to the reset terminal R of the counter 925 to render it in its initial condition. Then, since the counter 925 again initiates the counting of output pulses of the oscillator 924, the above noted operations are repeated and the counter 925 permits the pulse generator 926 to produce the flash interval signal U whenever the counter 925 counts the number of a value of a shutter speed which has been set to the counter 929. For example, when an oscillation frequency of the oscillator 924 is 1 KHz, since the counter 929 is set to 1 when a shutter speed is 1/1000 and is set to 2 when a shutter speed is 1/500, one pulse is produced at an interval of 1 msec when a shutter speed is 1/1000 and at an interval of 2 msec when a shutter speed is 1/500. Thus, a flash interval signal U of one-shot pulse of the H level is produced from the pulse generator 926 at an interval which is determined in accordance with a shutter speed.

When the flash interval signal U of the H level pulse is applied to the terminal 907 of the pulse flash time decision circuit 801 shown in FIG. 45, the H level pulse is applied through the OR gate 906 to the FF circuit 908 to turn its output to the H level. The L level signal from the inverter 909 is in turn sent to the OR gates 890 and 910. At this time, states of outputs of the OR gates 890 and 910 depend upon an output of the FF circuit 902. An output of the FF circuit 902 is initially at the L level so that an output of the OR gate 890 becomes the L level. As a result, the transistors 888 and 885 turn off. In addition, since an output of the OR gate 910 turns to the H level, the transistors 898 and 895 turn on. Consequently, the capacitor 893 is short-circuited and a level at the inverting input terminal of the amplifier 8 becomes equal to a potential of the operation voltage +B. However, since the capacitor 883 is charged with a constant current flowing through the constant current circuit 884, a level at the inverting input of the amplifier 882 decreases gradually as shown in FIG. 48. When this level falls below a level of the monitor voltage signal M which is applied to the non-inverting input terminal of the amplifier 882, its output turns to the H level. The H level output of the amplifier 882 is applied through the OR gate 901 to the FF circuit 902 to turn its output to the L level. When an output of the FF circuit 902 turns to the H level, an output of the OR gate 890 turns to the H level and an output of the OR gate 910 turns to the L level. As a result, the transistors 888 and 885 turn on and the transistors 898 and 895 turn off. In contrast with the foregoing, while the capacitor 883 is short-circuited to momentarily discharge the charge thereon and then to render a level at the inverting input terminal of the amplifier 882 equal to the operation voltage +B, the capacitor 893 is charged by a constant current flowing through the constant current circuit 894 and a level at the inverting input terminal of the amplifier 892 decreases gradually. When a level at the inverting input terminal of the amplifier 892 falls below the monitor voltage signal M, an output of the amplifier 892 turns to the H level. The H level signal is supplied through the OR gate 901 to the FF circuit 902 to turn its output to the L level. When an output of the FF circuit 902 turns to the L level, the transistors 888 and 885 again turn off to initiate the charging of the capacitor 883. Also, the transistors 898 and 895 turn on to discharge the charge on the capacitor 893. As a result, when a level at the inverting input terminal of the amplifier 882 falls below the monitor voltage signal M with the charging of the capacitor 883, an output of the H level from the amplifier 882 is supplied to the FF circuit 902 to turn its output to the H level. Since similar operations are performed hereafter, a pulse train is produced from the FF circuit 902. These pulses are counted by the preset counter 903. When the number of counts reaches a set value $x_7$ corresponding to a guide number preset by a photographer prior to a picture taking process, an output of the preset counter 903 turns to the H level. At this time, the pulse generator 904 generates a one-shot pulse of the H level as a flash termination signal $C_1$. On the other hand, a period of output pulses from the FF circuit 902 depends upon a level of the monitor voltage signal M which is applied to the non-inverting input terminals of the amplifiers 882 and 892. Specifically, when a voltage of the main capacitor 3 is high, a period of the output pulses decreases as shown in FIG. 49 and when the voltage of the capacitor 3 is low, a period increases as shown in FIG. 48. Consequently, a period of time from generation of the flash interval signal U to turning an output of the preset counter 903 to the H level that is a pulse flash time, even when the set value $x_7$ of the preset counter 903 is constant, decreases when a voltage of the main capacitor 3 is high and increases when the voltage is low. As a result, a quantity of flashlight per single flash pulse does not vary by a voltage of the main capacitor 3 and thus is kept constant. In other words, a pulse flash time per single flash pulse varies in accordance with a preset guide number and also varies, when a voltage of the main capacitor 3 varies, in accordance with variation in voltage of the main capacitor 3, with the result that a quantity of pulse flashlight per single flash pulse accurately corresponds to a guide number.

When a pulse of the H level is produced from the pulse generator 904 as a flash termination signal $C_1$, the signal $C_1$ renders the commutation thyristor 22 of the main circuit 100 conductive. As a result, the discharge tube 14 terminates its flash emission.

Furthermore, a pulse of the H level, which is produced from the pulse generator 904, is supplied through the OR gate 406 of the pulse flash time decision circuit 801 to the FF circuit 908 to turn its output to the L level. Consequently, a signal of the H level is supplied through the OR gates 890 and 910 to the transistors 888 and 898 to turn both of them on. As a result, the capacitors 883 and 893 are both short-circuited and the charge thereon is discharged. Thus, both levels at the inverting input terminals of the amplifiers 882 and 892 become the operation voltage +B.

Subsequently, in the pulse flash time decision circuit 801, when a flash interval signal U which is produced at a definite interval is again applied to the terminal 907, the signal U is supplied through the OR gate 906 to the FF circuit 908 to turn its output to the H level. Consequently, the L level is applied to the other input terminals of the OR gates 890 and 910 and states of these gates depend upon an output of the FF circuit 902, resulting in repetition of the foregoing operations.

When the flash interval signal U is produced after the flash termination signal $C_1$ has been emitted, the signal U is simultaneously supplied as a flash resumption signal $B_2$ and a rapid charging signal D to the main circuit 100 (FIG. 42). The flash resumption signal $B_2$ renders the main thyristor 27 of the main circuit 100 conductive. Then, the discharge tube 14, whose deionization time does not elapse from the previous flash termination, resumes a flash emission only by the conduction of the main thyristor 27. In addition, the rapid charging signal D renders the thyristor 18 conductive. Then, the rapid charging of the commutation capacitor 16 is performed in an extremely short time through a main path including the line $l_1$, the anode-cathode path of the thyristor 18 and the line $l_0$. When the charging of the capacitor 16 is completed, a current to the thyristor 18 falls below its holding current to render it non-conductive. In the embodiment, while both the flash resumption signal $B_2$ and the rapid charging signal D are simultaneously produced, the signal D may be produced after the signal $B_2$ has been produced and then the thyristor 22 reliably has turned off by the charge on the commutation capacitor 16.

As such, since the flash resumption signal $B_2$ and the rapid charging signal D are repeatedly produced at a definite period which is determined in accordance with a shutter speed simultaneously with the flash interval signal U, the pulse flashes are interruptedly emitted at a definite interval. In addition, as described previously, a quantity of flashlight of each pulse flash, which is determined in accordance with a guide number, does not vary by a shutter speed.

The pulse flash emission is continued until exposure of a film is completed. Specifically, a time point of termination of the dynamic flat flash emission is determined in the total flash time decision circuit 803. When the flat flash initiation signal S which is produced in synchronism with initiation of running of the first shutter blind is inputted into the FF circuit 942 of the total flash time decision circuit 803, its output turns to the H level. As a result, pulses which are derived by dividing a frequency of output pulses of the oscillator 945 is inputted through the AND gate 943 to the counter 946 to allow it to initiate the counting of the frequency-divided pulses. When the number of counts in the counter 946 during its counting operation, into which the number of counts of the counter 957 has been introduced, coincides with the number of counts which has been set to the counter 957, into which the number of counts more than the period of time corresponding to the total slit exposure time from the initiation of running of a first shutter blind to the completion of running of a second shutter blind has already been stored, an output of the counter 946 turns to the H level and hence an output of the FF circuit 947 turns to the H level. After the H level output of the FF circuit 947 has been supplied from the total flash time decision circuit 803 to the AND gate 873, when a flash termination signal $C_1$ is produced from the pulse flash time decision circuit 801, an H level output is delivered from the AND gate 873. This H level output is supplied to the reset terminals R of FF circuits and counters in the pulse flash time decision circuit 801, the flash interval decision circuit 802 and the total flash time decision circuit 803 to return all these circuits to their initial conditions. Thus, a series of the dynamic flat flash operations is completed. For example, when a shutter speed which is manually set is 1/1000 (1 ms) and a shutter blind running time is 10 ms, an output of the counter 946 turns to the H level when a period of time more than 1 ms+10 ms=11 ms elapses after the counter 946 has initiated its counting and thus all the circuits are reset, resulting in completion of the series of flat flash operations.

When the dynamic flat flash mode is performed with the sixth embodiment described above, since a quantity of a pulse flash is constant as long as a guide number is not changed and a flash interval varies in accordance with a shutter speed to be used, an effective guide number does not vary even when a shutter speed is changed.

In the flash interval decision circuit 802 and the total flash time decision circuit 803, the counters 929, 957 are set to a predetermined number of counts employing a pulse train of the shutter speed information F and the counters 925, 946 count a value set to the counters 929, 957 employing a pulse train having a different frequency therefrom. Accordingly, by employing a period of time in which the counters 929, 957 are set to a predetermined number of counts and the counters 929, 957, to which the set number of counts has been set, a period of time during which the counters 925, 946 count can be easily changed. It will be understood that the flash interval decision circuit 802 and the total flash time decision circuit 803 may be constructed in a different manner from the circuit shown in FIGS. 46 and 47. For example, the counters 925, 946 are set to a predetermined number of counts by the shutter speed information F which is produced from a camera side and the counters 925, 946 thus set count down with pulses having a different frequency.

Furthermore, while the sixth embodiment is constructed such that the monitor voltage signal M is introduced into the pulse flash time decision circuit 801 and such a flash termination signal $C_1$ that a quantity of pulse flashlight per pulse flash remains constant even when a voltage of the main capacitor 3 varies is obtained, it may be constructed such that the monitor voltage signal M is introduced into the flash interval decision circuit 802 and a flash interval signal U is delivered in such a manner that a flash interval decreases when a voltage of the main capacitor 3 is low and a flash interval increases when the voltage is high.

Figure 50:
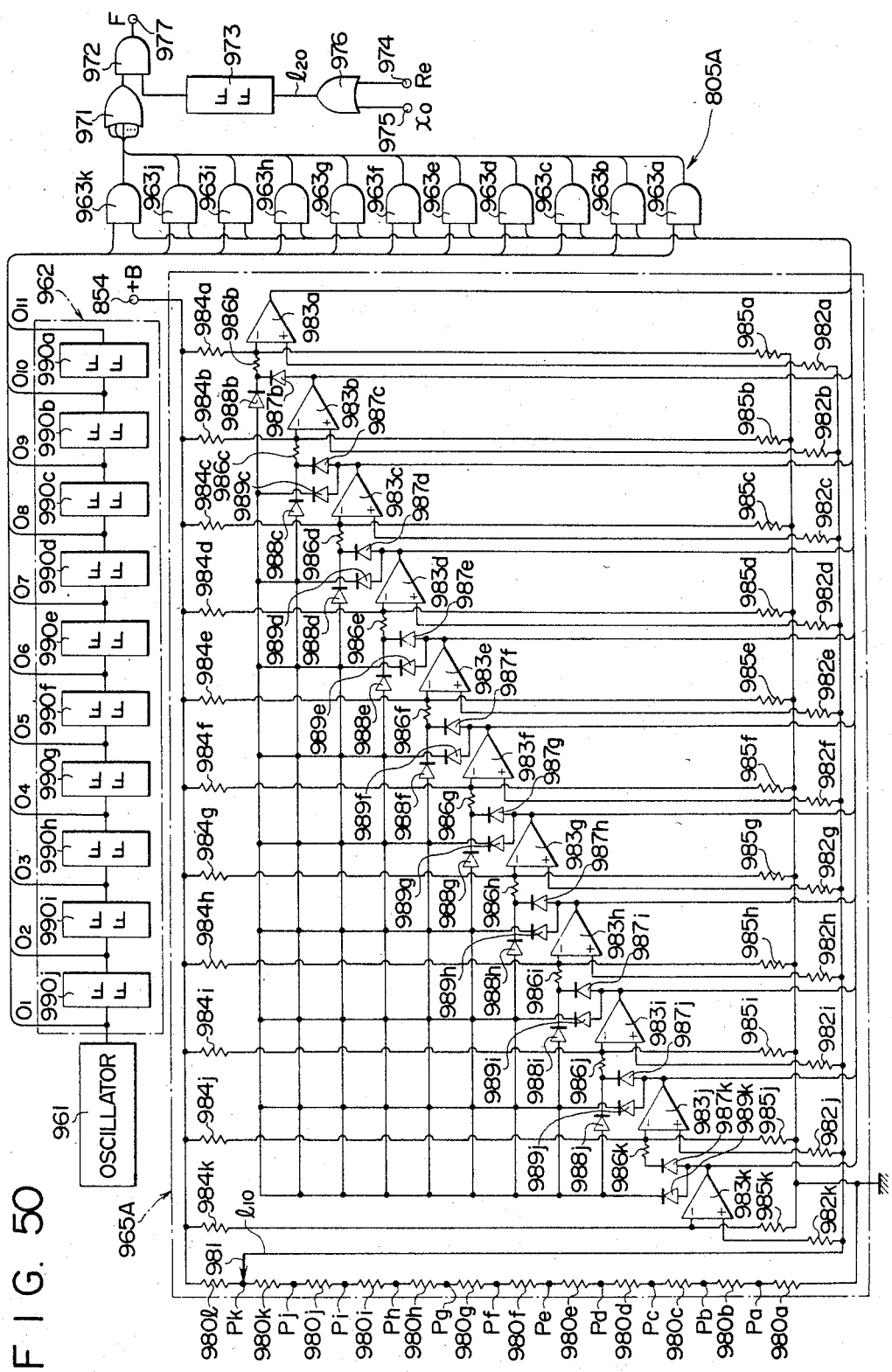
FIG. 50 is a circuit diagram illustrating another example of a shutter speed decision circuit for use in the control circuit shown in FIG. 42.

FIG. 50 illustrates another circuit arrangement of a shutter speed decision circuit 805A for use in the electronic flash unit according to the sixth embodiment.

The shutter speed decision circuit 805A has the same arrangement as the shutter speed decision circuit 805 except that the shutter speed selection mechanism 965 in the shutter speed decision circuit 805 is changed to a shutter speed selection circuit 965A. The circuit 805A is constructed such that the shutter speed selection circuit 965A comprising twelve resistors 980$a$ to 980$l$ which are connected in series between the ground and a power supply terminal 854 and a switch 981 for use in detecting a voltage derived by dividing the operation voltage +B by resistors 980$a$ to 980$l$ in contact with respective junctions Pa to Pk between resistors 980$a$ to 980$l$ is externally mounted on an IC on which other circuits are integrally mounted. It should be understood that a three-terminal variable resistor may be substituted for the resistors 980$a$ to 980$l$ and the switch 981. The switch 981 is connected through resistors 982$a$ to 982$k$ to a non-inverting input terminal of respective operational amplifiers 983$a$ to 983$k$. Inverting input terminals of the amplifiers 983$a$ to 983$k$ are connected through respective resistors 984$a$ to 984$k$ to the power supply terminal 854 and further to the ground through respective resistors 985$a$ to 985$k$. The inverting input terminals of the amplifiers 983$a$ to 983$k$ are connected through respective resisters 986$b$ to 986$k$ to cathodes of respective diodes 987$b$ to 987$k$. Anodes of the diodes 987$b$ to 987$k$ are connected to respective output terminals of amplifiers 983$b$ to 983$k$. Cathodes of the diodes 987$b$ to 987$j$ are connected to respective cathodes of diodes 988$b$ to 988$j$ and anodes of diodes 988$b$ to 988$j$ are connected in common. In addition, anodes of the diodes 987$c$ to 987$k$ are connected to respective anodes of the diodes 989$c$ to 989$k$ and cathodes of the diodes 989$c$ to 989$k$ are connected to the anodes of the diodes 988$b$ to 988$j$ which are connected in common. Output terminals of the amplifiers 983$a$ to 983$k$ are connected to respective input terminals of the AND gates 963$a$ to 963$k$. On the other hand, output terminals $O_1$ to $O_{11}$ of a frequency divider 962 comprising 10 steps of FF circuits 990$j$ to 990$a$ which successively divide an output of an oscillator 961 are connected to respective other input terminals of the AND gates 963$k$ to 963$a$.

Assuming that, in the shutter speed selection circuit 965A of the shutter speed decision circuit 805A, voltages divided by resistors 984$a$ to 984$k$ and 985$a$ to 985$k$, that is, voltages at the inverting input terminals of the amplifiers 983$a$ to 983$k$ are Va to Vk respectively and voltages at the junction points Pa to Pk between resistors 980$a$ to 980$l$ are Vpa to Vpk respectively, resistance values of these resistors 980$a$ to 980$l$, 982$a$ to 982$k$ and 984$a$ to 984$k$ are defined in such a manner that relations Vpk>Vk>Vpj>Vj>. . . >Vpa>Va hold among these voltages. Now, when an output frequency of the oscillator 961 is 1024 KHz, frequencies 1, 2, 4, . . . , 1024 KHz are supplied to the other input terminals of the AND gates 963$a$ to 963$k$, respectively. On the other hand, the switch 981, which is interrelated with a shutter speed switching member, is brought into contact with the junction Pa when the switching member is aligned with an indicator position of a shutter speed 1/1000, with the junction Pb when a shutter speed 1/500, and with the junction Pc when a shutter speed 1/250. Similarly, when the switching member is aligned with a position of a shutter speed 1 sec, the switch 981 is brought into contact with the junction Pk. Accordingly, since when the switch 981 is brought into contact with the junction Pa by setting a shutter speed to 1/1000 a voltage Vpa is supplied to the non-inverting input terminals of the amplifier 983a to 983k, only an output of the amplifier 983a turns to the H level because of the above relations between voltages. As a result, a gate of the AND gate 963a is opened and a pulse train of 1 KHz is delivered through the OR gate 971 to the AND gate 972. When a shutter speed is set to 1/500, the switch 981 is brought into contact with the junction Pb and a voltage Vpb is supplied to the amplifiers 983a to 983k. At this time, only both outputs of the amplifiers 983a to 983b turn to the H level because of the above relations and an output of the amplifier 983b renders the inverting input terminal of the amplifier 983a at the H level through the diode 987b. As a result, an output of the amplifier 983a turns to the L level and only an output of the amplifier 983b finally turns to the H level. Thus, a gate of the AND gate 963b is opened and a pulse train of 2 KHz is supplied through the OR gate 971 to the AND gate 972. In addition, when a shutter speed is set to 1/250, the switch 981 is brought into contact with the junction Pc and a voltage Vpc is supplied to the amplifier 983a to 983k. Then, outputs of the amplifier 983a to 983c turn to the H level and an output of the amplifier 983c renders the inverting input terminals of the amplifiers 983b and 983a at the H level through the diodes 987c and 989c. As a result, outputs of the amplifier 983a and 983b turn to the L level and only an output of the amplifier 983c finally turns to the H level. Then, a gate of the AND gate 963c is opened and a pulse train of 4 KHz is delivered through the OR gate 971 to the AND gate 972. Similarly, a pulse train of a frequency corresponding to one of other manual shutter speeds is delivered through the OR gate 971 to the AND gate 972.

The shutter speed decision circuit 805A is advantageous in that all circuits other than the resistors 980a to 980l and the switch 981 can be constructed in a compact form by making them into all ICs (integrated circuits) and input and output lines for transferring signals from and to the ICs are only two lines of a line $l_{10}$ to the switch 981 and a line $l_{20}$ which lies in an input side of the FF circuit 973, resulting in a reduced number of the input and output lines. Especially, while at least four signal lines are normally required to input a signal into the ICs when a manual shutter speed out of eleven steps ranging from 1/1000 to 1 sec is set, only one line for setting a shutter speed is required in the shutter speed decision circuit 805A.

Figure 51:
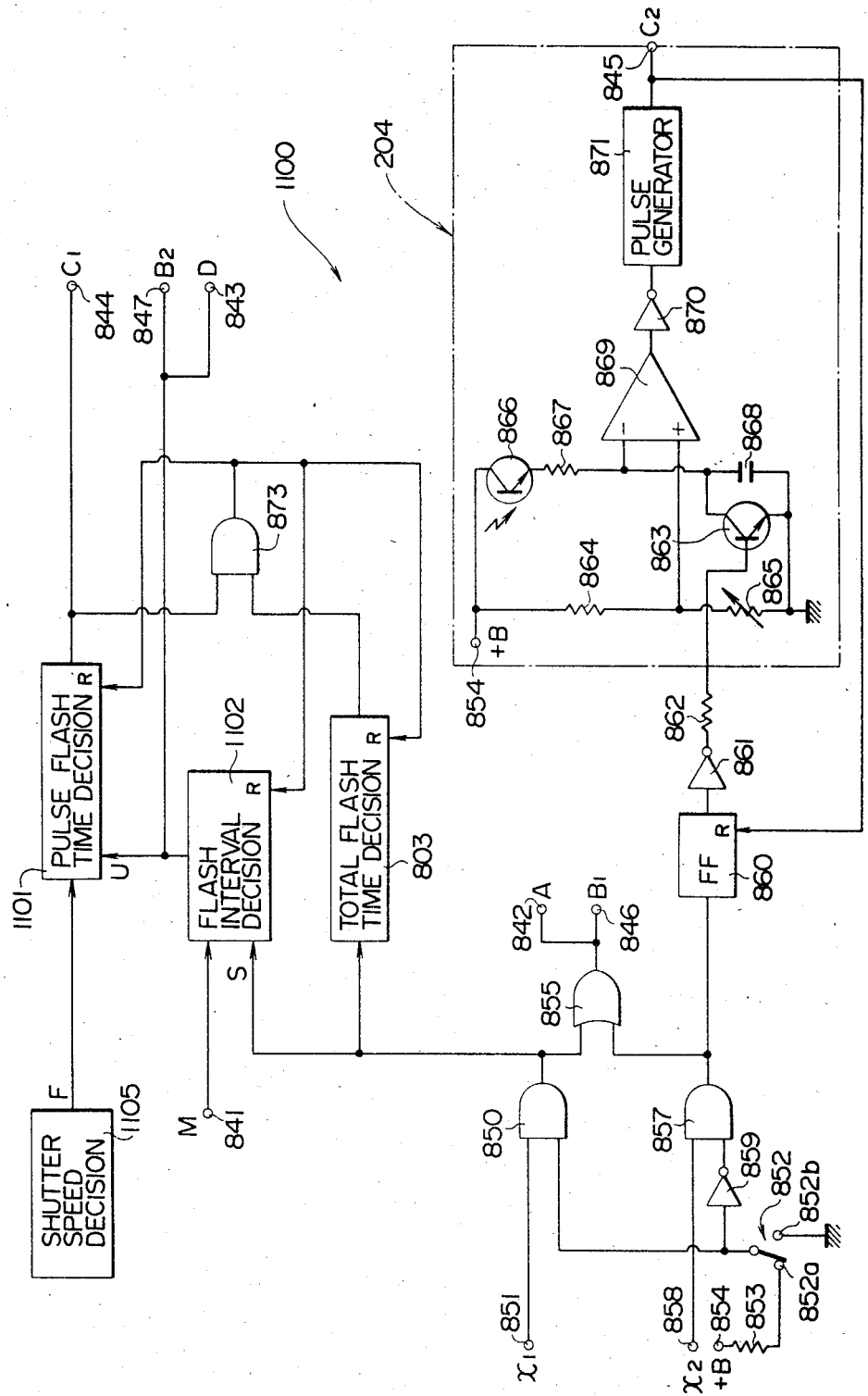
FIG. 51 is a diagram of a control circuit of an electronic flash unit according to a seventh embodiment of the present invention.

A dynamic flat flash type electronic flash unit according to a seventh embodiment of the present invention will be described. The flash unit, which is applicable to cameras in which a shutter speed varies in accordance with brightness of an object to be photographed as in aperture-priority automatic exposure cameras, comprises the main circuit 100 shown in FIG. 4 and a control circuit 1100 shown in FIG. 51. In the control circuit 1100, parts corresponding to those of the control circuit 800 shown in FIG. 42 are given corresponding reference characters. While the monitor voltage signal M which is derived by dividing a voltage of the main capacitor 3 by the resistors 4 and 5 is inputted into the pulse flash time decision circuit 801 in the sixth embodiment, the signal M is inputted into a flash interval decision circuit 1102 in the seventh embodiment. In addition, while in the sixth embodiment the shutter speed information F, which is delivered from the shutter speed decision circuit 805 by a shutter release operation, is inputted into the flash interval decision circuit 802, in the seventh embodiment the shutter speed information F from the shutter speed decision circuit 1105 is inputted into a pulse flash time decision circuit 1101. Accordingly, construction of a shutter speed decision circuit 1105, a pulse flash time decision circuit 1101 and a flash interval decision circuit 1102 differs from that in the sixth embodiment. Construction of other circuits such as the total flash time decision circuit 803 is the same as that of the sixth embodiment and therefore an explanation of duplicated circuits will be omitted.

Figure 52:
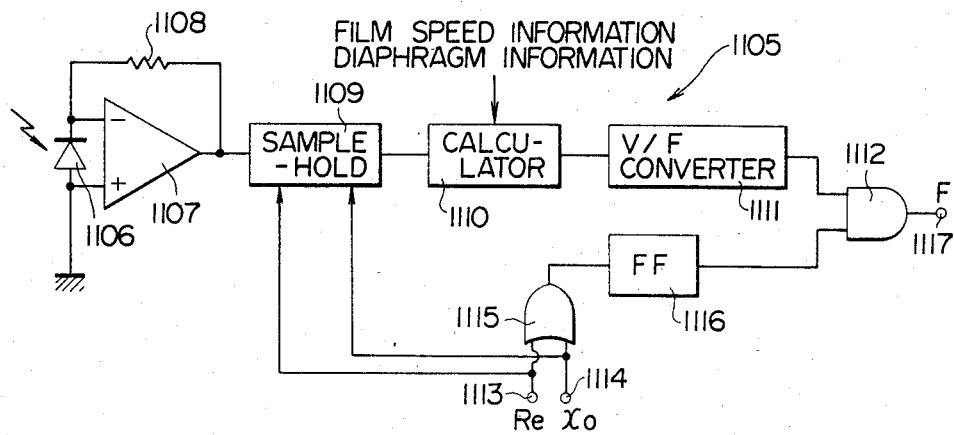
FIG. 52 is a diagram of a shutter speed decision circuit in the control shown in FIG. 51.

A shutter speed decision circuit 1105 is constructed as shown in FIG. 52. The anode of a photoelectric transducer element 1106 comprising a photodiode which receives light from an object to be photographed passing through a taking lens is connected to a grounded non-inverting input terminal of an operational amplifier 1107 and the cathode thereof is connected through an inverting input terminal of the amplifier 1107 and a resistor 1108 to an output terminal of the amplifier 1107. The output terminal of the amplifier 1107 is connected to an input terminal of a sample-hold circuit 1109. The sample-hold circuit 1109 holds an output of the amplifier 1107 whenever a release signal Re which is inputted into a terminal 1113 is applied to the circuit 1109 and releases the holding condition whenever a signal $x_0$ which is inputted into a terminal 1114 is applied to the circuit 1109. An output terminal of the sample-hold circuit 1109 is connected to an input terminal of a calculator circuit 1110 which performs calculation of outputs of the sample-hold circuit 1109 by introducing film speed and diaphragm information and produces a voltage corresponding to a proper shutter speed. An output terminal of the calculator circuit 1110 is connected through a V/F converter 1111 for converting a voltage into a frequency to one input terminal of an AND gate 1112. An output terminal of an OR gate 1115 whose input terminals are connected to respective terminals 1113 and 1114 is connected through an FF circuit 1116 to the other input terminal of the AND gate 1112. An output terminal of the AND gate 1112 is connected to a terminal which delivers the shutter speed information F to the pulse flash time decision circuit 1101.

In the shutter speed decision circuit 1105, when the shutter release signal Re is issued with a shutter release operation, an output of the amplifier 1107 which is a signal in response to brightness of an object to be photographed is held in the sample-hold circuit 1109 and thereafter a voltage corresponding to a proper shutter speed is calculated by the calculator circuit 1110 using film speed and diaphragm information. A voltage of the so-calculated shutter speed is converted to a pulse train of a frequency corresponding to the shutter speed in the V/F converter 1111. In addition, when the shutter release signal Re is issued, the FF circuit 1116 turns to the H level so that the pulse train signal of the above frequency is delivered as the shutter speed information F through the AND gate 1112 to the pulse flash time decision circuit 1101. The relation between the shutter speed and the frequency in the shutter speed information F is the same as that in the shutter speed decision circuit 805.

Figure 53:
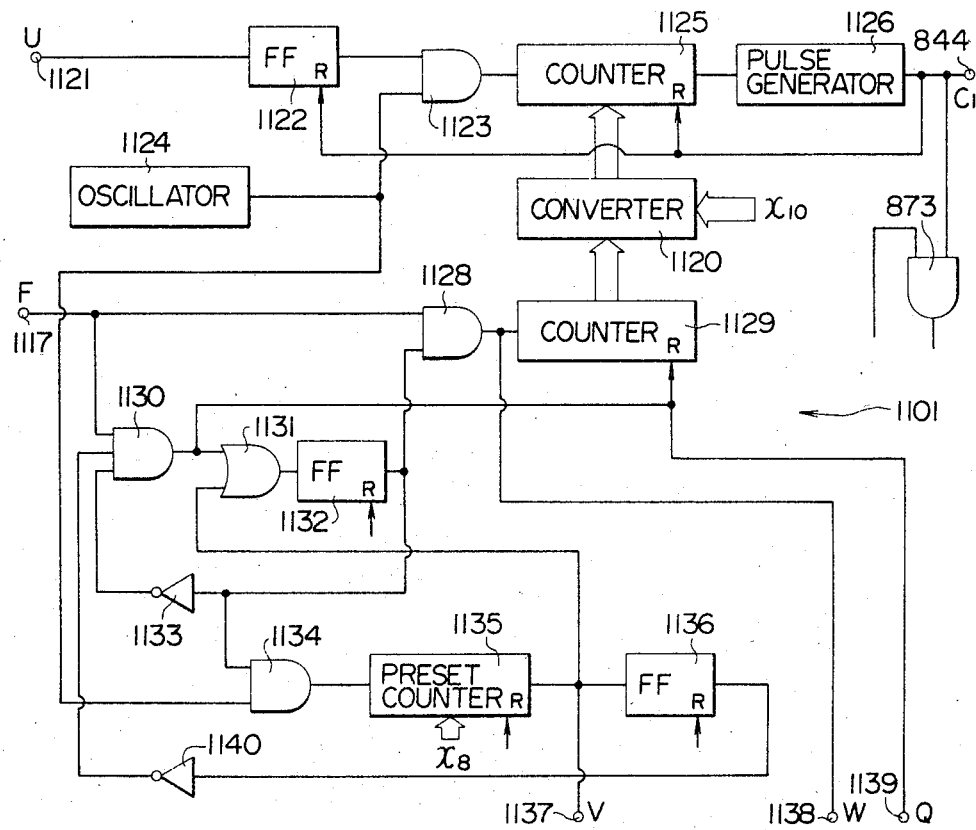
FIG. 53 is a diagram of a pulse flash time decision circuit in the control circuit shown in FIG. 51.

The pulse flash time decision circuit 1101 is constructed as shown in FIG. 53 and is substantially the same as the flash interval decision circuit 802 in the sixth embodiment. Therefore, reference characters to which numeral 200 is added are given to like parts of the flash interval decision circuit 802 and a detailed construction and operation will be omitter. A converter 1120 is interposed between counters 1129 and 1125. The counter 1129 is set to a small value when at a high shutter speed and to a large value when at a low shutter speed as previously described, for example, the value 1 when at a shutter speed 1/1000 and the value 2 when at a shutter speed 1/500. The converter 1120 converts the above stated relation to the reverse relation and delivers it to the counter 1125. Thus, the counter 1125 is set to the reverse relation with respect to the counter 1129. To this end, the converter 1120 permits a guide number to be inputted as a set value $x_{10}$ and includes an ROM (read only memory) into which the relation between a pulse flash time and a guide number has been previously inputted. Specifically, when a value corresponding to a shutter speed is set into the counter 1129 based on the shutter speed information F and an output of the counter 1129 thus set is applied to the converter 1120, the converter 1120 issues an output for setting the counter 1125 by an output of the ROM. By way of example, when information such as GN8 is inputted as a set value $x_{10}$ of a guide number into the converter 1120, the converter 1120 sets the counter 1125 to a value by converting the shutter speed information derived by the counter 1129 to a numeric value corresponding to GN8. When the shutter speed information F which is delivered from the shutter speed decision circuit 1105 is a shutter speed 1/500, a guide number per pulse flash is $$\frac{1}{\sqrt[4]{2}}$$

compared with when a shutter speed is 1/1000. In other words, when a guide number per pulse flash is Ps at a shutter speed of 1/1000, a guide number Px per pulse flash at a shutter speed Ts is as follows:

$$Px = Ps\{(1/1000)/Ts\}^{\frac{1}{4}} \qquad (13)$$

The converter 1120 sets the counter 1125 to a condition in accordance with the equation (13). An input terminal of the FF circuit 1122 is connected to a terminal 1121 to which a flash interval signal U from the flash interval decision circuit 1102 is applied. An output terminal of a pulse generator 1126 is connected to a terminal 844 which delivers a flash termination signal $C_1$ to the main circuit 100 and to one input terminal of an AND gate 873.

In the pulse flash time decision circuit 1101, when the flash interval signal U is sent from the flash interval decision circuit 1102, an output of the FF circuit 1122 turns to the H level and the gate of the AND gate 1123 is opened. Thereby, an output of an oscillator 1124 is inputted through the AND gate 1123 into the counter 1125. Accordingly, when a value of counts of the counter 1125 coincides with the set value from the converter 1120, an output of the counter 1125 turns to the H level and a one-shot pulse of the H level is produced from the pulse generator 1126. This H level pulse is delivered as a flash termination signal $C_1$ to the main circuit 100 to terminate flash emission of the discharge tube 14 and to reset the counter 1125 and the FF circuit 1122. In other words, in the pulse flash time decision circuit 1101, a flash time varies in accordance with a shutter speed in such a manner that since the counter 1125 produces an output of the H level having the increased number of counts at a high shutter speed a period of time when the flash termination signal $C_1$ is emitted increases and since the counter 1125 produces an output of the reduced number of counts at a low shutter speed a period of time when the signal $C_1$ is emitted decreases.

Figure 54:
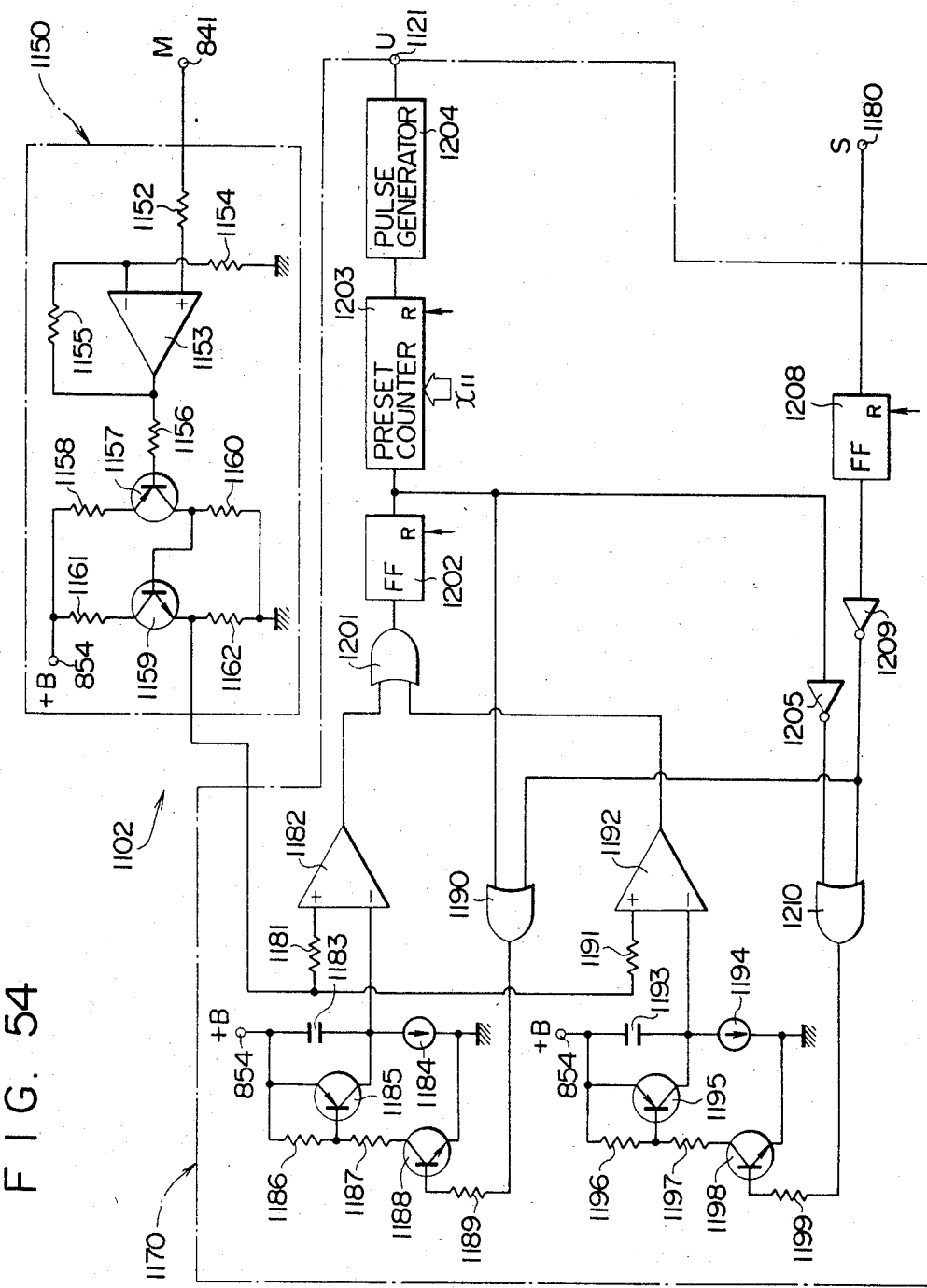
FIG. 54 is a diagram of a flash interval decision circuit in the control circuit shown in FIG. 51.

The flash interval decision circuit 1102 is constructed as shown in FIG. 54. The flash interval decision circuit 1102 employs a circuit 1170 similar to the pulse flash time decision circuit 801 in the sixth embodiment set forth above. Reference characters to which numeral 300 is added are given to like parts of the pulse flash time decision circuit 801 and a detailed explanation of the circuit construction will be omitted. The circuit 1102 is constructed by adding a correction circuit 1150 to the circuit 1170.

An output terminal of a pulse generator 1204 is connected to a terminal 1121 from which a flash interval signal U is delivered to the pulse flash time decision circuit 1101. A terminal 1180 to which a flat flash initiation signal S is applied is connected to an input terminal of the FF circuit 1208. A terminal 841 to which a monitor voltage signal M is applied is connected through a resistor 1152 to a non-inverting input terminal of an operational amplifier 1153. A resistor 1154 is connected between an inverting input terminal of the amplifier 1153 and the ground. A resistor 1155 is connected between the inverting input terminal and an output terminal of the amplifier 1153. A resistor 1156 is connected between the output terminal of the amplifier 1153 and the base of a PNP type transistor 1157. The emitter of the transistor 1157 is connected through a resistor 1158 to a power supply terminal 854 and the collector thereof is connected to the base of an NPN type transistor 1159 and is grounded through a resistor 1160. The collector of the transistor 1159 is connected through a resistor 1161 to the power supply terminal 854 and the emitter thereof is grounded through a resistor 1162 and is further connected to resistors 1181 and 1191.

In the flash interval decision circuit 1102, when a flat flash initiation signal S is applied to the terminal 1180, an output of the FF circuit 1208 turns to the H level. The L level signal is in turn introduced into OR gates 1190, 1210 by an inverter 1209, states of outputs of the OR gates 1190, 1210 depend upon an output of an FF circuit 1202. Since an output of the FF circuit 1202 is initially at the L level, an output of the OR gate 1190 turns to the L level to thereby turn transistors 1188 and 1185 off. In addition, since an output of the OR gate 1210 turns to the H level, transistors 1198 and 1195 turn on. Consequently, a capacitor 1193 is short-circuited and a level at an inverting input terminal of an operational amplifier 1192 becomes equal to the operation voltage +B. Since a capacitor 1183 is charged by a current flowing through a constant current circuit 1184, a level at an inverting input terminal of an operational amplifier 1182 decreases gradually. When the level falls below a level at a non-inverting input terminal of the amplifier 1182, an output of the latter turns to the H level. The H level signal is introduced through an OR gate 1201 into an FF circuit 1202 to turn its output to the H level. At the same time, an output of the OR gate 1190 turns to the H level and an output of the OR gate 1210 turns to the L level. Accordingly, the transistors 1188 and 1185 turn on and the transistors 1198 and 1195 turn off. In contrast with the foregoing, the capacitor 1183 is short-circuited and the charge thereon is momentarily discharged so that a level at the inverting input terminal of the amplifier 1182 becomes equal to the operation voltage +B, whereas the capacitor 1193 is charged by a current flowing through the power supply circuit 1194 and a level at the inverting input terminal of the amplifier 1192 decreases gradually. When the level falls below a level at the non-inverting input terminal of the amplifier 1192, an output of the latter turns to the H level. The H level signal is introduced through the OR gate 1201 to the FF circuit 1202 to turn its output to the L level. Thereby, the transistors 1188 and 1185 turn on and the transistors 1198 and 1195 turn off. Similar operations take place hereinafter, resulting in generation of a pulse train from the FF circuit 1202. These output pulses are counted by means of a preset counter 1203. When the number of counts reaches a preset value $x_{11}$ which corresponds to a guide number preset by a photographer prior to taking a picture, an output of the preset counter 1203 turns to the H level. The pulse generator 1204 produces in turn a one-shot pulse of the H level as a flash interval signal U. When the preset counter 1203 counts pulses of the H level from the FF circuit 1202 by the number of the preset value $x_{11}$, the preset counter 1203 is reset to initiate counting from its initial state. Accordingly, assuming that voltages at the non-inverting input terminals of the amplifiers 1182 and 1192 are constant, the flash interval decision circuit 1102 produces the flash interval signals U at a definite interval when a preset value $x_{11}$ of a guide number is constant to supply them to the pulse flash time decision circuit 1101. When a preset value $x_{11}$ is changed in accordance with a guide number of the electronic flash unit, a flash interval will vary in accordance with the preset value $x_{11}$.

In the electronic flash unit, when a shutter speed is constant a flash time per pulse flash is constant with the pulse flash time decision circuit 1101. Accordingly, when the correction circuit 1150 is not provided, a monitor voltage signal M decreases when a voltage of the main capacitor 3 falls and voltages at the non-inverting input terminals of the amplifiers 1182 and 1192 decrease, whereby a quantity of flashlight per pulse flash also decreases. However, when the flash interval decision circuit 1102 is provided, a flash interval varies in accordance with a voltage of the main capacitor 3 and a quantity of flashlight per pulse is corrected. Specifically, when a monitor voltage signal M decreases with decrease of a voltage of the main capacitor 3, an output voltage of an operational amplifier 1153 in the correction circuit 1150 decreases. As a result, a collector current of the transistor 1157 increases and a current flowing between the base and emitter of the transistor 1159 increases, whereby an emitter potential of the transistor 1159 that is potentials at the non-inverting input terminals of the amplifiers 1182 and 1192 rises. In addition, when a voltage of the monitor voltage signal M rises, potentials at the non-inverting input terminals of the amplifiers 882 and 892 fall by operations of the correction circuit 1150. Consequently, in the flash interval decision circuit 1102, a period of output pulses of the FF circuit 1202 decreases as a voltage of the main capacitor 3 falls and a flash interval signal U is obtained at a reduced time interval. When a voltage of the main capacitor 3 is high, a period of output pulses of the FF circuit 1202 increases and a flash interval signal U is obtained at an increased time interval.

Unlike the sixth embodiment, the shutter speed decision circuit 1105, the pulse flash time decision circuit 1101 and the flash interval decision circuit 1102 in the seventh embodiment, which operate as described above, in the dynamic flat flash mode operate in such a manner that a pulse flash time varies in accordance with a shutter speed to be used for taking a picture and a flash interval is corrected in accordance with a change in a voltage of the main capacitor so as to maintain it substantially constant as long as a guide number is constant, resulting in no change in an effective guide number even when a shutter speed is changed.

It should be understood that operations in the continuous flash mode with the flash unit of the seventh embodiment are performed in the same manner as those in the flash unit of the sixth embodiment.

In the seventh embodiment, a monitor voltage signal M is introduced into the flash interval decision circuit 1102 and a flash interval is changed with a change in a voltage of the main capacitor 3. However, a monitor voltage signal M may be introduced into the pulse flash time decision circuit 1101, not to the flash interval decision circuit 1102 and a flash time of a pulse flash, not a flash interval, may be changed with respect to a change in a voltage of the main capacitor 3.

The dynamic flat flash type electronic flash units in the sixth and seventh embodiments change a quantity of flashlight per pulse flash or a flash interval independently of each other in accordance with a shutter speed. It should be understood, however, that both of a quantity of pulse flash and a flash interval may be changed.

In addition, in the sixth and seventh embodiments, while the shutter speed information F is transmitted in a digital signal from a camera side to the electronic flash unit side, an analog voltage which is logarithmically compressed in a camera side may be transmitted for an operation to an electronic flash unit. Further, the shutter speed information need not be derived from a camera side and it may be set manually at the electronic flash unit side.

What is claimed is:

1. An electronic flash unit which is capable of obtaining flash characteristics substantially equivalent to a continuous flash by permitting a flash discharge tube to repeatedly emit a pulse flash during an exposure of camera shutter; comprising:
a series circuit combining said flash discharge tube and a main switching element which are interposed in a discharge loop of a main capacitor;
a trigger circuit for permitting said discharge tube to inititate flash emission in response to a synchronized signal from said camera;
a flash control circuit which produces a flash termination signal by detecting the fact that a value associated with pulse flashes reaches a predetermined level and further produces a flash resumption signal within a period of time less than the deionization time of said discharge tube after generation of said flash termination signal;
a flash termination circuit which forcibly turns said main switching element off in response to said flash termination signal to terminate said flash emissions; and
a flash resumption circuit which turns said main switching element on again in response to said flash resumption signal to resume said flash emissions of said discharge tube prior to the flash discharge tube de-ionization time.

2. An electronic flash unit according to claim 1, in which said flash control circuit includes a monitor circuit which detects a charged voltage on said main capacitor and produces said flash termination signal.

3. An electronic flash unit according to claim 2, in which said monitor circuit includes means for switching detection levels of said charged voltage.

4. An electronic flash unit according to claim 2, in which said monitor circuit includes means for switching the capacity of a capacitor to be charged in response to said charged voltage.

5. An electronic flash unit according to claim 1, in which said flash control circuit includes a monitor circuit which detects a quantity of flashlight of said discharge tube and produces said flash termination signal.

6. An electronic flash unit according to claim 5, in which said monitor circuit includes means for switching a detection level of said quantity of flashlight.

7. An electronic flash unit according to claim 1, in which said flash control circuit includes a flash interval setting circuit which produces said flash resumption signal by counting a flash interval from initiation of the previous pulse flash to initiation of the next pulse flash.

8. An electronic flash unit according to claim 7, in which said flash interval setting circuit includes means for switching said flash interval.

9. An electronic flash unit according to claim 7, in which said flash interval setting circuit produces a rapid charging signal for rapidly charging a commutation capacitor simultaneously with said flash resumption signal.

10. An electronic flash unit according to claim 7, in which said flash interval setting circuit produces a rapid charging signal for rapidly charging a commutation capacitor later than said flash resumption signal.

11. An electronic flash unit according to claim 1, in which said flash control circuit includes a flash interval setting circuit which produces said flash resumption signal by counting a flash interval from termination of the previous pulse flash to initiation of the next pulse flash.

12. An electronic flash unit according to claim 11, in which said flash interval setting circuit includes means for switching said flash interval.

13. An electronic flash unit according to claim 11, in which said flash interval setting circuit produces a rapid charging signal for rapidly charging a commutation capacitor simultaneously with said flash resumption signal.

14. An electronic flash unit according to claim 11, in which said flash interval setting circuit produces a rapid charging signal for rapidly charging a commutation capacitor later than said flash resumption signal.

15. An electronic flash unit according to claim 1, in which said main switching element is formed by a thyristor of the electrostatic induction type.

16. An electronic flash unit according to claim 15, in which said main switching element has a control circuit which is formed by a transistor circuit without a commutation capacitor.

17. An electronic flash unit according to claim 1, further including means for counting a total flash time during which said pulse flash is intermittently repeated.

18. An electronic flash unit according to claim 1, further including a mode changeover switch which selectively switches a flat flash mode which permits said discharge tube to intermittently emit pulse flashes and a continuous flash mode which permits said discharge tube to emit a continuous flash only one time.

19. An electronic flash unit according to claim 18, further including a photometric circuit for said continuous flash mode and operating as an automatic flash control type electronic flash unit in said continuous flash mode.

20. An electronic flash unit according to claim 1, further including switching means which is in cooperation with a manual setting member which is manually present prior to taking a picture so that a substantial guide number can be made variable by operating said member;

and means responsive to said switching means for altering the time occurrence of the flash termination signal depending upon the setting of the manual setting member.

21. An electronic flash unit according to claim 1, in which said flash control circuit includes a time setting circuit which automatically changes a quantity of light per pulse flash and/or a flash interval by detecting a charged voltage on said main capacitor and changing a time point of issuing said flash termination signal and/or said flash resumption signal in accordance with said charged voltage so that a quantity of flash per unit time is maintained constant irrespective of the magnitude of said charged voltage.

22. An electronic flash unit according to claim 1, in which said flash control circuit includes means connected to intended exposure time information setting means, which automatically changes a quantity of light per pulse flash and/or a flash interval by changing a time point of issuing said flash termination signal and/or said flash resumption signal in accordance with said exposure time information so that an effective guide number can be maintained constant irrespective of the magnitude of an exposure time.

23. An electronic flash unit according to claim 22, in which said setting means comprises manual setting means such as a rotary switch and a changeover switch.

24. An electronic flash unit according to claim 1, in which said flash control circuit includes means connected to intended exposure time information detecting means, which automatically changes a quantity of light per pulse flash and/or a flash interval by changing a time point of issuing said flash termination signal and/or said flash resumption signal in accordance with said exposure time information so that an effective guide number can be maintained constant irrespective of the magnitude of an exposure time.

25. An electronic flash unit according to claim 24, in which said detecting means includes a photometric circuit for measuring brightness of an object to be photographed and a calculation circuit which calculates exposure time information based on information concerning brightness of an object to be photographed, a film speed and a diaphragm which are derived from said photometric circuit.

26. An electronic flash unit according to claim 24, in which said flash control circuit further includes a correction circuit which automatically changes a quantity of light per pulse flash and/or a flash interval by detecting a charged voltage on said main capacitor and changing a time point of issuing said flash termination signal and/or said flash resumption signal in accordance with said charged voltage so that a quantity of flashlight per unit time can be maintained constant irrespective of the magnitude of said charged voltage.

27. An electronic flash unit according to claim 20 further including a voltage reference circuit coupled to said switching means for changing the voltage reference level depending upon the setting of the manual setting member.

28. An electronic flash unit according to claim 27 further including means for comparing the voltage on said main capacitor with said voltage reference level for controlling the time point of occurrence of said flash termination signal.

29. An electronic flash unit according to claim 20 further comprising means for coupling the voltage on said main capacitor to a selected one of a plurality of chargeable members with the chargeable members selected being dependent upon the setting of the manual setting member.

30. An electronic flash unit according to claim 29 further comprising means for comparing the output of the selected charging member with a predetermined reference level for controlling the time point of occurrence of said flash termination signal when the voltage level of the selected chargeable member reaches the reference level.

31. An electronic flash unit according to claim 20 further comprising a counter and means for setting the count in said counter according to the setting of said manual setting member.

32. An electronic flash unit according to claim 31 wherein said means for setting the count further comprises oscillator means; means for converting the output of said oscillator means into a plurality of different output frequencies and means for coupling one of said output frequencies to said counter depending upon the setting of said manual setting member.

33. An electronic flash unit according to claim 32 further comprising second counter means for receiving a count from said first counter means for generating a flash termination signal whose length is a function of the output frequency set into said second counter means.

34. An electronic flash unit according to claim 20 further comprising oscillator means; means for converting the output of said oscillator means into a plurality of different output frequencies; a plurality of operational amplifiers each having an output and inverting and non-inverting inputs respectively coupled through first resistance means to ground and through second resistance means to the slider arm of a potentiometer which is set according to the setting of said manual setting member;

each of said operational amplifiers having their outputs coupled to the inverting inputs of the next adjacent operational amplifier wherein only one of said operational amplifiers is maintained in a first state while the remaining operational amplifiers are maintained in the opposite state, dependent upon the setting of said manual setting member;

the plurality of gating means each having one input coupled to receive one of said different frequency signals and a second input coupled to the output of an associated one of said operational amplifiers for passing the signal frequency applied to the gate when the gate is enabled by its associated operational amplifier;

first counter means for receiving the signal frequency pass for developing a predetermined count.

35. An electronic flash unit according to claim 34 further comprising second counter means for receiving a count in said first counter means;

said flash control circuit producing the flash termination signal as a function of the count in said second counter means.

36. An electronic flash unit according to claim 1 in which said flash control circuit includes a monitor circuit comprised of first and second capacitor means for selectively detecting a charge voltage on said main capacitor to produce said flash termination signal;

means for alternately enabling one of said charging capacitor means while discharging the other of said capacitor means;

said enabling and discharging means comprising means for generating a count signal when the capacitor means being charged reaches a predetermined level; said count pulse discharging the capacitor means being charged and enabling the remaining capacitor means which was discharged on the previous operation to be charged.

* * * * *

UNITED STATES PATENT AND TRADEMARK OFFICE
CERTIFICATE OF CORRECTION

PATENT NO. : 4,592,639
DATED : June 3, 1986
INVENTOR(S) : Hiroaki Nakamura

It is certified that error appears in the above-identified patent and that said Letters Patent is hereby corrected as shown below:

IN THE SPECIFICATION

Column 10, line 20, after "triggering" insert --the flash--.

Column 15, line 12, change "has" to --have--.

Column 21, line 11, change "the" to --The--.

Column 25, line 2, change "the" (second occurrence) to --one--.

Column 27, line 30, change "86" to --85--.

Column 30, line 6, change "illutrates" to --illustrates--.

Column 32, line 35, change "iS" to --is--.

Column 42, line 65, change "8" to --892--.

Column 46, line 25, change "resisters" to --resistors--.

UNITED STATES PATENT AND TRADEMARK OFFICE
CERTIFICATE OF CORRECTION

PATENT NO. : 4,592,639

DATED : June 3, 1986

INVENTOR(S) : Hiroaki Nakamura

It is certified that error appears in the above-identified patent and that said Letters Patent is hereby corrected as shown below:

Column 54, claim 20, line 6, change "present" to

-- preset --.

Signed and Sealed this

Twenty-seventh Day of October, 1987

*Attest:*

DONALD J. QUIGG

*Attesting Officer*    *Commissioner of Patents and Trademarks*